US010496059B2

(12) United States Patent
Ikezaki et al.

(10) Patent No.: US 10,496,059 B2
(45) Date of Patent: Dec. 3, 2019

(54) OPERATIONAL CONTROL MANAGEMENT APPARATUS AND OPERATIONAL CONTROL MANAGEMENT METHOD

(71) Applicant: FUJITSU LIMITED, Kawasaki-shi, Kanagawa (JP)

(72) Inventors: Takashi Ikezaki, Yatomi (JP); Shoichi Kogiso, Nagoya (JP); Yusuke Kuchiwaki, Nagoya (JP); Masakazu Furukawa, Yoro (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 15/064,949

(22) Filed: Mar. 9, 2016

(65) Prior Publication Data

US 2016/0282826 A1  Sep. 29, 2016

(30) Foreign Application Priority Data

Mar. 24, 2015  (JP) .................................. 2015-060690

(51) Int. Cl.
*G06F 9/50* (2006.01)
*G05B 15/02* (2006.01)
*G06Q 10/06* (2012.01)

(52) U.S. Cl.
CPC ............... *G05B 15/02* (2013.01); *G06F 9/50* (2013.01); *G06Q 10/06* (2013.01)

(58) Field of Classification Search
CPC .......... G05B 15/02; G06Q 10/06; G06F 9/50; G06F 11/34
See application file for complete search history.

(56) References Cited

U.S. PATENT DOCUMENTS

2007/0198223 A1* 8/2007 Ella ........................ G06Q 10/06
                                                              702/188
2010/0114870 A1* 5/2010 Al-Omari ......... G06F 17/30433
                                                              707/718

(Continued)

FOREIGN PATENT DOCUMENTS

JP  10-337932      12/1998
JP  2012-123688    6/2012
JP  2012-256148    12/2012

OTHER PUBLICATIONS

Notification of Reasons for Refusal for Japanese Application No. 2015-060690 dated Dec. 4, 2018.

*Primary Examiner* — Jarrett J Stark
(74) *Attorney, Agent, or Firm* — Staas & Halsey LLP

(57) ABSTRACT

An operational control management method of determining a possibility of parallel execution of multiple operational controls that are included in a workflow, in which a computer performs processing includes judging whether a first operational control that is to be executed next and a second operational control that follows the first operational control are detailed determination targets, based on operation categorization information that results from categorizing each of the multiple operational controls based on an operation target and operation content; and determining a possibility of parallel execution based on relationships of the first operational control and the second operational control to the operation target and on operation situations of operation targets, with which the first and second operational controls are associated, in a case where the first operational control and the second operational control are the detailed determination targets.

12 Claims, 45 Drawing Sheets

(56) References Cited

U.S. PATENT DOCUMENTS

| | | |
|---|---|---|
| 2012/0151190 A1 | 6/2012 | Usuba |
| 2012/0239598 A1* | 9/2012 | Cascaval .......... G06F 17/30899 706/12 |
| 2012/0317259 A1 | 12/2012 | Shikano et al. |
| 2013/0086535 A1* | 4/2013 | Rieger ................ G06F 17/5068 716/51 |
| 2014/0189616 A1* | 7/2014 | Rieger ................... G06F 17/50 716/55 |

* cited by examiner

FIG. 6A

| NAME OF RESOURCE | TYPE OF RESOURCE | STATE OF RESOURCE |
|---|---|---|
| NAME OF SERVER | | STATE OF SERVER |

CONTROL →

FIG. 6B

| NAME OF RESOURCE | TYPE OF RESOURCE | STATE OF RESOURCE |
|---|---|---|
| NAME OF SERVER | | STATE OF SERVER |

REFERENCE →

FIG. 6C

| NAME OF RESOURCE | TYPE OF RESOURCE | STATE OF RESOURCE |
|---|---|---|
| NAME OF SERVER | | STATE OF SERVER |

CONTROL →

FIG. 6D

| NAME OF RESOURCE | TYPE OF RESOURCE | STATE OF RESOURCE |
|---|---|---|
| NAME OF SERVER | | STATE OF SERVER |

REFERENCE →

FIG. 8                                                                                                    ~31

| FIRST DETERMINATION CRITERION | | | | |
|---|---|---|---|---|
| PRECEDING OPERATION MODEL \ FOLLOWING OPERATION MODEL | OPERATION MODEL A SERVER CONTROL | OPERATION MODEL B SERVER REFERENCE | OPERATION MODEL C RESOURCE CONTROL | OPERATION MODEL D RESOURCE REFERENCE |
| OPERATION MODEL A SERVER CONTROL | · DIFFERENT NAMES OF SERVERS => PARALLELIZATION IS POSSIBLE · THE SAME NAMES OF SERVERS => PARALLELIZATION IS IMPOSSIBLE | · DIFFERENT NAMES OF SERVERS => PARALLELIZATION IS POSSIBLE · THE SAME NAMES OF SERVERS => PARALLELIZATION IS IMPOSSIBLE | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => PARALLELIZATION IS IMPOSSIBLE | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => PARALLELIZATION IS IMPOSSIBLE |
| OPERATION MODEL B SERVER REFERENCE | · DIFFERENT NAMES OF SERVERS => PARALLELIZATION IS POSSIBLE · THE SAME NAMES OF SERVERS => PARALLELIZATION IS IMPOSSIBLE | · DIFFERENT NAMES OF SERVERS => PARALLELIZATION IS POSSIBLE · THE SAME NAMES OF SERVERS => CHECKING STATE OF CONTROL TARGET (SERVER) BASED ON COLUMN a OF THIRD DETERMINATION CRITERION | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => CHECKING STATE OF CONTROL TARGET (SERVER) BASED ON COLUMN b OF THIRD DETERMINATION CRITERION | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => CHECKING STATE OF CONTROL TARGET (SERVER) BASED ON COLUMN b OF THIRD DETERMINATION CRITERION |
| OPERATION MODEL C RESOURCE CONTROL | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => PARALLELIZATION IS IMPOSSIBLE | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => CHECKING STATE OF CONTROL TARGET (SERVER) BASED ON COLUMN b OF THIRD DETERMINATION CRITERION | · DIFFERENT NAMES OF SERVERS => PARALLELIZATION IS POSSIBLE · THE SAME NAMES OF SERVERS => CHECKING PRESENCE OR ABSENCE OF RELATIONSHIP BETWEEN RESOURCES BASED ON SECOND DETERMINATION CRITERION | · DIFFERENT NAMES OF SERVERS => PARALLELIZATION IS POSSIBLE · THE SAME NAMES OF SERVERS => CHECKING PRESENCE OR ABSENCE OF RELATIONSHIP BETWEEN RESOURCES BASED ON SECOND DETERMINATION CRITERION |
| OPERATION MODEL D RESOURCE REFERENCE | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => PARALLELIZATION IS IMPOSSIBLE | · DIFFERENT NAMES OF SERVERS ; ABSENCE OF HIERARCHICAL RELATIONSHIP => PARALLELIZATION IS POSSIBLE · THE SAME NAMES OF SERVERS ; PRESENCE OF HIERARCHICAL RELATIONSHIP => CHECKING STATE OF CONTROL TARGET (SERVER) BASED ON COLUMN b OF THIRD DETERMINATION CRITERION | · DIFFERENT NAMES OF SERVERS => PARALLELIZATION IS POSSIBLE · THE SAME NAMES OF SERVERS => CHECKING PRESENCE OR ABSENCE OF RELATIONSHIP BETWEEN RESOURCES BASED ON SECOND DETERMINATION CRITERION | · DIFFERENT NAMES OF SERVERS => PARALLELIZATION IS POSSIBLE · THE SAME NAMES OF SERVERS => CHECKING PRESENCE OR ABSENCE OF RELATIONSHIP BETWEEN RESOURCES BASED ON SECOND DETERMINATION CRITERION |

FIG. 9

| SECOND DETERMINATION CRITERION | | | 32 |
|---|---|---|---|
| NAME OF RESOURCE / TYPE OF RESOURCE | NAMES OF RESOURCES THAT ARE TARGETS ARE THE SAME | NAMES OF RESOURCES THAT ARE TARGETS ARE DIFFERENT FROM EACH OTHER | |
| TYPES (ATTRIBUTES) OF RESOURCES ARE THE SAME | ·ONLY RESOURCE REFERENCE => CHECKING OF STATES OF CONTROL TARGET (RESOURCE) BASED ON COLUMN d OF THIRD DETERMINATION CRITERIA, AND OF TARGET (SERVER) THAT HAS HIERARCHICAL RELATIONSHIP TO CONTROL TARGET<br>·INCLUDING RESOURCE CONTROL => PARALLELIZATION IS IMPOSSIBLE | ·ONLY RESOURCE REFERENCE => CHECKING OF STATE OF TARGET (SERVER) THAT HAS HIERARCHICAL RELATIONSHIP TO CONTROL TARGET (RESOURCE) BASED ON COLUMN c OF THIRD DETERMINATION CRITERIA<br>·INCLUDING RESOURCE CONTROL => CHECKING OF STATES OF CONTROL TARGET (RESOURCE) BASED ON COLUMN d OF THIRD DETERMINATION CRITERIA, AND OF TARGET (SERVER) THAT HAS HIERARCHICAL RELATIONSHIP TO CONTROL TARGET | |
| TYPES OF RESOURCES (ATTRIBUTES) ARE DIFFERENT FROM EACH OTHER | ·ONLY RESOURCE REFERENCE => CHECKING OF STATE OF TARGET (SERVER) THAT HAS HIERARCHICAL RELATIONSHIP TO CONTROL TARGET (RESOURCE) BASED ON COLUMN c OF THIRD DETERMINATION CRITERION<br>·INCLUDING RESOURCE CONTROL => CHECKING OF STATES OF CONTROL TARGET (RESOURCE) BASED ON COLUMN d OF THIRD DETERMINATION CRITERIA, AND OF TARGET (SERVER) THAT HAS HIERARCHICAL RELATIONSHIP TO CONTROL TARGET | CHECKING OF STATE OF TARGET (SERVER) THAT HAS HIERARCHICAL RELATIONSHIP TO CONTROL TARGET (RESOURCE) BASED ON COLUMN c OF THIRD DETERMINATION CRITERION | |

FIG. 10

| DETERMINATION CRITERION \ RELATIONSHIP | THIRD DETERMINATION CRITERION | | | |
|---|---|---|---|---|
| | a | b | c | d |
| STATE OF SERVER IS INDEFINITE | PARALLELIZATION IS IMPOSSIBLE | PARALLELIZATION IS IMPOSSIBLE | PARALLELIZATION IS IMPOSSIBLE | PARALLELIZATION IS IMPOSSIBLE |
| STATE OF SERVER IS OTHER THAN INDEFINITE | PARALLELIZATION IS POSSIBLE | PARALLELIZATION IS POSSIBLE | PARALLELIZATION IS POSSIBLE | ·STATE OF RESOURCE IS INDEFINITE => PARALLELIZATION IS IMPOSSIBLE ·STATE OF RESOURCE IS OTHER THAN INDEFINITE => PARALLELIZATION IS POSSIBLE |

| WORKFLOW MANAGEMENT TABLE | | | | | | |
|---|---|---|---|---|---|---|
| WORKFLOW NUMBER | COMPONENT NUMBER | OPERATIONAL CONTROL COMPONENT NAME | NAME OF SERVER | NAME OF RESOURCE | OPERATION MODEL | NUMBER OF NEXT COMPONENT |
| 1 | 0 | Start | — | — | — | 1 |
| 1 | 1 | OS RESTARTING | VARIABLE 1 | — | A | 2 |
| 1 | 2 | CHECKING OF ACTIVATION OF SERVER | VARIABLE 1 | — | B | 3 |
| 1 | 3 | CHECKING OF ACTIVATION OF SERVICE | VARIABLE 1 | VARIABLE 2 | D | 4 |
| 1 | 4 | CREATION OF ACCOUNT | VARIABLE 1 | VARIABLE 3 | C | 5 |
| 1 | 5 | ACQUISITION OF ACCOUNT INFORMATION | VARIABLE 1 | VARIABLE 3 | D | 6 |
| 1 | 6 | CHECKING OF HOME DIRECTORY OF ACCOUNT | VARIABLE 1 | VARIABLE 3 | D | 7 |
| 1 | 7 | USER LOGIN | VARIABLE 1 | VARIABLE 3 | C | 999 |
| 1 | 999 | End | — | — | — | — |
| 2 | 0 | Start | — | — | — | 1 |
| 2 | 1 | STOPPING OF VIRTUAL SERVER | VARIABLE 4 | — | A | 2 |
| 2 | 1 | STOPPING OF VIRTUAL SERVER | VARIABLE 5 | — | A | 2 |
| 2 | 2 | ACTIVATION OF VIRTUAL SERVER | VARIABLE 4 | — | A | 999 |
| 2 | 2 | ACTIVATION OF VIRTUAL SERVER | VARIABLE 5 | — | A | 999 |
| 2 | 999 | End | — | — | — | — |
| ... | ... | ... | ... | ... | ... | ... |

FIG. 13

| OPERATIONAL CONTROL COMPONENT DEFINITION TABLE | | | | 112 |
|---|---|---|---|---|
| OPERATIONAL CONTROL COMPONENT NAME | CONTROL TARGET | CONTROL CONTENT | TARGET TYPE | |
| OS RESTARTING | SERVER | CONTROL | — | |
| CHECKING OF ACTIVATION OF SERVER | SERVER | REFERENCE | — | |
| CHECKING OF ACTIVATION OF SERVICE | RESOURCE | REFERENCE | Service, Account | |
| CREATION OF ACCOUNT | RESOURCE | CONTROL | Account | |
| ACQUISITION OF ACCOUNT INFORMATION | RESOURCE | REFERENCE | Account | |
| CHECKING OF HOME DIRECTORY OF ACCOUNT | RESOURCE | REFERENCE | Account | |
| USER LOGIN | RESOURCE | CONTROL | Account | |
| STOPPING OF VIRTUAL SERVER | SERVER | CONTROL | — | |
| ACTIVATION OF VIRTUAL SERVER | SERVER | CONTROL | — | |
| ... | ... | ... | ... | |

FIG. 14

| VARIABLE MANAGEMENT TABLE | | | | 113 |
|---|---|---|---|---|
| INSTANCE NUMBER | WORKFLOW NUMBER | VARIABLE NAME | VARIABLE VALUE | |
| 1 | 1 | VARIABLE 1 | X | |
| 1 | 1 | VARIABLE 2 | S | |
| 1 | 1 | VARIABLE 3 | Ac | |
| 2 | 2 | VARIABLE 4 | Y | |
| 2 | 2 | VARIABLE 5 | Z | |
| ... | ... | ... | ... | |

FIG. 17

OPERATION MODEL STATE MANAGEMENT TABLE 116

| NUMBER | INSTANCE NUMBER | WORKFLOW NUMBER | COMPONENT NUMBER | NAME OF RESOURCE | TYPE OF RESOURCE | STATE OF RESOURCE | NAME OF SERVER | STATE OF SERVER | OPERATION MODEL | POST-IMPROVEMENT NEXT-COMPONENT NUMBER |
|---|---|---|---|---|---|---|---|---|---|---|
| 1 | 1 | 1 | 0 | — | — | — | — | — | — | 1 |
| 2 | 1 | 1 | 1 | — | — | — | X | INDEFINITE | A | 2 |
| 3 | 1 | 1 | 2 | — | — | — | X | ON | B | 3 |
| 4 | 1 | 1 | 3 | S | Service Account | START | X | ON | D | 4 |
| 5 | 1 | 1 | 4 | Ac | Account | EXIST | X | ON | C | 5, 6 |
| 6 | 1 | 1 | 5 | Ac | Account | EXIST | X | ON | D | 7 |
| 7 | 1 | 1 | 6 | Ac | Account | EXIST | X | ON | D | 7 |
| 8 | 1 | 1 | 7 | Ac | Account | EXIST | X | ON | C | 999 |
| 9 | 1 | 1 | 999 | — | — | — | — | — | — | — |
| 10 | 2 | 2 | 0 | — | — | — | — | — | — | 1 |
| 11 | 2 | 2 | 1 | — | — | — | Y | STOP | A | 2 |
| 12 | 2 | 2 | 1 | — | — | — | Z | STOP | A | 2 |
| 13 | 2 | 2 | 2 | — | — | — | Y | STOP | A | 999 |
| 14 | 2 | 2 | 2 | — | — | — | Z | STOP | A | 999 |
| 15 | 2 | 2 | 999 | — | — | — | — | — | — | — |
| ... | ... | ... | ... | ... | ... | ... | ... | ... | ... | ... |

FIG. 18

| DEFINITION OF ATTRIBUTE OF TYPE OF RESOURCE, AND STATE TYPE | | | 116a |
|---|---|---|---|
| TYPE OF RESOURCE | ATTRIBUTE OF TYPE OF RESOURCE | STATE | |
| File | File.File | EXIST/NONE/INDEFINITE | |
| | File.Directory | EXIST/NONE/INDEFINITE | |
| Service | Service.File | EXIST/STOP/INDEFINITE | |
| | Service.Event | EXIST/STOP/INDEFINITE | |
| | Service.Job | EXIST/STOP/INDEFINITE | |
| | Service.Account | EXIST/STOP/INDEFINITE | |
| | Service.System | EXIST/STOP/INDEFINITE | |
| Process | Process.File | EXIST/STOP/INDEFINITE | |
| | Process.Event | EXIST/STOP/INDEFINITE | |
| | Process.Job | EXIST/STOP/INDEFINITE | |
| | Process.Account | EXIST/STOP/INDEFINITE | |
| | Process.System | EXIST/STOP/INDEFINITE | |
| Event | — | EXIST/NONE/INDEFINITE | |
| Job | — | EXIST/NONE/INDEFINITE | |
| Account | — | EXIST/NONE/INDEFINITE | |
| System | — | EXIST/NONE/INDEFINITE | |

| STATE TRANSITION DEFINITION TABLE | | | | |
|---|---|---|---|---|
| OPERATIONAL CONTROL COMPONENT NAME | STATE OF PRE-CONTROL SERVER | STATE OF POST-CONTROL SERVER | STATE OF PRE-CONTROL RESOURCE | STATE OF POST-CONTROL RESOURCE |
| OS RESTARTING | ON | INDEFINITE | — | — |
| OS RESTARTING | INDEFINITE | INDEFINITE | — | — |
| ... | ... | ... | ... | ... |
| CHECKING OF ACTIVATION OF SERVER | ON | ON | — | — |
| CHECKING OF ACTIVATION OF SERVER | INDEFINITE | ON | — | — |
| ... | ... | ... | ... | ... |
| CHECKING OF ACTIVATION OF SERVICE | — | — | START | START |
| CHECKING OF ACTIVATION OF SERVICE | — | — | INDEFINITE | START |
| ... | ... | ... | ... | ... |
| STOPPING OF VIRTUAL SERVER | ON | OFF | — | — |
| STOPPING OF VIRTUAL SERVER | OFF | OFF | — | — |
| STOPPING OF VIRTUAL SERVER | INDEFINITE | OFF | — | — |
| ... | ... | ... | ... | ... |
| ACTIVATION OF VIRTUAL SERVER | OFF | ON | — | — |
| ACTIVATION OF VIRTUAL SERVER | ON | ON | — | — |
| ACTIVATION OF VIRTUAL SERVER | INDEFINITE | ON | — | — |
| ... | ... | ... | ... | ... |

FIG. 20

PARALLEL EXECUTION DETERMINATION CRITERION DEFINITION TABLE ~118

| NUMBER | PRECEDING OPERATION MODEL | FOLLOWING OPERATION MODEL | DIFFERENT SERVERS | THE SAME SERVERS | THE SAME SERVERS/ THE SAME NAMES OF RESOURCES (THE SAME TYPES) | THE SAME SERVERS/ THE SAME NAMES OF RESOURCES (DIFFERENT TYPES) | THE SAME SERVERS/ DIFFERENT NAMES OF RESOURCES (THE SAME TYPES) | THE SAME SERVERS/ DIFFERENT NAMES OF RESOURCES (DIFFERENT TYPES) |
|---|---|---|---|---|---|---|---|---|
| 0 | A | A | POSSIBLE | IMPOSSIBLE | — | — | — | — |
| 1 | A | B | POSSIBLE | IMPOSSIBLE | — | — | — | — |
| 2 | A | C | POSSIBLE | IMPOSSIBLE | — | — | — | — |
| 3 | A | D | POSSIBLE | IMPOSSIBLE | — | — | — | — |
| 4 | B | A | POSSIBLE | IMPOSSIBLE | — | — | — | — |
| 5 | B | B | POSSIBLE | SUB-CRITERION J1 | — | — | — | — |
| 6 | B | C | POSSIBLE | SUB-CRITERION J2 | — | — | — | — |
| 7 | B | D | POSSIBLE | SUB-CRITERION J2 | — | — | — | — |
| 8 | C | A | POSSIBLE | IMPOSSIBLE | — | — | — | — |
| 9 | C | B | POSSIBLE | SUB-CRITERION J2 | — | — | — | — |
| 10 | C | C | POSSIBLE | — | IMPOSSIBLE | SUB-CRITERION J4 | SUB-CRITERION J4 | SUB-CRITERION J3 |
| 11 | C | D | POSSIBLE | — | IMPOSSIBLE | SUB-CRITERION J4 | SUB-CRITERION J4 | SUB-CRITERION J3 |
| 12 | D | A | POSSIBLE | IMPOSSIBLE | — | — | — | — |
| 13 | D | B | POSSIBLE | SUB-CRITERION J2 | — | — | — | — |
| 14 | D | C | POSSIBLE | — | IMPOSSIBLE | SUB-CRITERION J4 | SUB-CRITERION J3 | SUB-CRITERION J3 |
| 15 | D | D | POSSIBLE | — | SUB-CRITERION J4 | SUB-CRITERION J3 | SUB-CRITERION J3 | SUB-CRITERION J3 |

FIG. 21

| SUB-CRITERION DEFINITION TABLE ||||
|---|---|---|---|
| SUB-CRITERION ID | STATE OF TARGET SERVER | STATE OF TARGET RESOURCE | AVAILABILITY OR NON-AVAILABILITY OF PARALLEL EXECUTION |
| SUB-CRITERION J1 | INDEFINITE | — | IMPOSSIBLE |
| | OTHER THAN INDEFINITE | — | POSSIBLE |
| SUB-CRITERION J2 | INDEFINITE | — | IMPOSSIBLE |
| | OTHER THAN INDEFINITE | — | POSSIBLE |
| SUB-CRITERION J3 | INDEFINITE | — | IMPOSSIBLE |
| | OTHER THAN INDEFINITE | — | POSSIBLE |
| SUB-CRITERION J4 | INDEFINITE | — | IMPOSSIBLE |
| | OTHER THAN INDEFINITE | INDEFINITE | IMPOSSIBLE |
| | OTHER THAN INDEFINITE | OTHER THAN INDEFINITE | POSSIBLE |

| | | | | | 119 |
|---|---|---|---|---|---|
| SERVER STATE MANAGEMENT TABLE ||||||
| NUMBER | INSTANCE NUMBER | WORKFLOW NUMBER | NAME OF SERVER | STATE ||
| 1 | 1 | 1 | X | INDEFINITE ||
| 2 | 2 | 2 | Y | OFF ||
| 3 | 2 | 2 | Z | OFF ||
| ... | ... | ... | ... | ... ||

FIG. 23

| | | | | | | 120 |
|---|---|---|---|---|---|---|
| RESOURCE STATE MANAGEMENT TABLE |||||||
| NUMBER | INSTANCE NUMBER | WORKFLOW NUMBER | NAME OF SERVER | NAME OF RESOURCE | STATE ||
| 1 | 1 | 1 | X | S | INDEFINITE ||
| 2 | 1 | 1 | X | Ac | INDEFINITE ||
| ... | ... | ... | ... | ... | ... ||

FIG. 30

OPERATION MODEL STATE MANAGEMENT TABLE 116b

| NUMBER | INSTANCE NUMBER | WORKFLOW NUMBER | COMPONENT NUMBER | NAME OF RESOURCE | TYPE OF RESOURCE | STATE OF RESOURCE | NAME OF SERVER | STATE OF SERVER | OPERATION MODEL | POST-IMPROVEMENT NEXT-COMPONENT NUMBER |
|---|---|---|---|---|---|---|---|---|---|---|
| 1 | 1 | 1 | 0 | — | — | — | — | — | — | 1 |
| 2 | 1 | 1 | 1 | — | — | — | X | INDEFINITE | A | 2 |
| 3 | 1 | 1 | 2 | — | — | — | X | INDEFINITE | B | 3 |
| 4 | 1 | 1 | 3 | S | Service, Account | INDEFINITE | X | INDEFINITE | D | 4 |
| 5 | 1 | 1 | 4 | Ac | Account | INDEFINITE | X | INDEFINITE | C | 5 |
| 6 | 1 | 1 | 5 | Ac | Account | INDEFINITE | X | INDEFINITE | D | 6 |
| 7 | 1 | 1 | 6 | Ac | Account | INDEFINITE | X | INDEFINITE | D | 7 |
| 8 | 1 | 1 | 7 | Ac | Account | INDEFINITE | X | INDEFINITE | C | 999 |
| 9 | 1 | 1 | 999 | — | — | — | — | — | — | — |
| ... | ... | ... | ... | ... | ... | ... | ... | ... | ... | ... |

OPERATIONAL CONTROL MANAGEMENT APPARATUS AND OPERATIONAL CONTROL MANAGEMENT METHOD

CROSS-REFERENCE TO RELATED APPLICATION

This application is based upon and claims the benefit of priority of the prior Japanese Patent Application No. 2015-060690, filed on Mar. 24, 2015, the entire contents of which are incorporated herein by reference.

FIELD

The embodiments discussed herein are related to an operational control management apparatus, and an operational control management method.

BACKGROUND

In an information processing system, the number of operational management targets (for example, computers, software, or the like) has increased, and operational management work has become complicated. In order to make operational work efficient in the system, a software program is used that supports an operational control for the computer, the software program, or the like that is the operational management target. For example, the operational control includes activation, checking of activation, creation of setting information, or the like. The computer that executes the software program creates a workflow according to a user instruction. The workflow includes multiple operational controls and information on the order in which the multiple operational controls are executed. With the workflow, the operational control is automated, and thus operational work can be efficiently performed.

Incidentally, in order to accomplish a shortening of a certain processing sequence, some of the processing operations are parallelized. For example, a method of determining whether processing using parallel control ends within a shorter period of time than processing using sequential control is proposed. Furthermore, a print processing apparatus is also proposed that determines a possibility of parallel processing by determining whether each of the two successive image processing sequences is image processing that depends on a position of image data that has to be processed, or is image processing that is independent of the position of the image data.

Japanese Laid-open Patent Publication Nos. 2012-123688 and 10-337932 are examples of related art.

In order to complete execution of the workflow faster, it is thought that multiple operational controls that are included in the workflow are executed in parallel in multiple apparatuses that are operational management targets. In order to suitably determine whether the possibility of the parallel execution of each of the operational control components is determined, it is thought that a determination which results from combining priorities (the order) of all operational controls in terms of pre-processing and post-processing, and states (a state of a control target and a state of another target that has a hierarchical relationship to the control target) of all targets is made. However, because the number of combinations of all the states of the targets is enormous and the amount of computing is enormous, there is a problem in that, when processing is performed on all the combinations, it takes time to determine the possibility of the parallel execution and thus this is not realistic as a method of making a determination while the workflow is in execution.

On the other hand, in order to make a simple determination of the possibility of the parallel execution of the operational control components, it is also thought that, for example, based on the control content of and a control target of each of the operational control components, the operational control component is modeled prior to the execution of the workflow and the determination is made with only information that results from the modeling, while the workflow is in execution. However, when a relationship to the control target and a state of the control target that changes dynamically while the workflow is in execution are not considered, it is difficult to suitably determine whether the parallel execution is possible. For example, there occurs a problem in that it is difficult to clearly determine whether the parallel execution is possible and efficiency is not improved, or in that it is erroneously determined that the parallel execution is possible and the workflow does not correctly operate.

An object of an aspect of the present disclosure is to provide an operational control management program, an operational control management apparatus, and an operational control management method, in which a determination of a possibility of parallel execution is made possible while operational execution is in progress.

SUMMARY

According to an aspect of the embodiments, an operational control management method of determining a possibility of parallel execution of multiple operational controls that are included in a workflow, in which a computer performs processing includes judging whether a first operational control that is to be executed next and a second operational control that follows the first operational control are detailed determination targets, based on operation categorization information that results from categorizing each of the multiple operational controls based on an operation target and operation content; and determining a possibility of parallel execution based on relationships of the first operational control and the second operational control to the operation target and on operation situations of operation targets, with which the first and second operational controls are associated, in a case where the first operational control and the second operational control are the detailed determination targets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A, 6B, 6C, to 6D are diagrams, each of which illustrates an example of a format of an operation model;

FIG. 8 is a diagram illustrating an example of a first determination criterion;

FIG. 9 is a diagram illustrating an example of a second determination criterion;

FIG. 10 is a diagram illustrating an example of a third determination criterion;

FIG. 12 is a diagram illustrating an example of a workflow management table;

FIG. 13 is a diagram illustrating an example of the operational control component definition table;

FIG. 14 is a diagram illustrating an example of a variable management table;

FIG. 17 is a diagram illustrating an example of an operation model state management table;

FIG. 18 is a diagram illustrating an example of a definition of an attribute of a type of resource and an example of a state type;

FIG. 19 is a diagram illustrating an example of a state transition definition table;

FIG. 20 is a diagram illustrating an example of a parallel execution determination criterion definition table;

FIG. 21 is a diagram illustrating an example of a sub-criterion definition table;

FIG. 22 is a diagram illustrating an example of a server state management table;

FIG. 23 is a diagram illustrating an example of a resource state management table;

FIG. 30 is a diagram illustrating an example of an operation model state management table after the generation of the intermediate form;

DESCRIPTION OF EMBODIMENTS

<First Embodiment>

Figure 1:
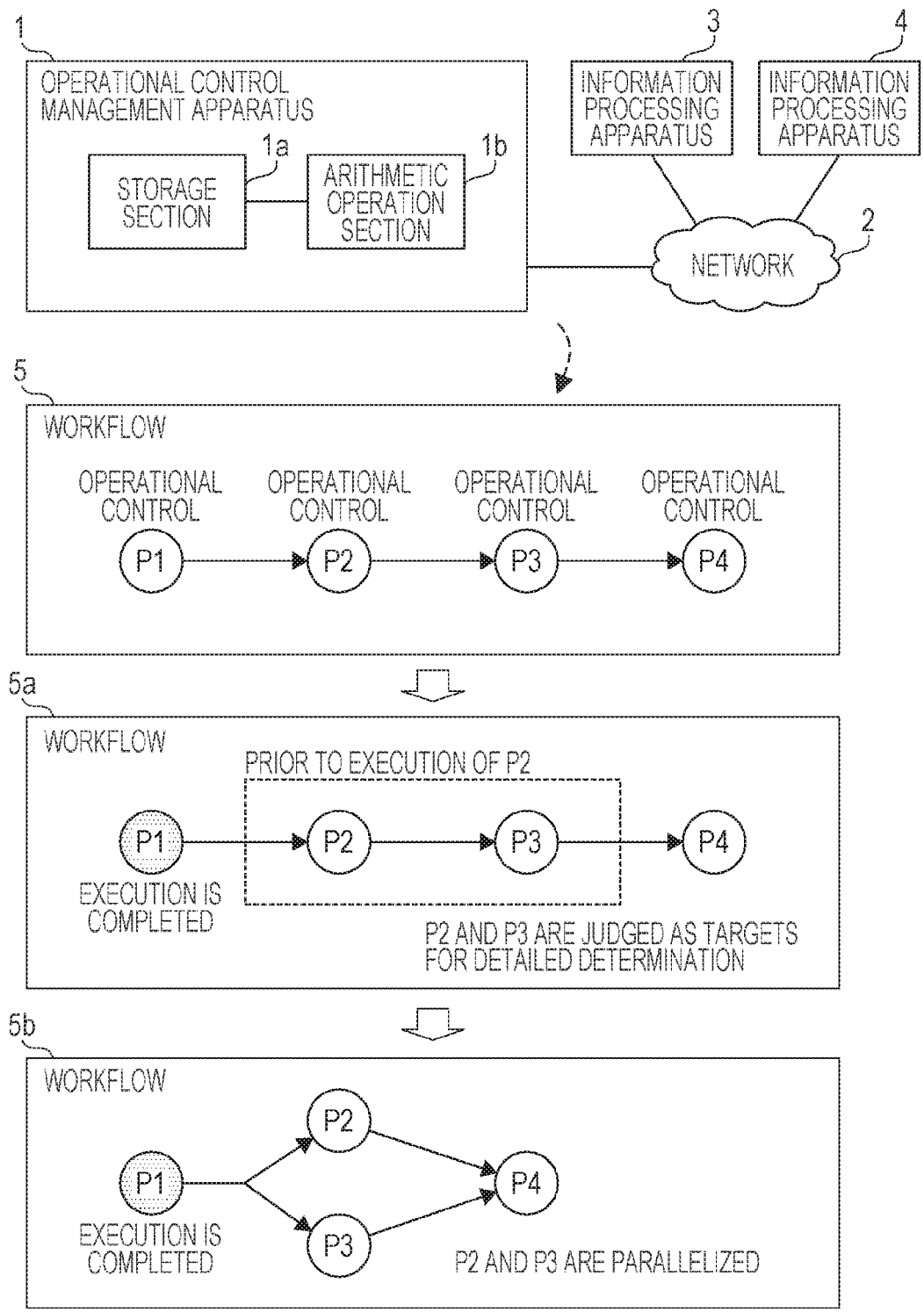
FIG. 1 is a diagram illustrating an operational control management apparatus according to a first embodiment.

The present embodiments will be described below referring to the drawings.

FIG. 1 is a diagram illustrating an operational control management apparatus according to a first embodiment. An operational control management apparatus 1 is connected to information processing apparatuses 3 and 4 through a network 2. The operational control management apparatus 1 performs operational management of the information processing apparatuses 3 and 4. Operational management targets on which the operational control management apparatus 1 performs operational management may be physical computers (which are also referred to as physical machines) such as the information processing apparatuses 3 and 4, and may be virtual computers (which are also referred to as virtual machines) that operate on the physical machines. The operational management targets on which the operational control management apparatus 1 performs the operational management include software programs such as an operation system (OS) and an application that are executed by the physical machine or the virtual machine.

The operational control management apparatus 1 manages the executing of an operational control on each of the operational management targets. The operational controls are, for example, various controls in a system operation, such as activation/stopping of the physical machine or the virtual machine, setting of operation parameters for the software program, activation/stopping of a service provided by the software program, backup acquirement, and electronic mail transmission.

In the information processing system, the operational management target is caused to execute a sequence of controls (for example, activation of an apparatus, activation of a service, creation of an account, and the like) that result from combining multiple operational controls. In the operational control management apparatus 1, the sequence of operational controls is managed by a workflow. The workflow is a set of multiple operational controls, and includes multiple pieces of operational control information. Each of the multiple operational controls that are included in the workflow is referred to as an operational control component. Furthermore, the workflow includes information on the order in which the multiple operational controls are executed. Information on the workflow is stored in advance in a storage section is by a system manager.

The operational control management apparatus 1 includes the storage section is and an arithmetic operation section 1b. The storage section is may be a volatile storage device such as a Random Access Memory (RAM), and may be a nonvolatile storage device such as a hard disk drive (HDD) or a flash memory. The arithmetic operation section 1b can include a central processing unit (CPU), a digital signal processor (DSP), an application specific integrated circuit (ASIC), a field programmable gate array (FPGA), and the like. The arithmetic operation section 1b may be a processor that executes a program. The "processor" here can also include a set (multiprocessor) of multiple processors.

Information on a workflow 5 is stored in the storage section 1a. The workflow 5 includes pieces of information on operational controls P1, P2, P3, and P4. The workflow 5 includes information indicating that the order in which the operational controls P1, P2, P3, and P4 are executed is this order: the operational controls P1, P2, P3, and P4. That is, according to the workflow 5, the operational controls P1, P2, P3, and P4 can be executed in series (sequentially).

The operational controls P1, P2, P3, and P4 may be operational controls of apparatuses (for example, the information processing apparatus 3) in common use, and may be operational controls of different apparatuses (for example, the operational control P1 and the operational control P2 are operational controls of the information processing apparatus 3 and the information processing apparatus 4, respectively).

Operation categorization information that results from categorizing each of the multiple operational controls based on an operation target and operation content is stored in the storage section 1a. The operation target is, for example, an entity (which is also referred to as a machine) that executes a software program, such as a physical machine or a virtual machine. Furthermore, the operation target may be, for example, a service that is provided by a software program, configuration information that is used for providing the service, or the like (which is also referred to as a resource). Because the resource is realized on the machine, the machine and the resource can be said to be under a hierarchical relationship. The operation content is, for example, determined according to the presence or absence of a change in a state of the operation target. For example, the operation content of the operational control that causes the change in the state of the operation target is defined as a "control", and the operation content of the operational control that does not cause the change in the state of the operation target is defined as a "reference".

In a case where the operational controls are categorized into two patterns of the operation target (the machine and the resource) and two patterns of the operation content (the control and the reference), the operational controls are categorized into 4 types (=2×2) of operation categories (models). More specifically, the operational control in a first operation category is an operational control that performs control (for example, activation or stopping) of the machine. The operational control in a second operation category is an operational control that makes a reference to the machine (for example, checking the activation, the stop, or the like). The operational control in a third operation category is an operational control that performs control on the resource (for example, the activation/stopping of the service, creation of a configuration file of the service, or the like). The operational control in a fourth operation category is an operational control that makes a reference to the resource (for example, checking the activation/stop of the service, the presence of the configuration file, or the like). For example, pieces of operation categorization information include operation categorization information on the operational control P1, operation categorization information on the operational control P2, operation categorization information on the operational control P3, and operation categorization information on the operational control P4.

When executing the workflow 5, the arithmetic operation section 1b judges whether a first operational control to be executed next and a second operational control that follows the first operational control are targets for detailed determination (whether the first operational control and the second operational control correspond to the targets for the detailed determination), based on the operation categorization information. At this point, making the detailed determination, as will be described below, means making the determination of the possibility of the parallel execution considering a relationship between the operation targets and states (operation situations) of the operation targets.

For example, in a stage prior to the execution of the operational control P1, the arithmetic operation section 1b checks whether the operational control P1 to be executed next and the operational control P2 that follows the operational control P1 are targets for the detailed determination of the possibility of the parallel execution, based on the operation categorization information. More details are as follows.

The operational controls P1 and P2 are, for example, operational controls on the machine in common use. The operational control P1 is an operational control (an operational control that performs control on the machine) in the first operation category. The operational control P2 is an operational control (an operational control that makes a reference to the machine) in the second operation category. In this case, the arithmetic operation section 1b judges that the operational controls P1 and P2 are not the targets for the detailed determination of the possibility of the parallel execution. This is because, in a case where the control (the operational control P1) is performed on a certain machine and then the reference (the operational control P2) to the certain machine is made, there is a high possibility that the latter (the operational control P2) will be an operational control on a result of the former (the operational control P1) and thus, even without making the detailed determination, it can be determined that the parallel execution is impossible.

Thus, the arithmetic operation section 1b executes the operational control P1 without parallelizing the operational controls P1 and P2 in the workflow 5. For example, the arithmetic operation section 1b instructs the machine to execute the operational control P1. The arithmetic operation section 1b receives a notification that the execution of the operational control P1 is completed, from the machine. Thus, the arithmetic operation section 1b assumes the operational control P1 to have been completed. A workflow 5a indicates a state (a state immediately prior to execution of the operational control P2) in which, among the operational controls P1, P2, P3, and P4, the operational control P1 has been executed and the operational controls P2, P3, and P4 are not in execution.

For example, after executing the operational control P1, a stage prior to the execution of the operational control P2, the arithmetic operation section 1b judges whether the operational control P2 to be executed next and the operational control P3 that follows the operational control P2 are the targets for the detailed determination of the possibility of the parallel execution, based on the operation categorization information. More details are as follows.

The operational controls P2 and P3 are operational controls on the machine in common use. The operational control P2, as described above, is the operational control (the operational control that makes a reference to the machine) in the second operation category. The operational control P3 is an operational control in the third operation category (an operational control that performs control on the resource). In this case, the arithmetic operation section 1*b* determines that the operational control P2 and P3 are the targets for the detailed determination of the possibility of the parallel execution. This is because, in a case where the reference (the operational control P2) is made to a certain machine and then the control (the operational control P3) is performed on the resource on the certain machine, there is a high possibility that the latter (the operational control P3) will start to be executed regardless of a result of the former (the operational control P2), without the former (the operational control P2) being accompanied by the changing of the machine.

In a case where the first operational control and the second operational control are the targets for the detailed determination of the possibility of the parallel execution, the arithmetic operation section 1*b* determines the possibility of the parallel execution based on a relationship in the operation target between the first and second operational controls and on an operation situation of the operation target with which the first and second operational controls are associated.

For example, the arithmetic operation section 1*b* makes the detailed determination of a possibility that the operational controls P2 and P3 will be executed in parallel, as follows. The operation target of the operational control P2 is the machine. The operation target of the operational control P3 is the resource on the machine. The machine and the resource are under the hierarchical relationship as described above. If the machine does not operate, the resource is difficult to use. The machine can be said to be at a lower level of the hierarchy than the resource, and the resource can be said to be at a higher level of the hierarchy. Therefore, whether the control on the resource is possible depends on an operation of the machine.

Accordingly, the arithmetic operation section 1*b* checks the operation situation of the machine (the machine that provides a resource that is the operation target of the operational control P3) that is the operation target of the operational control P2. For example, if the machine does not operate (that is, if the operation situation is not indefinite), the arithmetic operation section 1*b* determines that the execution of the operational control P3 is possible.

When it is determined that the parallel execution of the operational controls P2 and P3 is possible, the arithmetic operation section 1*b* parallelizes the operational controls P2 and P3 in the workflow 5*a*, and executes the operational controls P2 and P3. A workflow 5*b* indicates a state where, among the operational controls P1, P2, P3, and P4, the operational controls P2 and P3 are parallelized. For example, the arithmetic operation section 1*b* instructs the execution of the operational controls P2 and P3 on the machine. The arithmetic operation section 1*b* receives a notification that the execution of operational controls P2 and P3 is completed, from the machine. Thus, the operational controls P2 and P3 are assumed to have been executed. The next target to execute is the operational control P4. In this manner, the operational control management apparatus 1 narrows the operational control that is the target for the detailed determination of the possibility of the parallel execution, and thus makes it possible to determine the possibility of the parallel execution of the operational controls P2 and P3 while the workflow 5 is in execution.

In the example described above, in a case where the operation category of the operational control P2 is the operational control that makes a reference to the machine, and the operation category of the operational control is the operational control that performs control on the resource, the operational control P2 And the operational control P3 are set to be determined as the target for the detailed determination, but other cases are thought of as well. For example, in a case where the operation category of the operational control P2 is the operational control that performs control on (or makes a reference to) the resource and the operation category of the operational control P3 is the operational control that makes a reference to (performs control on) the resource, whether the operational control P2 and the operational control P3 are the targets for the detailed determination can be judged depending on whether target resources are the same. In this case, the arithmetic operation section 1*b* checks states of the machine that realize the target resource, and of the resource, and makes the detailed determination of the possibility of the parallel execution.

Incidentally, it is thought as well that, while the workflow 5 is in execution, the determination of the possibility of the parallel execution that results from combining priorities (the order) of the operational controls and states (a state of an operation target or a state of another target that has a hierarchical relationship to the operation target) of all targets is made for all the operational controls. Incidentally, the number of combinations of the states of the targets is enormous. Thus, when processing is performed on all the combinations, this takes time to determine the possibility of the parallel execution, and thus, is not realistic. That is, there is a concern that it will take too much time to finish the workflow 5 because determination processing is performed on the enormous number of combinations while the workflow 5 is in execution.

On the other hand, it is thought as well that prior to the execution of the workflow, the determination of the possibility of the parallel execution of the operational control components is made and a pattern of which the parallel execution is possible is created in advance. However, because the state of the operation target and the like are considered while the workflow is actually in execution, it is not easy to clearly determine whether the parallel execution is possible, and the precision of a result of the determination of the possibility of the parallel execution is low. For example, when multiple operational controls are parallelized without considering the states of the operation targets, there is a high possibility that an error will occur in any one of the operational controls.

Accordingly, the operational control management apparatus 1 makes a determination of the possibility of the parallel execution in stages, by combining a portion (an operation category, such as the machine or the resource) of which the determination is possible with static information that is set in advance and a portion (a state of the resource or the machine) that, if not checked dynamically, is difficult to determine. With the operational control management apparatus 1, the possibility of the parallel execution may not be determined in advance for all pairs of operational control components, or while the workflow is in execution, the possibility of the parallel execution may not be verified for all the pairs of operational control components. If the operational control components are categorized in advance to some extent, the pairs of operational control components that are set to be the targets for the detailed determination of the possibility of the parallel execution are narrowed by an operation categorization relationship between both of the operational control components. Accordingly, a processing cost that accompanies the determination of the possibility of the parallel execution can be saved much more than when the determination of the possibility of the parallel execution is made for the combinations of the states of all the targets. As a result, the determination of the possibility of the parallel execution of each operational control is efficiently made while the workflow 5 is in execution.

<Second Embodiment>

Figure 2:
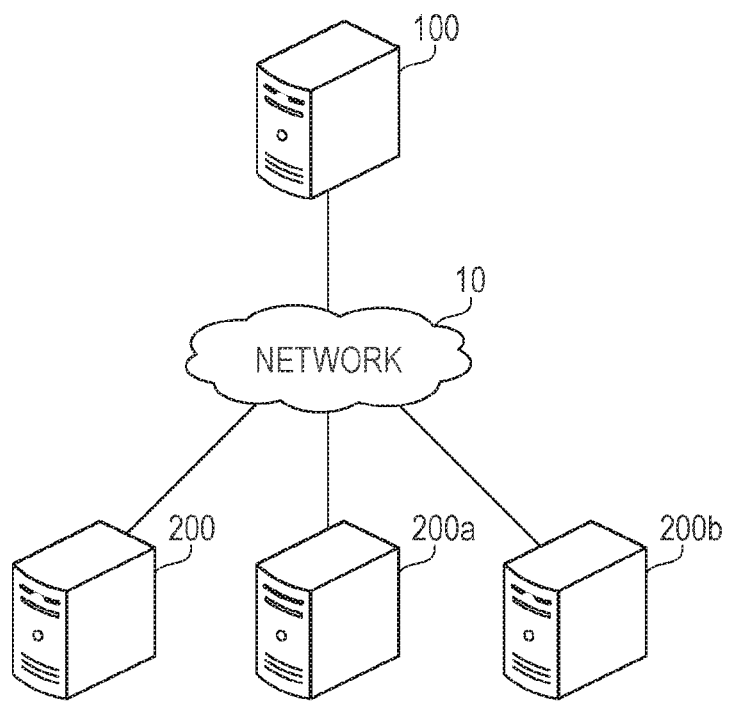
FIG. 2 is a diagram illustrating an example of an information processing system according to a second embodiment.

FIG. 2 is a diagram illustrating an example of an information processing system according to a second embodiment. The information processing system according to the second embodiment includes an operational server 100 and business servers 200, 200a, and 200b. The operational server 100 and the business servers 200, 200a, and 200b are connected to a network 10. The network 10, for example, a local area network (LAN). The network 10 may be connected to the Internet or a wide area network (WAN).

The operational server 100 is a server computer that performs the operational management of business servers 200, 200a, and 200b. The operational server 100 manages the execution of the operational control on the business servers 200, 200a, and 200b.

The business servers 200, 200a, and 200b are computer servers that execute processing of user business. For example, the business servers 200, 200a, and 200b executes an application that supports the processing of the user business. A user can use serviced that are provided by the business servers 200, 200a, and 200b, by operating a client computer (of which an illustration is omitted) that is connected to the network 10.

The business servers 200, 200a, and 200b may be personal computers that execute the virtual machine. In this case, for example, the business servers 200, 200a, and 200b executes a software program that is called a hypervisor. The hypervisor assigns a processing capability of a CPU that is included in each of the business servers 200, 200a, and 200b that are physical computers, or a storage area of a RAM, as a resource for an arithmetic operation, to a virtual machine that operates in each of the business servers 200, 200a, and 200b. An application on each of the business servers 200, 200a, and 200b may be executed by the virtual machine.

The business servers 200, 200a, and 200b execute processing according to an instruction from the operational server 100. The business servers 200, 200a, and 200b each have an agent function of receiving an instruction from the operational server 100, controlling the execution of processing, or notifying the operational server 100 of a result of the execution of the processing.

Figure 3:
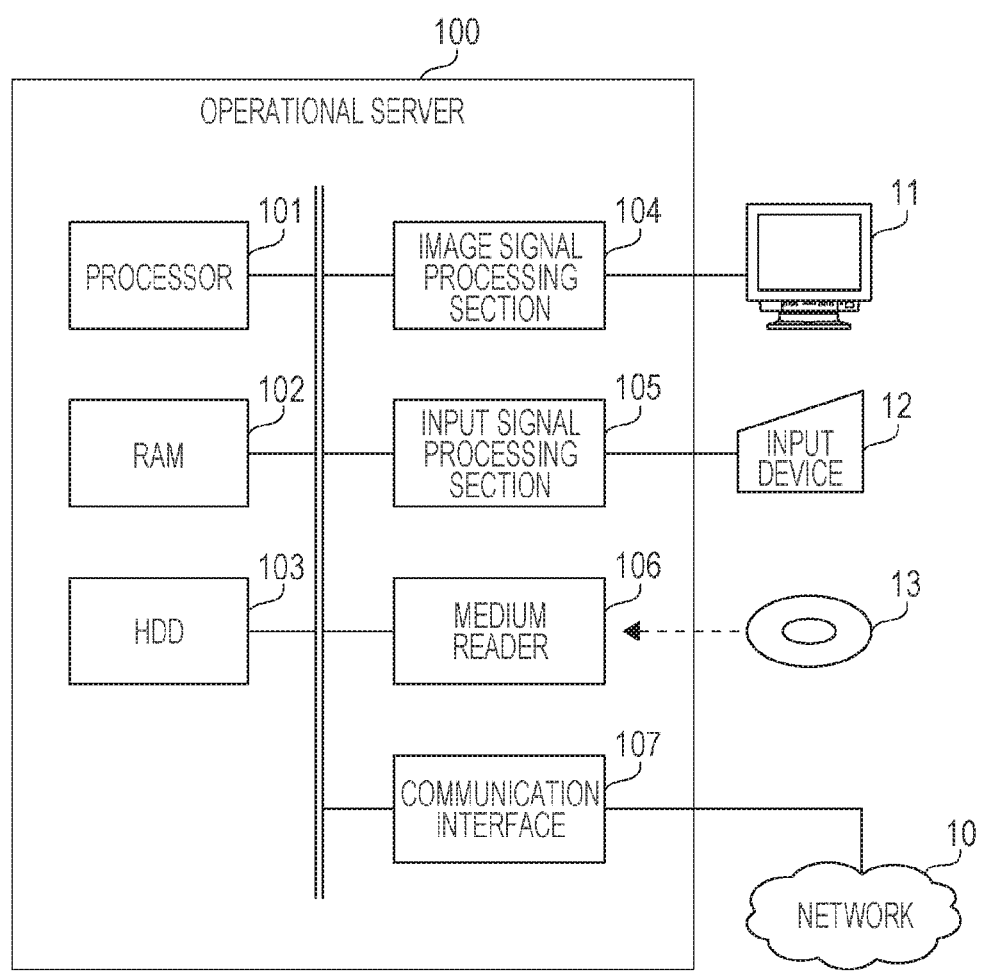
FIG. 3 is a diagram illustrating an example of hardware sections of an operational server.

FIG. 3 is a diagram illustrating an example of hardware sections of an operational server 100. The operational server 100 has a processor 101, a RAM 102, a HDD 103, an image signal processing section 104, an input signal processing section 105, a medium reader 106, and the communication interface 107. Each of the sections is connected to a bus of the operational server 100. The business servers 200, 200a, and 200b can also be realized using the same sections as those of the operational server 100.

The processor 101 controls information processing by the operational server 100. The processor 101 may be a multi-processor. The processor 101 is, for example, a CPU, a DSP, an ASIC, or an FPGA. The processor 101 may be a combination of at least two or more of the CPU, the DSP, the ASIC, and the FPGA.

The RAM 102 is a main storage device of the operational server 100. An OS program and at least one or more of application programs that are executed by the processor 101 are temporarily stored in the RAM 102. Furthermore, various pieces of data that is used for the processing by the processor 101 are stored in the RAM 102.

The HDD 103 is an auxiliary storage device of the operational server 100. Data is magnetically read from and written to magnetic disks built into the HDD 103. The OS program, the application programs, and various pieces of data are stored in the HDD 103. The operational server 100 may include a different type of auxiliary storage device, such as a flash memory or a solid state drive (SSD), and may include multiple auxiliary storage devices.

According to a command from the processor 101, the image signal processing section 104 outputs an image to a display 11 that is connected to the operational server 100. As the display 11, a cathode ray tube (CRT) display, a liquid crystal display, or the like can be used.

The input signal processing section 105 acquires an input signal from an input device 12 that is connected to the operational server 100, and outputs the acquired input signal to the processor 101. As the input device 12, for example, a pointing device such as a mouse or a touch panel, a keyboard, or the like can be used.

The medium reader 106 is a device that reads from a program or data that is recorded in a recording medium 13. As the recording medium 13, for example, a magnetic disk such as a flexible disk (FD) or a HDD, an optical disk such as a compact disc (CD), or a digital versatile disc (DVD), and a magneto-optical (MO) disk can be used. Furthermore, as the recording medium 13, for example, a nonvolatile semiconductor memory can be used such as a flash memory card. According to a command from the processor 101, the medium reader 106, for example, a program or data that is read from the recording medium 13 is stored in the RAM 102 or the HDD 103.

The communication interface 107 communicates with another apparatus that is connected to the business servers 200, 200a, and 200b through the network 10. The communication interface 107 may be a wired communication interface, and may be a wireless communication interface.

Figure 4:
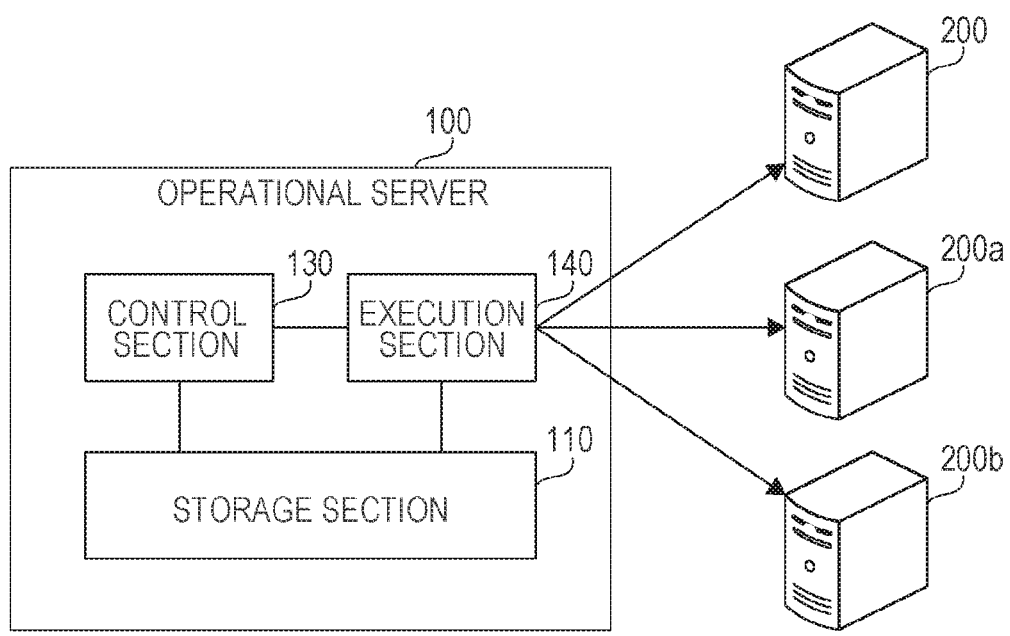
FIG. 4 is a diagram illustrating a functional example of the operational server.

FIG. 4 is a diagram illustrating a functional example of an operational server. The operational server 100 has a storage section 110, a control section 130, and an execution section 140. The storage section 110 is realized as a storage area that is secured by the RAM 102 or the HDD 103. The control section 130 and the execution section 140 are realized by the processor 101 executing a program that is stored in the RAM 102.

Various pieces of information that are used for processing by each of the control section 130 and the execution section 140 are stored in the storage section 110. Pieces of information that are stored in the storage section 110 include workflow definition information, information for managing the execution of the workflow, and information that is used for the determination of the possibility of the parallel execution of the operational control components that are included in the workflow. Furthermore, information on a command for executing processing in the operational control component, information for designating the business server 200, 200a, and 200b and transmitting a command, or the like is stored in advance in the storage section 110.

The control section 130 controls the execution of the workflow by the execution section 140. The control section 130 may be made to cause the execution section 140 to start to execute the workflow by receiving an instruction for the execution of the workflow through user control input. The control section 130 may cause the execution section 140 to start to execute the workflow at the timing that is scheduled.

Based on information that is stored in the storage section 110, while the workflow is in execution, the control section 130 determines the possibility of the parallel execution of the first operational control to be executed next and the second operational control that follows the first operational control. In a case where it is determined that there is a possibility that the first and second operational controls will be executed in parallel, the control section 130 instructs the execution section 140 to execute the first and second operational controls in parallel. In a case where it is determined that there is a possibility that the first and second operational controls will not be executed in parallel, the control section 130 instructs the execution section 140 to execute the first operational control.

The execution section 140 execute the workflow according to the instruction from the control section 130. The execution of the workflow includes causing a target machine to execute the operational control that is included in the workflow. In a case where the control section 130 instructs the execution 140 to execute the first and second operational controls in parallel, the execution section 140 causes the target machine (in some cases, the same target machines are present or different target machines are present) to execute the first and second operational controls in parallel.

Figure 5:
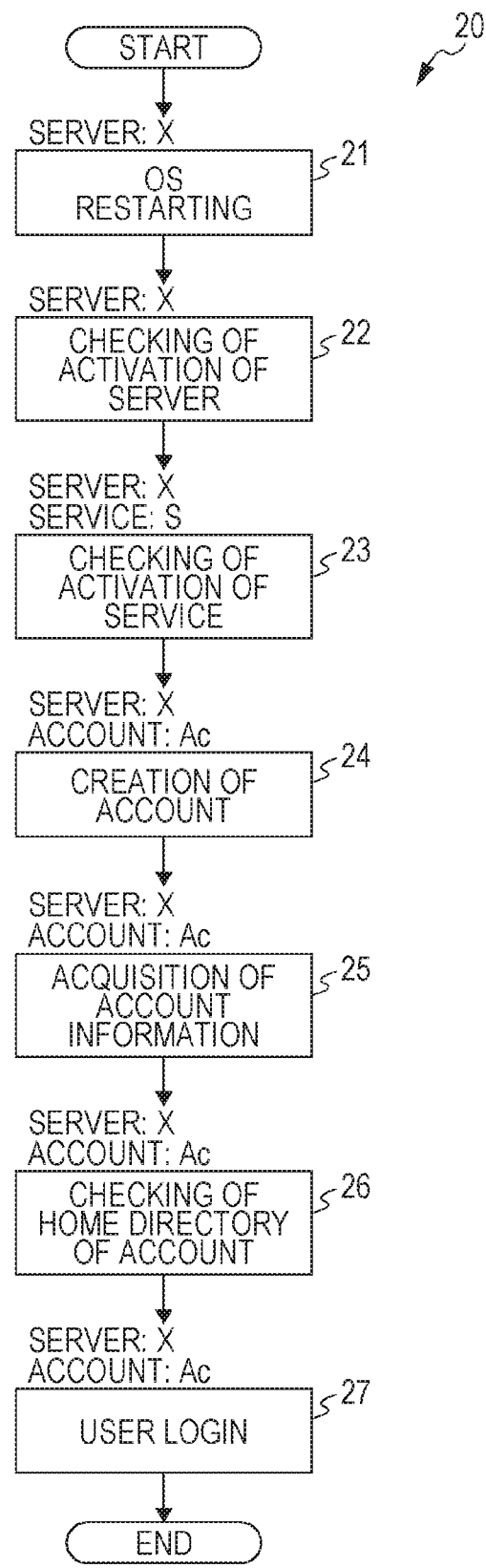
FIG. 5 is a diagram illustrating an example of a workflow.

FIG. 5 is a diagram illustrating an example of the workflow. The first operational control component "Start" of a workflow 20 indicates starting of the workflow (for example, initiates starting processing in the operational server 100 prior to the execution of the workflow 20). The last operational control component "End" of the workflow 20 indicates ending of the workflow (for example, indicates ending processing in the operational server 100 after the execution of the workflow 20).

The workflow 20 includes operational control components 21, 22, 23, 24, 25, 26, and 27 between operational control components "Start" and "End." The workflow 20 is a workflow for performing the operational control components 21, 22, 23, 24, 25, 26, and 27 in series in this order.

The operational control component 21 is OS restarting. The operational control component 21 is assigned "X" as a name of a server for a control target (which can also be said to be an "operation target"). The operational control component 22 is checking of activation of the server. The operational control component 22 is assigned "X" as the name of the server that is the control target.

The operational control component 23 is checking of activation of the service. The operational control component 23 is assigned "X" as the name of the server that is the control target. The operational control component 23 is assigned "S" as the name of the service that is the control target.

The operational control component 24 is creation of an account. The operational control component 24 is assigned "X" as the name of the server that is the control target. The operational control component 24 is assigned "Ac" as a name of an account that is the control target.

The operational control component 25 is acquisition of account information. The operational control component 25 is assigned "X" as the name of the server that is the control target. The operational control component 25 is assigned "Ac" as the name of the account that is the control target.

The operational control component 26 is checking of a home directory of the account. The operational control component 26 is assigned "X" as the name of the server that is the control target. The operational control component 26 is assigned "Ac" as the name of the account that is the control target.

The operational control component 27 is user login. The operational control component 27 is assigned "X" as the name of the server that is the control target. The operational control component 27 is assigned "Ac" as the name of the account that is the control target.

At this point, each operational control component is categorized into multiple operation models. FIGS. 6A and 6D are diagrams, each of which illustrates an example of a format of an operation model. The control target and control content (which can also be said to be operation content) are included in operational control component information. The operational server 100 categorizes the control target and the control content as follows.

The operational server 100 categorizes the control target of the operational control components into "servers" and "resources." The "server" may be a physical computer (a physical machine) such as the business server 200, and may be a virtual computer (a virtual machine) that operates on the business server 200. The "resources" are categorized into various types (types of resource), such as pieces of information that are used for execution of a software program, or processes that are generated with the execution of the software. The control target is identified by the name of the server and the name of the resource. The names of resource include names of types, such as a name of the service, the name of the account, a name of a file, and a name of a process. The "resource" is realized on the "server." For this reason, the designation of the "resource" also includes the designation of the "server."

The operational server 100 categorizes the control content" into "controls" and "reference" according to the presence or absence of a change in a state of a target for the control by the operational control component. The "control" changes the state (the operation situation) of the control target. For example, activation of, stopping of and change of a configuration of the server changes a state of the server that is the control target (changes the state of the server from being activated to being stopped, from being stopped to being activated, from having a pre-setting file to having a post-setting file, and so forth). Furthermore, update of, generation of, deletion of the resource changes the state (the operation situation) of the resource that is the control target (changes the state of the resource) from having a pre-update file to having a post-update file, from having no file to having a file, from having a file to having no file, and so forth. The "reference" does not change the state of the control target. For example, because the checking of the state of the server is performed only for checking, this does not change the state of the server that is the control target. Furthermore, because the checking of the state of the resource is also performed only for checking, this does not change the state of the resource that is the control target.

As described above, the operational server 100 categorizes the control target of the operational control component into two types, that is, "servers" and "resources", and categorizes the content of the operational control component into two types, that is, "controls" and "references". Then, the operational server 100 categorizes each of the operational control components into 4 types (=2×2) of operation models.

FIG. 6A illustrates an operation model A. The operation model A is an operation model in which the "control" is performed on the "server". The "control on the "server" is described below as being referred to as a "server control".

FIG. 6B illustrates an operation model B. The operation model B is an operation model in which the "reference" is made to the "server". The "reference to the "server" is described below as being referred to as a "server reference".

FIG. 6C illustrates an operation model C. The operation model C is an operation model in which the "control" is performed on the "resource." The "control" on the "resource" is described below as being referred to as a "resource control".

FIG. 6D illustrates an operation model D. The operation model D is an operation model in which the "reference" is made to the "resource". The "reference" to the "resource" is described below as being referred to as a "resource reference."

Figure 7:
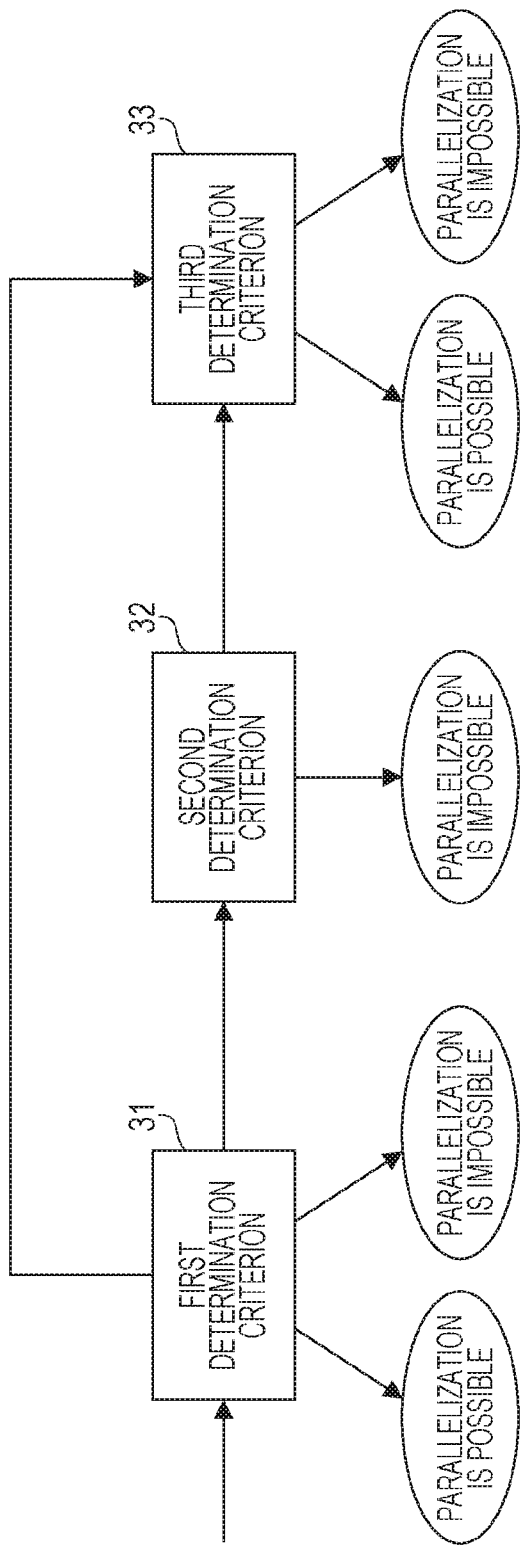
FIG. 7 is a diagram illustrating an example of a procedure for determining a possibility of parallel execution.

FIG. 7 is a diagram illustrating an example of a procedure for determining the possibility of the parallel execution. When the workflow is executed, there is a possibility that the state of the control target will change with the passage of time, and, in some cases, the state of the control target is indefinite. In a case where there is a relationship to the control target and the state of the control target is indefinite, when the parallel execution takes place, there is a possibility that the workflow will not operate correctly. For this reason, the operational server 100 takes into consideration a relationship between the server that is the control target and the resource, and the state at the time of the determination when determining the possibility of the parallel execution.

The operational server 100 stores information on the operation model that results from taking into consideration the hierarchical relationship to the control target and the state of the control target (and another target that has a hierarchical relationship to the control target), and information on determination criterion for the possibility of the parallel execution that is based on the operation model. Based on the information on the operation model and the information on the determination criterion, the operational server 100 determines the possibility of the parallel execution of the operational control components.

Pieces of information on the determination criterion include pieces of information on a first determination criterion 31, a second determination criterion 32, and a third determination criterion 33. The first determination criterion 31 is a criterion for determining the possibility of the parallel execution of the operational control components based on a structure of the operation model. The first determination criterion 31 include a determination criterion in accordance with relationships among the operation models that are illustrated in FIGS. 6A to 6D.

The second determination criterion 32 is a criterion for determining the possibility of the parallel execution of the operational control components based on the structure of the operation model. The second determination criterion 32 include a determination criterion in accordance with a relationship in terms of the name of the resource or the type of the resource. The first determination criterion 31 and the second determination criterion 32 can be said to be determination criteria for making a determination based on static information.

The third determination criterion 33 is a criterion for determining the possibility of the parallel execution of the operational control components based on the state of the control target. In a case where it is determined from the first determination criterion 31 or the second determination criterion 32 that the relationship (the hierarchical relationship) to the control target is present, the operational server 100 checks the control target (resource) or the state of the target (the server) that has the hierarchical relationship to the control target, and determines the possibility of the parallel execution in compliance with the third determination criterion. The third determination criterion 33 can be said to be a determination criterion for making a determination based on the dynamic information at the time of the determination.

FIG. 8 is a diagram illustrating an example of the first determination criterion. The first determination criterion 31 include information on the determination criterion for the possibility of the parallel execution for a preceding operation model (an operation model of the preceding operational control component) and a following operation model (an operation model of the following operational control component). Specifically, the following pieces of information are included.

In a case where the preceding operation model is the operation model A and the following operation model is the operation model A, the determination is made as follows. If the names of the servers that are the control targets are different from each other, the parallel execution is possible (in the drawing, the parallel execution is described as being possible in the drawings). If the names of the servers that are the control targets are the same, the parallel execution is impossible (in the drawing, the parallel execution is described as being impossible in the drawings).

In a case where the preceding operation model is the operation model B, and the following operation model is the operation model A, the determination is made as follows. If the names of the servers that are the control targets are different from each other, the parallel execution is possible. If the names of the servers that are the control targets are the same, the parallel execution is impossible.

In a case where the preceding operation model is the operation model C, and the following operation model is the operation model A, the determination is made as follows. If the names of the servers that are the control targets are different from each other, the parallel execution is possible. In this case, the resource that is the control target in the operation model C (the preceding operational control component) and the server that is the control target in the operation model A (the following operational control component) can be said not to be under the hierarchical relationship. If the names of the servers that are the control targets are the same, the parallel execution is impossible. In this case, the resource that is the control target in the operation model C (the preceding operational control component) and the server that is the control target in the operation model A (the following operational control component) can be said to be under the hierarchical relationship.

In a case where the preceding operation model is the operation model D, and the following operation model is the operation model A, the determination is made as follows. If the names of the servers that are the control targets are different from each other, the parallel execution is possible (the control targets of both of the operational control components are not under the hierarchical relationship). If the names of the servers that are the control targets are the same, the parallel execution is impossible (the control targets of both of the operational control components are under the hierarchical relationship).

In a case where the preceding operation model is the operation model A and the following operation model is the operation model B, the determination is made as follows. If the names of the servers that are the control targets are different from each other, the parallel execution is possible. If the names of the servers that are the control targets are the same, the parallel execution is impossible.

In a case where the preceding operation model is the operation model B and the following operation model is the operation model B, the determination is made as follows. If the names of the servers that are the control targets are different from each other, the parallel execution is possible. If the names of the servers that are the control targets are the same, the state of the control target (the server) is checked based on a column a (which is illustrated in FIG. 10) of the third determination criterion 33, and the possibility of the parallel execution is determined anew according to a result of the checking (the target on which this processing is performed is set to be the target for the detailed determination).

In the case where the preceding operation model is the operation model C and the following operation model is the operation model B, the determination is made as follows. If the names of the servers that are the control targets are different from each other, the parallel execution is possible (the control targets of both of the operational control components are not under the hierarchical relationship). If the names of the servers that are the control targets are the same (the control targets of both of the operational control components are under the hierarchical relationship), the state of the control target (the server) is checked based on a column b of the third determination criterion 33, and the possibility of the parallel execution is determined anew according to a result of the checking (the target on which this processing is performed is set to be the target for the detailed determination).

In a case where the preceding operation model is the operation model D and the following operation model is the operation model B, the determination is made as follows. If the names of the servers that are the control targets are different from each other, the parallel execution is possible (the control targets of both of the operational control components are not under the hierarchical relationship). If the names of the servers that are the control targets are the same (the control targets of both of the operational control components are under the hierarchical relationship), the state of the control target (the server) is checked based on a column b of the third determination criterion 33, and the possibility of the parallel execution is determined anew according to a result of the checking (the target on which this processing is performed is set to be the target for the detailed determination).

In a case where the preceding operation model is the operation model A and the following operation model is the operation model C, the determination is made as follows. If the names of the servers that are the control targets are different from each other, the parallel execution is possible (the control targets of both of the operational control components are not under the hierarchical relationship). If the names of the servers that are the control targets are the same, the parallel execution is impossible (the control targets of both of the operational control components are under the hierarchical relationship).

In a case where the preceding operation model is the operation model B and the following operation model is the operation model C, the determination is made as follows. If the names of the servers that are the control targets are different from each other, the parallel execution is possible (the control targets of both of the operational control components are not under the hierarchical relationship). If the names of the servers that are the control targets are the same, the state of the control target (the server) is checked based on the column b of the third determination criterion 33, and the possibility of the parallel execution is determined anew according to a result of the checking (the target on which this processing is performed is set to be the target for the detailed determination).

In a case where the preceding operation model is the operation model C and the following operation model is the operation model C, the determination is made as follows. If the names of the servers that are the control targets are different from each other, the parallel execution is possible. If the names of the servers that are the control targets are the same, the presence and absence of a relationship between the resources that are the control targets is checked based on the second determination criterion 32 (which is illustrated in FIG. 9), and the possibility of the parallel execution is determined anew according to a result of the checking.

In a case where the preceding operation model is the operation model D and the following operation model is the operation model C, the determination is made as follows. If the names of the servers that are the control targets are different from each other, the parallel execution is possible. If the names of the servers that are the control targets are the same, the presence or absence of the relationship between the resources that are the control targets is checked based on the second determination criterion 32, and the possibility of the parallel execution is determined anew according to a result of the checking.

In a case where the preceding operation model is the operation model A and the following operation model is the operation model D, the determination is made as follows. If the names of the servers that are the control targets are different from each other, the parallel execution is possible (the control targets of both of the operational control components are not under the hierarchical relationship). If the names of the servers that are the control targets are the same, the parallel execution is impossible (the control targets of both of the operational control components are under the hierarchical relationship).

In a case where the preceding operation model is the operation model B and the following operation model is the operation model D, the determination is made as follows. If the names of the servers that are the control targets are different from each other, the parallel execution is possible (the control targets of both of the operational control components are not under the hierarchical relationship). If the names of the servers that are the control targets are the same, the state of the control target (the server) is checked based on the column b of the third determination criterion 33, and the possibility of the parallel execution is determined anew according to a result of the checking (the target on which this processing is performed is set to be the target for the detailed determination).

In a case where the preceding operation model is the operation model C and the following operation model is the operation model D, the determination is made as follows. If the names of the servers that are the control targets are different from each other, the parallel execution is possible. If the names of the servers that are the control targets are the same, the presence or absence of the relationship between the resources that are the control targets is checked based on the second determination criterion 32, and the possibility of the parallel execution is determined anew according to a result of the checking.

In a case where the preceding operation model is the operation model D and the following operation model is the operation model D, the determination is made as follows. If the names of the servers that are the control targets are different from each other, the parallel execution is possible. If the names of the servers that are the control targets are the same, the presence or absence of the relationship between the resources that are the control targets is checked based on the second determination criterion 32, and the possibility of the parallel execution is determined anew according to a result of the checking.

FIG. 9 is a diagram illustrating an example of the second determination criterion. The second determination criterion 32 include the information on the determination criterion for the possibility of the parallel execution of two operational control components that are determination targets for the possibility of the parallel execution, in accordance with the relationship between the resources that are the control targets. The relationship between the resources is expressed according to a result of comparing the name of the resource and the type of the resource. That is, the relationships between the resources are categorized into four cases.

In a first case, in the two operational control components that are the determination targets for the possibility of the parallel execution, the names of the resources that are the control targets are the same, and the types of the resources that are the control targets are the same. In a second case, the names of the resources that are the control targets are different from each other, and the types of the resources that are the control targets are the same. In a third case, the names of the resources that are the control targets are the same, and the types of the resource that are the control targets are different from each other. In a fourth case, the names of the resources that are the operation targets are different from each other, and the types of the resources that are the operation targets are different from each other.

At this point, as the type of the resource, the type of the resource that has an attribute and the type of the resource that has not the attribute are present. The attribute is information by which the types of the resources are subcategorized for resource processing targets. When the attributes of the types of the resources are considered, whether the types of the resources are the same is determined as follows.

First, there is a case where both of the types of the resources that are the control targets of the preceding operational control component and the following operational control component have attributes. In this case, the attributes of both of the types of the resources are compared. If the attributes are consistent with each other, the types of the resources are the same. If the attributes are not consistent with each other, the types of the resources are different from each other.

Next, there is a case where only any one of the types of the resources that are the control targets of the preceding operational control component and the following operational control component has an attribute. In this case, the attribute of the type of the resource that has not the attribute and the attribute of the type of the resource that has the attribute are compared. If the attributes are consistent with each other, the types of the resources are the same. If the attributes are not consistent with each other, the types of the resources are different from each other.

Additionally, there is a case where both of the types of the resources that are the control targets of the preceding operational control component and the following operational control component do not have attributes. In this case, both of the types of the resources are compared. If both of the types of the resources are consistent with each other, the types of the resources are the same. If both of the types of the resources are not consistent with each other, the types of the resources are different from each other.

The second determination criterion 32 includes the following determination criterion. In a case where the names of the resources that are the control target are the same and the types of the resources are the same (in a first case), the determination is made as follows. If any one of the operational control components is only the resource reference, the control target (the resource) based on a column d of the third determination criterion 33, and the state of the target (the server) that has the hierarchical relationship to the control target are checked, and the possibility of the parallel execution is determined anew according to a result of the checking (the target on which this processing is performed is set to be the target for the detailed determination). If any one of the operational control components includes the resource control, the parallel execution is impossible.

In a case where the names of the resources that are the control targets are different from each other and the types of the resources that are the control targets are the same (in a second case), the determination is made as follows. In a case where any one of the operational control components is only the resource reference, the state of the target (the server) that has the hierarchical relationship to the control target (the resource) based on a column c of the third determination criterion 33 is checked, and the possibility of the parallel execution is determined anew according to a result of the checking. If any one of the operational control components includes the resource control, the control target (the resource) based on the column d of the third determination criterion 33, and the state of the target (the server) that has the hierarchical relationship to the control target are checked, and the possibility of the parallel execution is determined anew according to a result of the checking.

In a case where the names of the resources that are the control targets are the same and the types of the resources that are the control targets are different from each other (in a third case), the determination is made as follows. If any one of the operational control components is only the resource reference, the state of the target (the server) that has the hierarchical relationship to the control target (the resource) based on the column c of the third determination criterion 33 is checked, and the possibility of the parallel execution is determined anew according to a result of the checking. If any one of the operational control components includes the resource control, the control target (the resource) based on the column d of the third determination criterion 33, and the state of the target (the server) that has the hierarchical relationship to the control target are checked, and the possibility of the parallel execution is determined anew according to a result of the checking.

In a case where the names of the resources that are the operation targets are different from each other, and the types of the resources that are the operation targets are different from each other (in a fourth case), the state of the target (the server) that has the hierarchical relationship to the control target (the resource) based on the column c of the third determination criterion 33 is checked, and the possibility of the parallel execution is determined anew according to a result of the checking. With the second determination criterion 32, in any one of the second, third, and fourth cases, it is determined that the target for determination is the target for the detailed determination.

FIG. 10 is a diagram illustrating an example of the third determination criterion. The third determination criterion 33 is information that results from prescribing the possibility of the parallel execution in accordance with the state of the server and the state of the resource for every relationship to the control target that is detected based on the first determination criterion 31 and the second determination criterion 32.

Relationships "a", "b", "c", and "d" are prescribed for the third determination criterion 33. The relationships "a", "b", "c", and "d" correspond to the "column a", the "column b", "the column c", and the "column d", respectively, which are described with the first determination criterion 31 and the second determination criterion 32.

The relationship "a" is a relationship in which two operational control components make the server reference to the same server. The relationship "b" is a relationship in which one of the two operational control components makes the server reference to the same server, and the other performs the resource control to the same server.

The relationship "c" is a relationship in which the two operational control components make only the resource reference to different resources on the same server. Moreover, in a case where two resources are different from each other in terms of at least one of the name of the resource and the type of the resource, both of the resources are resources that are different from each other.

The relationships "d" include a first relationship and a second relationship. The first relationship is a relationship in which the two operational control components make only the resource reference to the same resource on the same server. The second relationship is a relationship in which the resource that is each control target in two operational control components is on the same server, the two operational control components are the same in terms of any one of the name of the resource and the type of the resource, and at least one of the two operational control components performs the resource control. The third determination criterion 33 include the following criterion for each of the relationships.

In a case where the state of the server is indefinite, both of the operational control components are impossible to be executed in parallel for the relationship "a". In a case where the state of the server is other than being indefinite, both of the operational control components are possible to be executed in parallel for the relationship "a".

In the case where the state of the server is indefinite, both of the operational control components are impossible to be executed in parallel for the relationship "b". In the case where the state of the server is other than being indefinite, both of the operational control components are possible to be executed in parallel for the relationship "b".

In the case where the state of the server is indefinite, both of the operational control components are impossible to be executed in parallel for the relationship "c". In the case where the state of the server is other than being indefinite, both of the operational control components are possible to be executed in parallel for the relationship "c".

In the case where the state of the server is indefinite, both of the operational control components are impossible to be executed in parallel for the relationship "d". In the case where the state of the server is other than indefinite, if the resource state of the resource that is any one of the control targets is indefinite, both of the operational control components are impossible to be executed in parallel for the relationship "d". In the case where the state of the server is other than indefinite, if the resource state of the resource that is any one of the control targets is other than indefinite, both of the operational control components are possible to be executed in parallel for the relationship "d".

Figure 11:
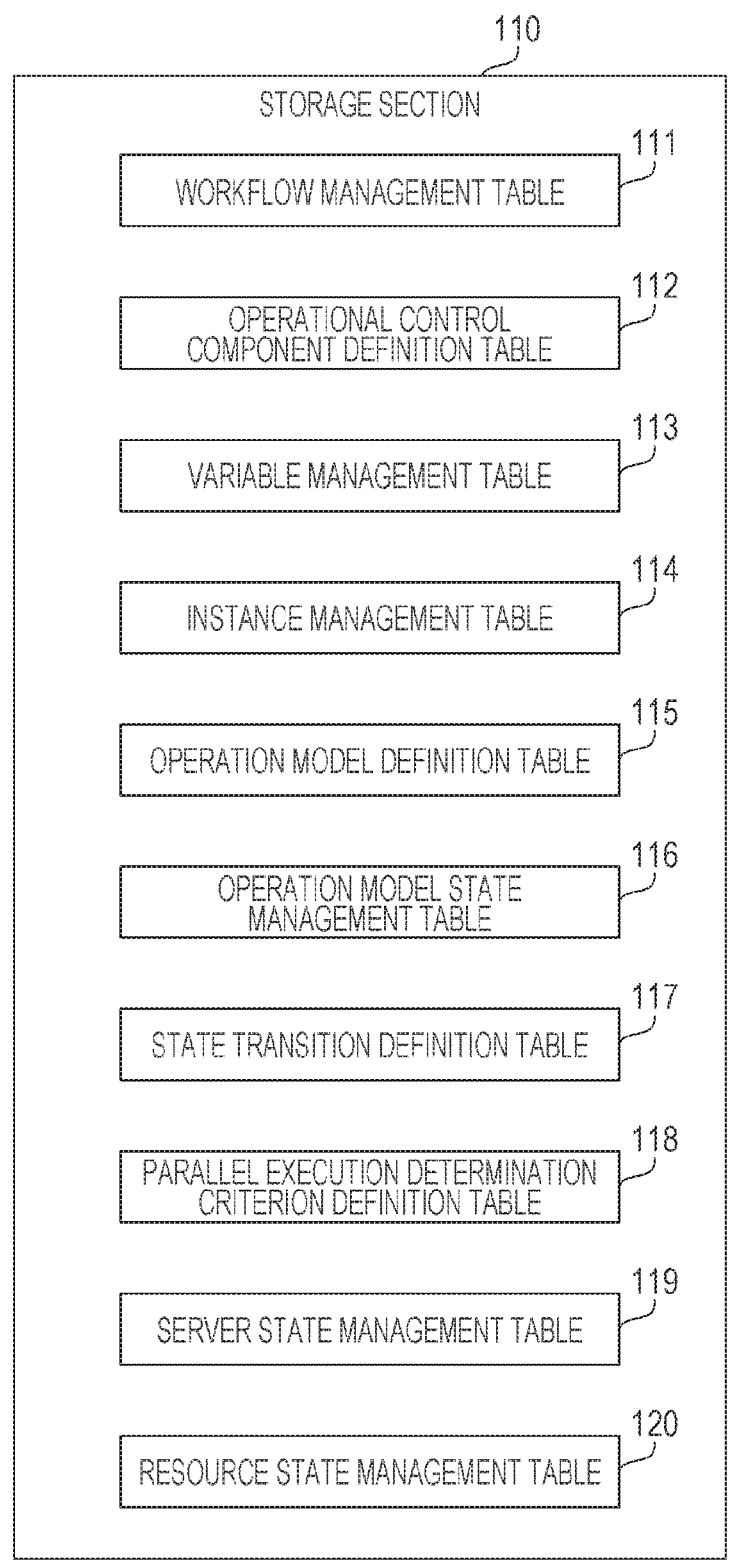
FIG. 11 is a diagram illustrating an example of a table.

Next, a specific example of pieces of information relating to the workflow that is included in the workflow 20, the operation model, the first determination criterion 31, the second determination criterion 32, and the third determination criterion 33. FIG. 11 is a diagram illustrating an example of a table. Included in the storage section 110 are a workflow management table 111, an operational control component definition table 112, a variable management table 113, an instance management table 114, an operation model definition table 115, an operation model state management table 116, a state transition definition table 117, a parallel execution determination criterion definition table 118, a server state management table 119, and a resource state management table 120.

The workflow management table 111 lists multiple pieces of workflow management information that include the workflow 20. The workflow management table 111, for example, includes pieces of information for example, an operational control component name that is included in the workflow 20, the order in which the operational control components are executed, a variable name of a variable that is used in the operational control component, and the like.

The operational control component definition table 112 lists pieces of management information on the operational control components. The operational control component definition table 112, for example, includes pieces of information such as the operational control component name, the control target, the control content, the type of the resource that is the control target, and the like.

The variable management table 113 lists pieces of management information on variable values, each of which is set for a variable for the operational control component. The instance management table 114 lists pieces of management information on the workflow that is currently in execution (which is also referred to as an instance of the workflow). The instance management table 114, for example, includes pieces of information indicating the operational control components that are in execution in the workflow.

The operation model definition table 115 lists pieces of operation model definition information. The operation model state management table 116 lists pieces of information for managing the state of the operation model (the state of each of the control targets in each of the workflows). Moreover, pieces of information on the states of the control targets (the server and the resource) are also stored in the storage section 110 in advance (which will be described below in detail).

The state transition definition table 117 lists pieces of information for defining state transition of the control target (the server and the resource) due to the execution of the operational control component. The parallel execution determination criterion definition table 118 lists pieces of information for defining the first determination criterion 31, the second determination criterion 32, and the third determination criterion 33.

The server state management table 119 lists pieces of information for managing the state of the server that is the control target. The resource state management table 120 lists pieces of information for managing the state of the resource that is the control target.

FIG. 12 is a diagram illustrating an example of a workflow management table. The workflow management table 111 includes items for a workflow number, a component number, the operational control component name, the name of the server, the name of the resource, the operation model, and a number of the next component.

A number (the workflow number) for identifying the workflow is registered in the item for the workflow number. For example, the workflow number of the workflow 20 is "1". A number (the component number) that is attached to the operational control component which is included in the workflow is registered in the item for the component number. The component number is unique to the workflow number. A name (the operational control component name) for identifying the operational control component is registered in the item for the operational control component. The name of the server for designating the server that is the control target is registered in the item for the name of the server. The variable name for designating the resource that is the control target is registered in the item for the name of the resource. Information indicating the operation model is registered in the item for the operation model. A component number (a number of a component that belongs to the same workflow) of the operational control component that is to be executed next is registered in the item for the number of the next component.

Moreover, for an operational control component that is equivalent to "Start" indicating starting of the workflow or "End" indicating ending of the workflow, the name of the server, the name of the resource, and the operation model are assigned no-setting "-" (a hyphen). Furthermore, in a case where the control target is the server and is not the resource, the name of the resource is assigned no-setting "-". Additionally, in a case where the control target is the resource, the resource is realized on the server, both of the name of the server and the name of the resource are registered. For the operational control component that is equivalent to "End", the number of the next component is assigned no-setting "-". For example, the following pieces of information are registered in the workflow management table 111.

In an example in the first row in FIG. 12, "1", "0", "Start", "-", "-", "-", and "1" are registered as pieces of information on the workflow number, the component number, the operational control component name, the name of the server, the name of the resource, the operation model, and the number of the next component, respectively. This indicates that the operational control component is an operational control component indicating starting of the workflow 20. According to the corresponding record, the operational control that is to be executed next is for the operational control component 21 (of which the operational control component name is "OS restarting") that corresponds to the component number "1" in the workflow number "1".

In an example in the second row in FIG. 12, "1", "1", "OS restarting", "variable 1", "-", "A", and "2" are registered as pieces of information on the workflow number, the component number, the operational control component name, the name of the server, the name of the resource, the operation model, and the number of the next component, respectively. This indicates the operational control component 21. In the operational control component 21, "variable 1" is used for designation of the name of the server. Because the control content of the operational control component 21 is the server control, the name of the resource may not be designated, and the item for the name of the resource is assigned no-setting "-". Furthermore, because the control content of the operational control component 21 is the server control, the operation model is "A". The operational control component that is to be executed, subsequent to the operational control component 21, is the operational control component 22 (of which the operational control component name is "checking of activation of the server) that corresponds to the component number 2 in the workflow number "1". Information on the operational control component 22 is registered in the workflow management table 111, in the same manner as in the operational control component 21 (the record containing the workflow number "1" and the component number "2").

In an example in the third row, "1", "3", "checking of activation of the service", "variable 1", "variable 2", "D", and "4" are registered as pieces of information on the workflow number, the component number, the operational control component name, the name of the server, the name of the resource, the operation model, and the number of the next component, respectively. This indicates the operational control component 23. In the operational control component 23, "variable 1" is used for designation of the name of the server. In the operational control component 23, "variable 2" is used for designation of the name of the resource. Because the control content of the operational control component 23 is the resource reference, the operation model is D. The operational control component that is to be executed, subsequent to the operational control component 23, is the operational control component 24 (of which the operational control component name is "creation of an account") that corresponds to the component number "4" in the workflow "1".

For the operational control components 22, 24, 25, 26, and 27, the same pieces of information as those in the operational control components 21 and 23 are registered in the workflow management table 111. Furthermore, for other workflows (for example, a workflow number "2") definitions can be imposed in the same manner.

FIG. 13 is a diagram illustrating an example of the operational control component definition table. The operational control component definition table 112 includes items for the operational control component name, the control target, the control content, and a target type. The operational control component name is registered in the item for the operational control component name. Information indicating the control target is registered in the item for the control target. Information indicating the control content is registered in the item for the control content. In a case where the control target is the "resource", information indicating a type of the resource (a resource type) is registered in the item for the target type. Moreover, in a case where the control target is the "server", the item for the target type is assigned no-setting "-".

For example, the following pieces of information are registered in the operational control component definition table 112. In an example in the first row, "OS restarting", "server", "control", and "-" are registered as pieces of information on the operational control component name, the control target, the control content, and the type of the target type, respectively. This indicates that the control target of the operational control component that is indicated by the operational control component name "OS restarting" is the server and that the control content is the control (that is, the server control). Furthermore, because the control target is the server, the target type is no-setting "-".

In an example in the second row, "checking of activation of a server", "server", "reference", and "-" are registered as pieces of information on the operational control component name, the control target, the control content, and the target type, respectively. This indicates that the control target of the operational control component that is indicated by the operational control component name "checking of activation of a server" is the server and that the control content is the reference (that is, the server reference). Furthermore, because the control target is the server, the target type is no-setting "-".

In an example in the third row, "checking of activation of a service", "resource", "reference", and "Service.Account" are registered as pieces of information on the operational control component name, the control target, the control content, and the target type, respectively. This indicates that the control target of the operational control component that is indicated by the operational control component name "checking of activation of a service" is the resource, that the control content is the reference (that is, the resource reference). Furthermore, that indicates that the resource type of the control target is "Service.Account". Moreover, in a case where the type of the resource includes a period "." when the type of the resource is expressed, a portion in front of the period "." indicates the type of the resource, and a portion in rear of the period "." indicates the attribute. In an example of "Service.Account", "Service" is designated as the type of the resource, and "Account" is designated as the attribute.

In an example in the fourth row, "creation of account", "resource", "control", and "Account" are registered as pieces of information on the operational control component name, the control target, the control content, and the target type, respectively. This indicates that the control target of the operational control component that is indicated by the operational control component name "creation of an account" is the resource and that the control content is the control (that is, the resource control). Furthermore, that indicates that the type of the resource that is the control target is "Account".

Pieces of information on other operational control component information are also registered, in the same manner as in the operational control component definition table 112. FIG. 14 is a diagram illustrating an example of a variable management table. The variable management table 113 includes items for an instance number, the workflow number, a variable name, and a variable value.

A number (the instance number) for identifying the instance of the workflow is registered in the item for the instance number. The workflow number is registered in the item for the workflow number. The variable name is registered in the item for the variable name. The variable value that is substituted for a variable which is indicated by the variable name is registered in the item for the variable value.

For example, "1", "1", "variable 1", and "X" are registered as pieces of information on the instance number, the workflow number, the variable name, and the variable value, in the variable management table 113. This indicates that an instance number "1" is given to an instance of the workflow 20 (the workflow number "1"), and indicates that, for the instance of the workflow 20, a variable value "X" is substituted for a variable of the variable name "variable 1". In this case, the variable value "X" is information that is equivalent to the name of the server. Other values and variable values that are used for the instance of the workflow 20 are also registered, in the same manner, in the variable management table 113. Values and variable values that are used for instances of workflows other than the workflow 20 are also registered, in the same manner, in the variable management table 113.

Figure 15:
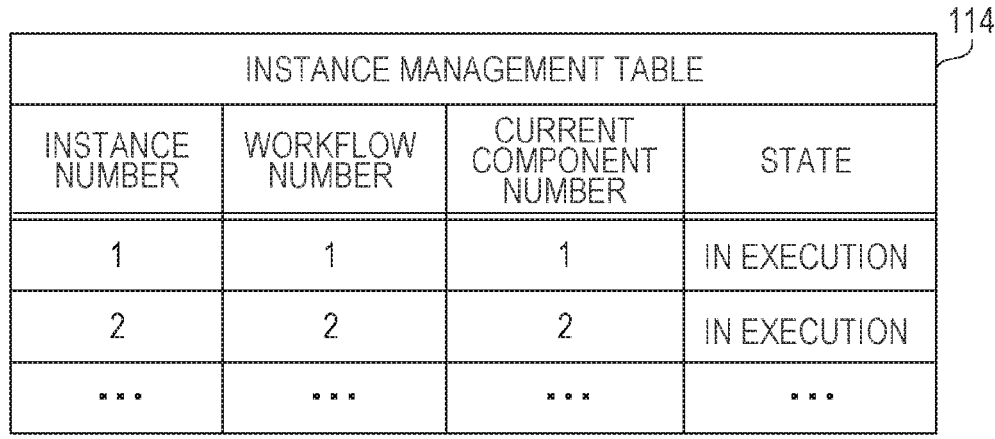
FIG. 15 is a diagram illustrating an example of an instance management table.

FIG. 15 is a diagram illustrating an example of an instance management table. The instance management table 114 includes items for the instance number, the workflow number, a current component number, and a state.

The instance number is registered in the item for the instance number. The workflow number is registered in the item for the workflow number. The component number of the operational control component that is the next execution target is registered in the item for the current component number. Information indicating whether the workflow is in execution is registered in the item for the workflow.

For example, "1", "1", "1", and "in execution" are registered as pieces of information on the instance number, the workflow number, the current component number, and the state, respectively, in the instance management table 114. This indicates that the workflow 20 is in execution, and that, among the multiple operational control components that are included in the workflow 20, the next execution target is the operational control component 21 (which corresponds to the component number "1" in the workflow number "1"). For instances of other workflows, pieces of information are also registered in the instance management table 114.

Figure 16:
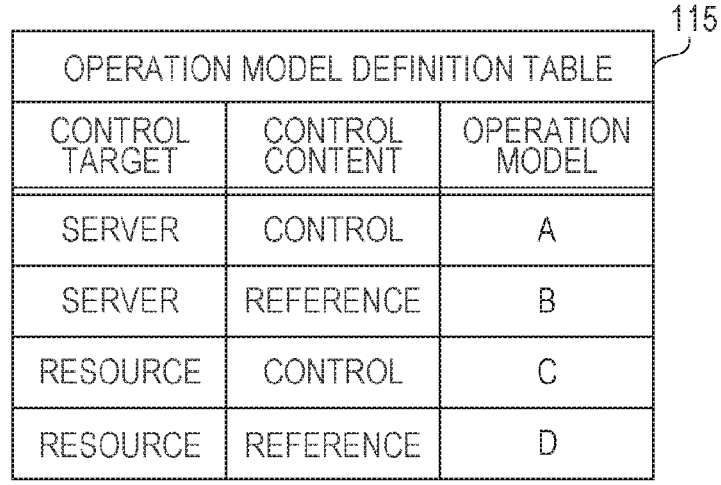
FIG. 16 is a diagram illustrating an example of an operation model definition table.

FIG. 16 is a diagram illustrating an example of an operation model definition table. The operation model definition table 115 includes items for the control target, the control content, and the operation model. Information indicating the control target is registered in the item for the control target. Information indicating the control content is registered in the item for the control content. Identification information on the operation model is registered in the item for the operation model.

For example, pieces of information, "server", "control", and "A" are registered, as the control target, the control content, and the operation model, in the operation model definition table 115. This indicates that the operational control components which perform the server control are categorized as the operation model A.

Furthermore, pieces of information, "server", "reference", and "B" are registered, as the control target, the control content, and the operation model, in the operation model definition table 115. This indicates that the operational control components which makes the server reference are categorized as the operation model B.

Furthermore, pieces of information, "resource", "control", and "C" are registered, as the control target, the control content, and the operation model, in the operation model definition table 115. This indicates that the operational control component which performs the resource control are categorized as the operation model C.

Furthermore, pieces of information, "resource", "reference", and "D" are registered, as the control target, the control content, and the operation model, in the operation model definition table 115. This indicates that the operational control component which performs the resource reference are categorized as the operation model D.

FIG. 17 is a diagram illustrating an example of an operation model state management table. The operation model state management table 116 includes items for a number, the instance number, the workflow number, the component number, the resource name, the type of the resource, the state of the resource, the name of server, the state of the server, the operation model, and a post-improvement next-component number.

The number for identifying a record is registered in the item for the number. The instance number is registered in the item for the instance number. The workflow number is registered in the item for the workflow number. The component number is registered in the item for the component number. The resource name is registered in the item for the resource name. The type of the resource (the resource type) is registered in the item for the type of the resource. The state of the resource (the resource state) is registered in the item for the state of the resource. The name of the server is registered in the item for the name of the server. The state of the server (the server state) is registered in the item for the state of the server. The operation model is registered in the item for the operation model. The component number of the operational control component that is to be executed next in a case where the result of the determination of the possibility of the parallel execution is reflected is registered in the item for the post-improvement next-component number.

For example, the following pieces of information are registered in the operation model state management table 116. In an example in the first row, "1", "1", "1", "0", "-", "-", "-", "-", "-", "-", and "1" are registered as pieces of information on the number, the instance number, the workflow number, the component number, the resource name, the type of the resource, the state of the resource, the name of the server, the state of the server, the operation model, and the post-improvement next-component number, respectively.

This indicates the operational control component that is equivalent to "Start" in the workflow 20. Because the starting of the workflow is simply indicated, the operational control component that corresponds to "Start" does not have the control target or the control content. For this reason, the categorization as any one of the operation models is not performed. The determination of the possibility of the parallel execution may not be made for the operational control component that corresponds to "Start". Therefore, the post-improvement next-component number remains "1".

In an example in the second row, "2", "1", "1", "1", "-", "-", "-", "X", "indefinite", "A", and "2" are registered as pieces of information on the number, the instance number, the workflow number, the component number, the resource name, the type of the resource, the state of the resource, the name of the server, the state of the server, the operation model, and the post-improvement next-component number, respectively.

This indicates a state immediately after the execution of the operational control component 21 in the workflow 20. That indicates that the operational control component 21 is categorized as the operation model "A", and the name of the server that is the control target is "X", and that the state of the server is "indefinite" in a stage prior to the execution of the next operational control component immediately after the execution of the operational control component 21. Because the operation model "A" is equivalent to the server control, the items for the name of the resource, the type of the resource, and the state of the resource are assigned no-setting "-". Additionally, this indicates that, in the stage prior to the execution of the next operational control component immediately after the execution of the operational control component 21, as a result of the determining the possibility of the parallel execution of the next and succeeding operational control components, the next component number (the post-improvement next-component number) is "2" (the operational control component 22). The fact that the next component number is 1 means that it is determined that the parallel execution of the operational control components 22 and 23 is impossible.

In an example in the third row, "3", "1", "1", "2", "-", "-", "-", "X", "ON", "B", and "3" are registered as pieces of information on the number, the instance number, the workflow number, the component number, the resource name, the type of the resource, the state of the resource, the name of the server, the state of the server, the operation model, and the post-improvement next-component number, respectively.

This indicates the state immediately after the execution of the operational control component 22 in the workflow 20. When the operational control component 22 is categorized as the operation model "B", and the name of the server that is the control target is "X", this indicates that the state of the server is "ON" in the stage prior to the execution of the next operational control component immediately after the execution of the operational control component 22. Because the operation model "B" is equivalent to the server reference, the items for the name of the resource, the type of the resource, and the state of the resource are assigned no-setting "-". Additionally, this indicates that, in the stage prior to the execution of the next operational control component immediately after the execution of the operational control component 22, as a result of the determining the possibility of the parallel execution of the next and succeeding operational control components, the next component number (the post-improvement next-component number) is "3" (the operational control component 23). This case also means that, in the same manner as in the record with the number 2, it is determined that the parallel execution of the operational control components 23 and 24 is impossible.

In an example in the fourth row, "4", "1", "1", "3", "S", "Service.Account", "START", "X", "ON", "D", and "4" are registered as pieces of information on the number, the instance number, the workflow number, the component number, the resource name, the type of the resource, the state of the resource, the name of the server, the state of the server, the operation model, and the post-improvement next-component number, respectively.

This indicates the state immediately after the execution of the operational control component 23 in the workflow 20. Furthermore, that indicates that the operational control component 23 is categorized as the operation model "D", that the name of the resource which is the control target is "S", that the type of the resource is "Service.Account", and that the name of the server which is the control target is "X". At this point, for example, the name of the resource "S" is an identifier indicating the service, and the type of the resource "Service.Account" is the service for managing account management. Furthermore, that indicates that, in the stage prior to the execution of the next operational control component immediately after the execution of the operational control component 23, the state of the resource is "START" (the activation is in progress), and the state of the server is "ON". Additionally, this indicates that, in the stage prior to the execution of the next operational control component immediately after the execution of the operational control component 23, as a result of the determining the possibility of the parallel execution of the next and succeeding operational control components, the next component number (the post-improvement next-component number) is "4" (the operational control component 24). This case also means that, in the same manner as in the record with the number 2, it is determined that the parallel execution of the operational control components 24 and 25 is impossible.

In an example in the fifth row, "5", "1", "1", "4", "Ac", "Account", "EXIST", "X", "ON", "C", and "5, 6" are registered as pieces of information on the number, the instance number, the workflow number, the component number, the resource name, the type of the resource, the state of the resource, the name of the server, the state of the server, the operation model, and the post-improvement next-component number, respectively.

This indicates the state immediately after the execution of the operational control component 24 in the workflow 20. Furthermore, that indicates that the operational control component 24 is categorized as the operation model "C", that the name of the resource which is the control target is "Ac", that the type of the resource is "Account", and that the name of the server which is the control target is "X". At this point, the name of the resource "Ac" is an identifier indicating the account, and the type of the resource "Account" is account information. Furthermore, that indicates that, in the stage prior to the execution of the next operational control component immediately after the execution of the operational control component 24, the state of the resource is "EXIST", (the account information is present) and the state of the server is "ON". Additionally, that indicates that, in the stage prior to the execution of the next operational control component immediately after the execution of the operational control component 24, as a result of the determining the possibility of the parallel execution of the next and succeeding operational control components, the next component numbers (the post-improvement next-component numbers) are "5, 6" (the operational control component 25 and 26). That is, it is meant that it is determined that, immediately prior to the execution of the operational control component 25, the parallel execution of the operational control components 25 and 26 is possible.

For the operational control component 25 (which corresponds to a component number "5" in the workflow number "1") and the operational control component 26 (which corresponds to a component number "6" in the workflow number "1"), the same pieces of information are registered in the operation model state management table 116. Because the operational control components 25 and 26 are executed in parallel, a component number "7" (the operational control component 27) is set to be in any one of the items for the post-improvement next-component number. Furthermore, states relating to other instances are also registered, in the same manner, in the operation model state management table 116.

At this point, the operational server 100 retains, in advance, information (state information) on a state where the resource or the server can be taken. Then, an example of the state information is described. FIG. 18 is a diagram illustrating an example of a definition of an attribute of the type of the resource, and an example of a state type. The state information 116a is information indicating a correspondence between the type of the resource, and the attribute and state of the type of the resource. The state information 116a (of which an illustration is omitted in FIG. 11) is stored in advance in the storage section 110. Pieced of state information 116a includes items for the type of the resource, and for the attribute and state of the type of the resource.

The name of the type of the resource is registered in the item for the type of the resource. The name of the attribute of the type of the resource is registered in the item for the attribute of the type of the resource. At this point, the attribute of the type of the resource is information by which the types of the resources are subcategorized in detail. A candidate for a state for the type of the resource, or the attribute of the type of the resource is registered in the item for the state.

For example, "File", "File.File" (an attribute indicating that the resource which is the control target is a file), and "EXIST/NONE/indefinite" are included, as pieces of information on the type of the resource, the attribute of the type of the resource, and the state, respectively, in the state information 116a. This indicates that, for the attribute "File.File" in the type of the resource "File", there are three state candidates, that is, "EXIST" (a file of the target is present), "NONE" (the file of the target is not present), and "indefinite" (whether the file of the target is present is indefinite). Moreover, in FIG. 18, like "File.File", the attribute of the type of the resource is illustrated including the type of the resource as well, but, among portions, a portion that is handled as attribute information is a portion "File" after a period "." as described above (this is true for others in FIG. 18).

Furthermore, "File", "File.Directory" (an attribute indicating that the resource which is the control target is a directory), and "EXIST/NONE/indefinite" are included, as pieces of information on the type of the resource, the attribute of the type of the resource, and the state, respectively, in the state information 116a. This indicates that, for the attribute "File.Directory" in the type of the resource "File", there are three state candidates, that is, "EXIST" (a directory of the target is present), "NONE" (the directory of the target is not present), and "indefinite" (whether the directory of the target is present is indefinite).

For other attributes of the type of the resource, states are registered, in the same manner, in the state information 116a. For example, according to the content of processing, the type of the resource "Service" can be categorized into multiple attributes, such as file management ("Service.File"), event management ("Service.Event"), job management ("Service.Job"), account management ("Service.Account"), system management ("Service.System"). This is true for the type of the resource "Process".

The type of the resource that has the attribute is described above as an example, but the state for the type of the resource that has not the attribute is also registered in the state information 116a. For example, "Event", "-" (no-setting), and "EXIST/NONE/indefinite" are included, as pieces of information on the type of the resource, the attribute of the type of the resource, and the state, respectively, in the state information 116a. This indicates that, for the type of the resource "Event", there are three state candidates, that is, "EXIST" (an event of the target is present), "NONE" (the event of the target is not present), and "indefinite" (whether the event of the target is present is indefinite). In addition to the type of the resource "Event", states for the types of the resource, such as the types of the resources "Job", "Account", "System", are registered in the state information 116a. Furthermore, pieces of state information are also registered for other types of the resources (for example, "File", "Service", or the like).

Furthermore, in the state information 116a, information relating to the resource is mainly described, but the operational server 100 also retains the same information in the state of the server. Specifically, information, that is, "ON/OFF/indefinite" is stored in advance, as the state of the server, in the storage section 110. The state "ON" indicates that the activation of the server is in progress (the server is powered on). The state "OFF" indicates that the server is in a state of being stopped (the server is powered off). The state "indefinite" indicates that whether the activation of the server is in progress or the server is in a state of being stopped.

FIG. 19 is a diagram illustrating an example of a state transition definition table. The state transition definition table 117 includes items for the operational control component name, a state of the pre-control server, a state of the post-control server, a state of the pre-control resource, and a state of the post-control resource.

The operational control component name is registered in the item for the operational control component name. The state of the server prior to the execution of the operational control component is registered in the item for the state of the pre-control server. The state of the server after the execution of the operational control component is registered in the item for the state of the post-control server. The state of the resource prior to the execution of the operational control component is registered in the item for the state of the pre-control resource. The state of the resource after the execution of the operational control component is registered in the item for the state of the post-control resource.

For example, the following pieces of information are registered in the state transition definition table 117. In an example in the first row, "OS restarting", "ON", "indefinite", "-", and "-" are registered as pieces of information on the operational control component name, the state of the pre-control server, the state of the post-control server, the state of the pre-control resource, and the state of the post-control resource, respectively. This indicates that, in a case where the state of the server prior to the execution of the operational control component (for example, the operational control component 21) of which the operational control component name is "OS restarting" is "ON", the state of the server after the execution of the operational control component is "indefinite".

In an example in the second row, "OS restarting", "indefinite", "indefinite", "-", and "-" are registered as pieces of information on the operational control component name, the state of the pre-control server, the state of the post-control server, the state of the pre-control resource, and the state of the post-control resource, respectively. This indicates that, in a case where the state of the server prior to the execution of the operational control component (for example, the operational control component 21) of which the operational control component name is "OS restarting" is "indefinite", the state of the server after the execution of the operational control component is "indefinite".

In an example in the third row, "checking of activation of server", "ON", "ON", "-", and "-" are registered as pieces of information on the operational control component name, the state of the pre-control server, the state of the post-control server, the state of the pre-control resource, and the state of the post-control resource, respectively. This indicates that, in a case where the state of the server prior to the execution of the operational control component (for example, the operational control component 22) of which the operational control component name is "checking of activation of server" is "ON", the state of the server after the execution of the operational control component is "ON".

In an example in the fourth row, "checking of activation of server", "indefinite", "ON", "-", and "-" are registered as pieces of information on the operational control component name, the state of the pre-control server, the state of the post-control server, the state of the pre-control resource, and the state of the post-control resource, respectively. This indicates that, in a case where the state of the server prior to the execution of the operational control component (for example, the operational control component 22) of which the operational control component name is "checking of activation of server" is "indefinite", the state of the server after the execution of the operational control component is "ON".

In an example in the fifth row, "checking of activation of service", "-", "-", "START", and "START" are registered as pieces of information on the operational control component name, the state of the pre-control server, the state of the post-control server, the state of the pre-control resource, and the state of the post-control resource, respectively. This indicates that, in a case where the state of the resource prior to the execution of the operational control component (for example, the operational control component 23) of which the operational control component name is "checking of activation of service" is "START", the state of the resource after the execution of the operational control component is "START".

In an example in the sixth row, "checking of activation of service", "-", "-", "indefinite", and "START" are registered as pieces of information on the operational control component name, the state of the pre-control server, the state of the post-control server, the state of the pre-control resource, and the state of the post-control resource, respectively. This indicates that, in a case where the state of the resource prior to the execution of the operational control component (for example, the operational control component 23) of which the operational control component name is "checking of activation of service" is "indefinite", the state of the resource after the execution of the operational control component is "START".

For other operational control components, in the same manner, a correspondence between the state of the server or the resource prior to execution of the operational control component and the state of the server or the resource after the operational control component is registered in advance in the state transition definition table 117.

FIG. 20 is a diagram illustrating an example of a parallel execution determination criterion definition table. The parallel execution determination criterion definition table 118 includes items for a number, the preceding operation model, the following operation model, the same servers, different servers, the same servers/the same names of the resources (the same types), the same servers/the same names of resources (different types), the same servers/different names of the resources (the same types), the same servers/different names of the resources (different types).

A number for identifying the record is registered in the item for the number. Information indicating the operation model of the preceding operational control component is registered in the item for the preceding operation model. Information indicating the operation model of the operational control component that follows the preceding operational control component is registered in the item for the following operation model. Information indicating whether the parallel execution is possible in a case where the servers that are the control targets are the same is registered in the item for the same servers. Information indicating whether the parallel execution is possible in a case where the servers that are the control targets are different from each other is registered in the item for the different servers. Information indicating whether the parallel execution is possible in a case where the server (the name of the server) that is the control target, the name of the resource, and the type of the resource are the same is registered in the item for the same servers/the same names of the resources (the same types). Information indicating whether the parallel execution is possible in a case where the server that is the control target and the name of the resource are the same and the types of the resources are different from each other is registered in the item for the same servers/the same names of the resources (the same types). Information indicating whether the parallel execution is possible in a case where the server that is the control target and the type of the resource are the same and the names of the resources are different from each other is registered in the item for the same servers/different names of the resources (the same types). Information indicating whether the parallel execution is possible in a case where the servers that are the control targets are the same and the name of the resource and the type of the resource are different from each other is registered in the item for the same servers/different names of the resources (the different types).

Moreover, an identifier of a sub-criterion for further performing the determination may be registered in each of the items for the same servers, the different servers, the same servers/the same names of the resources (the same types), the same servers/the same names of the resources (the different types), the same servers/different names of the resources (the same types), the same servers/different names of the resources (the different types). The sub-criterion is information by which the determination criterion for the possibility of the parallel execution in accordance with a result of checking a dynamic state for the control target is defined (in the present example, sub-criteria J1, J2, J3, and J4 are defined in advance as described below).

For example, the following pieces of information are registered in the parallel execution determination criterion definition table 118. As a first example, "0", "A", "A", "impossible", "possible", "-" (no-setting), "-", "-", and "-" are registered as pieces of information on the preceding operation model, the following operation model, the same servers, the different servers, the same servers/the same names of the resources (the same types), the same servers/ the same names of the resources (the different types), the same servers/different names of the resources (the same types), and the same servers/different names of the resources (the different types), respectively.

This indicates that it is determined that, in a case where the operation model of the preceding operational control component is "A" and the operation model of the following operational control component is "A", the parallel execution of both of the operational control components is impossible if the servers that are the control targets are the same, and the parallel execution of both of the operational control components is possible if the servers that are the control targets are different from each other.

As a second example, "5", "B", "B", "sub-criterion J1", "possible", "-" (no-setting), "-", "-", and "-" are registered as pieces of information on the preceding operation model, the following operation model, the same servers, the different servers, the same servers/the same names of the resources (the same types), the same servers/the same names of the resources (the different types), the same servers/different names of the resources (the same types), and the same servers/different names of the resources (the different types), respectively.

This indicates that, in a case where the operation model of the preceding operational control component is "B" and the operation model of the following operational control component is "B", the determination of the possibility of the parallel execution is further made in detail using the sub-criterion J1 if the servers that are the control targets are the same. Furthermore, that indicates that it is determined that, in such a case, the parallel execution of both of the operational control components is possible if the servers that are the control targets are different from each other.

As a third example, "6", "B", "C", "sub-criterion J2", "possible", "-" (no-setting), "-", "-", and "-" are registered as pieces of information on the preceding operation model, the following operation model, the same servers, the different servers, the same servers/the same names of the resources (the same types), the same servers/the same names of the resources (the different types), the same servers/different names of the resources (the same types), and the same servers/different names of the resources (the different types), respectively.

This indicates that, in a case where the operation model of the preceding operational control component is "B" and the operation model of the following operational control component is "C", the determination of the possibility of the parallel execution is further made in detail using the sub-criterion J2 if the servers that are the control targets are the same. Furthermore, that indicates that it is determined that, in such a case, the parallel execution of both of the operational control components is possible if the servers that are the control targets are different from each other.

As a fourth example, "10", "C", "C", "-", "possible", "impossible", "sub-criterion J4", "sub-criterion J4", and "sub-criterion J3" are registered as pieces of information on the preceding operation model, the following operation model, the same servers, the different servers, the same servers/the same names of the resources (the same types), the same servers/the same names of the resources (the different types), the same servers/different names of the resources (the same types), and the same servers/different names of the resources (the different types), respectively.

This indicates that it is determined that, in a case where the operation model of the preceding operational control component is "C" and the operation model of the following operational control component is "C", the parallel execution of both of the operational control components is possible if the servers that are the control targets are different from each other. Furthermore, that indicates that it is determined that the parallel execution is impossible if the server that is the control target, the name of the resource and the type of the resource are all the same. Furthermore, that indicates that the determination of the possibility of the parallel execution is further made in detail using the sub-criterion J4 if the server that is the control target and the name of the resource are the same and the types of the resources are different from each other. Furthermore, that indicates that the determination of the possibility of the parallel execution is further made in detail using the sub-criterion J4 if the server that is the control target and the type of the resource are the same and the names of the resources are different from each other. Additionally, that indicates that the determination of the possibility of the parallel execution is further made in detail using the sub-criterion J3 if the servers are the same and the name of the resource and the type of the resource are different from each other.

For other combinations of the preceding operation model and the following operation model, the determination criterion for the possibility of the parallel execution is also registered in the same manner in the parallel execution determination criterion definition table 118. FIG. 21 is a diagram illustrating an example of a sub-criterion definition table. Along with the parallel execution determination criterion definition table 118, a sub-criterion definition table 118a lists pieces of information that are used for the determination of the possibility of the parallel execution. The sub-criterion definition table 118a (of which an illustration is omitted in FIG. 11) is stored in advance in the storage section 110. The sub-criterion definition table 118a includes items for a sub-criterion identifier (ID), a state of a target server, a state of a target resource, and availability or non-availability of the parallel execution.

Identification information on the sub-criterion ID is registered in the item for the sub-criterion ID. The state of the target server is registered in the item for the state of the target server. The state of the target resource is registered in the item for the state of the target resource. Information indicating whether the parallel execution is possible is registered in the item for the availability or non-availability of the parallel execution.

For example, the next information is registered in the sub-criterion definition table 118a. As a first example, "sub-criterion J1", "indefinite", "-" (no-setting), and "impossible" are registered as pieces of information on the sub-criterion ID, the state of the target server, the state of the target resource, and the availability or non-availability of the parallel execution, respectively. This indicates that it is determined with the sub-criterion J1 that the parallel execution of the preceding and following operational control components is impossible if the state of the target server is indefinite.

As a second example, "sub-criterion J1", "other than indefinite", "-", and "possible" are registered as pieces of information on the sub-criterion ID, the state of the target server, the state of the target resource, and the availability or non-availability of the parallel execution, respectively. This indicates that it is determined with the sub-criterion J1 that the parallel execution of the preceding and following operational control components is possible if the state of the target server is other than indefinite.

As a third example, "sub-criterion J2", "indefinite", "-", and "impossible" are registered as pieces of information on the sub-criterion ID, the state of the target server, the state of the target resource, and the availability or non-availability of the parallel execution, respectively. This indicates that it is determined with the sub-criterion J2 that the parallel execution of the preceding and following operational control components is impossible if the state of the target server is indefinite.

As a fourth example, "sub-criterion J2", "other than indefinite", "-", and "possible" are registered as pieces of information on the sub-criterion ID, the state of the target server, the state of the target resource, and the availability or non-availability of the parallel execution, respectively. This indicates that it is determined with the sub-criterion J2 that the parallel execution of the preceding and following operational control components is possible if the state of the target server is other than indefinite.

As a fifth example, "sub-criterion J3", "indefinite", "-", and "impossible" are registered as pieces of information on the sub-criterion ID, the state of the target server, the state of the target resource, and the availability or non-availability of the parallel execution, respectively. This indicates that it is determined with the sub-criterion J3 that the parallel execution of the preceding and following operational control components is impossible if the state of the target server is indefinite.

As a sixth example, "sub-criterion J3", "other than indefinite", "-", and "possible" are registered as pieces of information on the sub-criterion ID, the state of the target server, the state of the target resource, and the availability or non-availability of the parallel execution, respectively. This indicates that it is determined with the sub-criterion J3 that the parallel execution of the preceding and following operational control components is possible if the state of the target server is other than indefinite.

As a seventh example, "sub-criterion J4", "indefinite", "-", and "impossible" are registered as pieces of information on the sub-criterion ID, the state of the target server, the state of the target resource, and the availability or non-availability of the parallel execution, respectively. This indicates that it is determined with the sub-criterion J4 that the parallel execution of the preceding and following operational control components is impossible if the state of the target server is indefinite.

As an eighth example, "sub-criterion J4", "other than indefinite", "indefinite", and "impossible" are registered as pieces of information on the sub-criterion ID, the state of the target server, the state of the target resource, and the availability or non-availability of the parallel execution, respectively. This indicates that it is determined with the sub-criterion J4 that the parallel execution of the preceding and following operational control components is impossible if the state of the target server is other than indefinite and the state of the target resource is indefinite.

As a ninth example, "sub-criterion J4", "other than indefinite", "other than indefinite", and "possible" are registered as pieces of information on the sub-criterion ID, the state of the target server, the state of the target resource, and the availability or non-availability of the parallel execution, respectively. This indicates that it is determined with the sub-criterion J4 that the parallel execution of the preceding and following operational control components is possible if any one of the state of the target server and the state of the target resource is other than indefinite.

The operational server 100 determines the possibility of the parallel execution based on the parallel execution determination criterion definition table 118 and the sub-criterion definition table 118a, and thus makes a determination using the first determination criterion 31, the second determination criterion 32, and the third determination criterion 33. That is, it can be considered that the parallel execution determination criterion definition table 118 and the sub-criterion definition table 118a are specific structures for embedding the first determination criterion 31, the second determination criterion 32, and the third determination criterion 33 in the operational server 100. Additionally, it can be said that, in the parallel execution determination criterion definition table 118, the sub-criterion ID is information indicating a correspondence to the target for the detailed determination of the possibility of the parallel execution. An indication that, in a case where the sub-criterion ID is not set, there is no correspondence to the target for the detailed determination of the possibility of the parallel execution is given.

Moreover, the sub-criterion definition table 118a is additionally added to the parallel execution determination criterion definition table 118, and pieces of information of the sub-criterion definition table 118a may be included in the parallel execution determination criterion definition table 118. In a case where the pieces of information of the sub-criterion definition table 118a are included in the parallel execution determination criterion definition table 118, the sub-criterion definition table 118a may not be provided.

FIG. 22 is a diagram illustrating an example of a server state management table. The server state management table 119 includes items for a number, the instance number, the workflow number, the name of the server, and a state. A number for identifying the record is registered in the item for the number. The instance number is registered in the item for the instance number. The workflow number is registered in the item for the workflow number. The name of the server of the control target is registered in the item for the name of the server. Information indicating the state of the server is registered in the item for the state.

For example, "1", "1", "1", "X", and "indefinite" are registered, as pieces of information on the number, the instance number, the workflow number, the name of the server, and the state, in the server state management table 119. This indicates that, in a stage where the workflow 20 is in execution, the state of the server that is the control target and of which the server name is "X" is indefinite.

States of other servers are also registered in the same manner in the server state management table 119. If, in a certain instance, there are multiple servers that are the control targets, the record for each of the multiple servers is created in the server state management table 119.

FIG. 23 is a diagram illustrating an example of a resource state management table. The resource state management table 120 includes items for a number, the instance number, the workflow number, the name of the server, the name of the resource, and a state.

A number for identifying the record is registered in the item for the number. The instance number is registered in the item for the instance number. The workflow number is registered in the item for the workflow number. The name of the server of the control target is registered in the item for the name of the server. The name of the resource of the control target is registered in the item for the name of the resource. The state of the resource is registered in the item for the state.

For example, the following pieces of information are registered in the resource state management table 120. As a first example, "1", "1", "1", "X", "S", and "indefinite" are registered as pieces of information on the number, the instance number, the workflow number, the name of the server, the name of the resource, and the state, respectively. This indicates that, in a stage where the workflow 20 is in execution, the state of the resource that is the control target and of which the resource name is "S" is indefinite.

As a second example, "2", "1", "1", "X", "Ac", and "indefinite" are registered as pieces of information on the number, the instance number, the workflow number, the name of the server, the name of the resource, and the state, respectively. This indicates that, in a stage where the workflow 20 is in execution, the state of the resource that is the control target and of which the resource name is "Ac" is indefinite.

States of other resources are registered in the same manner in the resource state management table 120. If, in a certain instance, there are multiple resources that are the control targets, the record for each of the multiple resources is created in the resource state management table 120.

Next, a specific procedure for processing by the operational server 100 is described. A case where the workflow 20 is executed will be described below as an example, but the operational server 100 executes other workflows in the same procedure.

Figure 24:
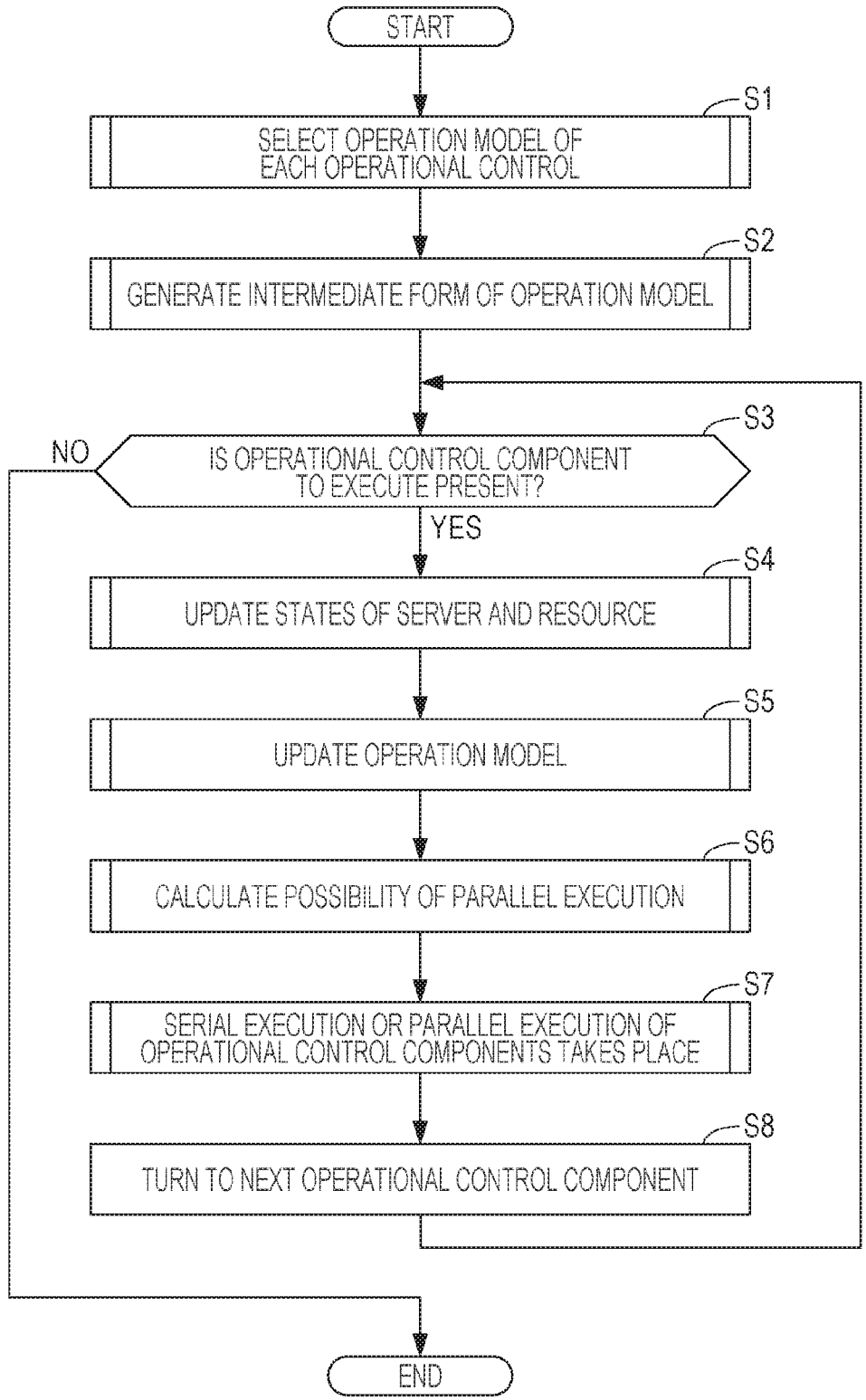
FIG. 24 is a flowchart illustrating an execution example of a workflow.

FIG. 24 is a flowchart illustrating an execution example of the workflow. Processing that is illustrated in FIG. 24 will be described below in order of increasing a step number.

(S1) The control section 130 receives an instruction for starting the execution of the workflow 20 (the workflow number "1"). Thus, the control section 130 selects the operation model of each of the operational control components that are included in the workflow 20. The control section 130 specifies information on each of the operational control components that are included in the workflow 20 or information on a variable that is used for the execution is specified, based on the workflow management table 111, the operational control component definition table 112, and the variable management table 113. In accordance with the starting of the execution of the workflow 20, the control section 130 registers a record to which a new instance number is given, in the instance management table 114. Furthermore, the control section 130 makes a selection of the operation model for the specified operational control component, based on the operation model definition table 115.

(S2) For the operation model selected for each of the operational control components, the control section 130 generates information on an intermediate form (which is also referred to as an interpreter) of the operation model. The intermediate form of the operation model is information for managing an operation model state (for example, the state of the server or the resource that is the control target), and is initial information that is registered in the operation model state management table 116 in relation to the workflow 20.

(S3) The control section 130 determines whether the operational control component to execute is present in the workflow 20, referring to the workflow management table 111. In a case where the operational control component to execute is present, the processing proceeds to Step S4. In a case where the operational control component to execute is not present, the processing is ended. The determination is made for the operational control component currently on focus. For example, the operational control component that is a determination target when Step S3 is initially performed is the operational control component that is equivalent to "Start", and the operational control component that is the determination target when Step S3 is next performed is defined as the operational control component 21. Moreover, in a case where the operational control component that is the determination target is the operational control component that is equivalent to "Start", subsequent Steps S4 to S7 may be skipped and Step S8 may be performed.

(S4) For the operational control component, the control section 130 acquires the states of the server and the resource that are the control targets, and updates the states of the server and the resource that are managed by the server state management table 119 and the resource state management table 120.

(S5) Based on the results of updating the states of the server and the resource in the server state management table 119 and the resource state management table 120, the control section 130 updates the information on the operation model. Specifically, the control section 130 updates setting values of the state of the server and the state of the resource in the operation model state management table 116.

(S6) Based on the operation model state management table 116, the parallel execution determination criterion definition table 118, and the sub-criterion definition table 118a, the control section 130 calculates the possibility of the parallel execution of an operational control component that is to be executed next and the operational control component that follows the operational control component.

(S7) Based on the result of calculating the possibility of the parallel execution in Step S6, the execution section 140 causes serial execution or the parallel execution of the operational control components to take place.

(S8) The control section 130 turns to the next operational control component in the workflow 20. Then, the processing proceeds to Step S3. Moreover, in a case where the current operational control component is the operational control component that is equivalent to "End", the next operational control component is not present. In this case, the control section 130 caused the processing to proceed to Step S3 and performs Step S3. As a result, in a case where it is determined in Step S3 that the operational control component to execute is not present, the execution of the workflow 20 is completed.

Moreover, in Step S1, a designation of the execution target in the workflow 20 is received. When the designation is received, the control section 130 adds a record for managing execution of a new instance of the workflow 20 to the instance management table 114, the server state management table 119, and the resource state management table 120.

Figure 25:
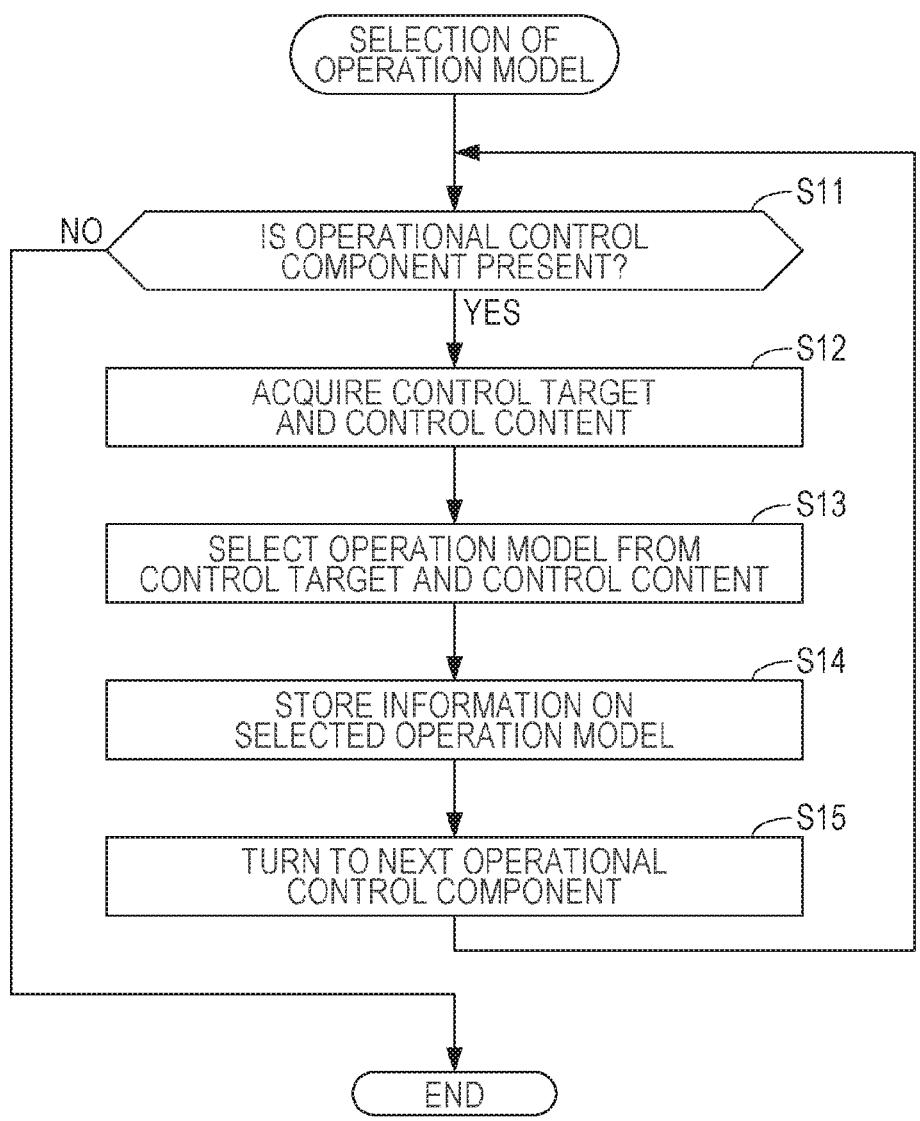
FIG. 25 is a flowchart illustrating an example of selection of the operation model.

FIG. 25 is a flowchart illustrating an example of selection of the operation model. Processing that is illustrated in FIG. 25 will be described below in order of increasing a step number. The following procedure is equivalent to Step S1 in FIG. 24.

(S11) For the workflow 20, the control section 130 determines whether the operational control component is present, referring to the workflow management table 111. In a case where the operational control component is present, the processing proceeds to Step S12. In a case where the operational control component is not present, the processing is ended. The determination is made for the operational control component currently on focus. For example, the operational control component that is the first determination target is an operational control component that is equivalent to "Start", and the operational control component that is the determination target when Step S11 is next performed is the operational control component 21. As illustrated in FIG. 25, the operational control component that, in Step S11, is determined as being present is referred to as an "operational control component on focus".

(S12) The control section 130 acquires the control target and the control content of the operational control component on focus, referring to the operational control component definition table 112. Take, for example, the operational control component 21. "Server", and "control" are acquired for the control target and the control content, respectively. For the operational control component that is equivalent to "Start" or "End", no-setting "-" is acquired for the control target or the control content.

(S13) The control section 130 selects the operation model of the operational control component on focus for the control target and the control content that are acquired in Step S12, referring to the operation model definition table 115. According to the operation model definition table 115, the operation model that corresponds to the control target "server" and the control content "control" is "A". Consequently, the control section 130 categorizes the operational control component 21 as the operation model "A". Moreover, for the operational control component that is equivalent to "Start" or "End", no-setting is acquired for the control target or the control content, and "-" is also acquired for the operation model.

(S14) The control section 130 stores the operation model that is selected in Step S13, in a record for the corresponding operational control component in the workflow management table 111. For example, "A" is stored in the item for the operation model in the record for the operational control component 21 (the workflow number "1" and the component number "1"). Moreover, the control section 130 sets the operation model to no-setting "-" for the operational control component that is equivalent to "Start" or "End".

(S15) The control section 130 turns to the next operational control component in the workflow 20. Then, the processing proceeds to Step S11. Moreover, in a case where the current operational control component currently on focus is the operational control component that is equivalent to "End", the next operational control component is not present. In this case, the control section 130 causes the processing to proceed to Step S11 and executes Step S11. As a result, in Step S11, it is determined that the operational control component is not present, and the selection of the operation model for each of the operational control component in the workflow 20 is completed.

Figure 26:
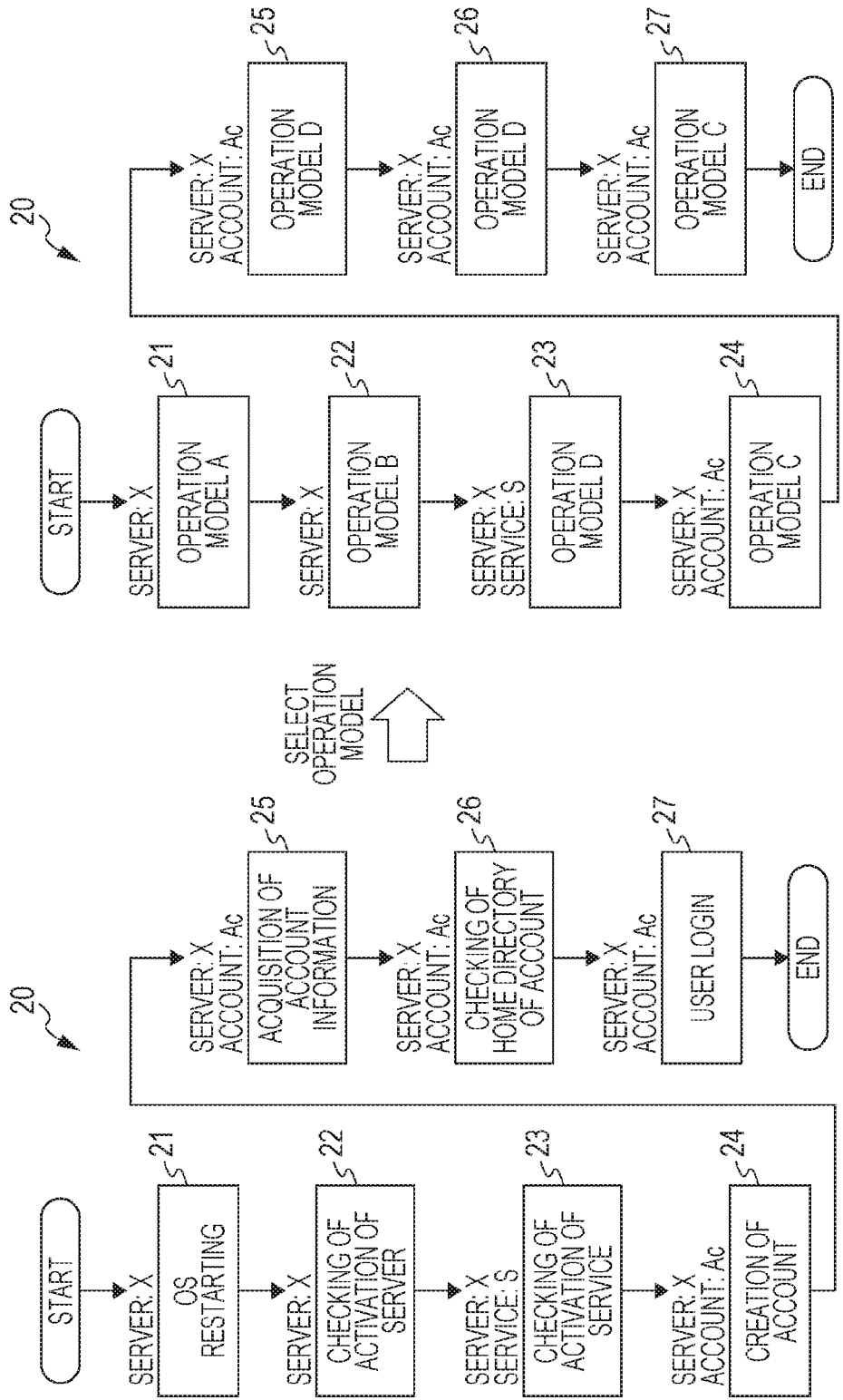
FIG. 26 is a diagram illustrating a specific example of the selection of the operation model.

FIG. 26 is a diagram illustrating a specific example of the selection of the operation model. For example, the control section 130 executes a procedure for selecting the operation model in FIG. 25, on the workflow 20, and thus determines the operation model for each of the operational control components 21, 22, 23, 24, 25, 26, and 27 as follows.

The operation model of the operational control component 21 is "A". This is because, according to the operational control component definition table 112, the control target of the operational control component 21 (of which the operational control component name is "checking of activation of server") is "server", and the control content is "control".

The operation model of the operational control component 22 is "B". This is because, according to the operational control component definition table 112, the control target of the operational control component 22 (of which the operational control component name is "checking of activation of server") is "server", and the control content is "reference".

The operation model of the operational control component 23 is "D". This is because, according to the operational control component definition table 112, the control target of the operational control component 23 (of which the operational control component name is "checking of activation of service") is "resource", and the control content is "reference".

The operation model of the operational control component 24 is "C". This is because, according to the operational control component definition table 112, the control target of the operational control component 24 (of which the operational control component name is "creation of account") is "resource", and the control content is "control".

The operation model of the operational control component 25 is "D". This is because, according to the operational control component definition table 112, the control target of the operational control component 25 (of which the operational control component name is "acquisition of account information") is "resource", and the control content is "reference".

The operation model of the operational control component 26 is "D". This is because, according to the operational control component definition table 112, the control target of the operational control component 26 (of which the operational control component name is "checking of home directory of account") is "resource", and the control content is "reference".

The operation model of the operational control component 27 is "C". This is because, according to the operational control component definition table 112, the control target of the operational control component 27 (of which the operational control component name is "user login") is "resource", and the control content is "control".

Moreover, for the operational control component that is equivalent to "Start" or "End" in the workflow 20, no-setting "-" is acquired for the operation model, as described above.

Figure 27:
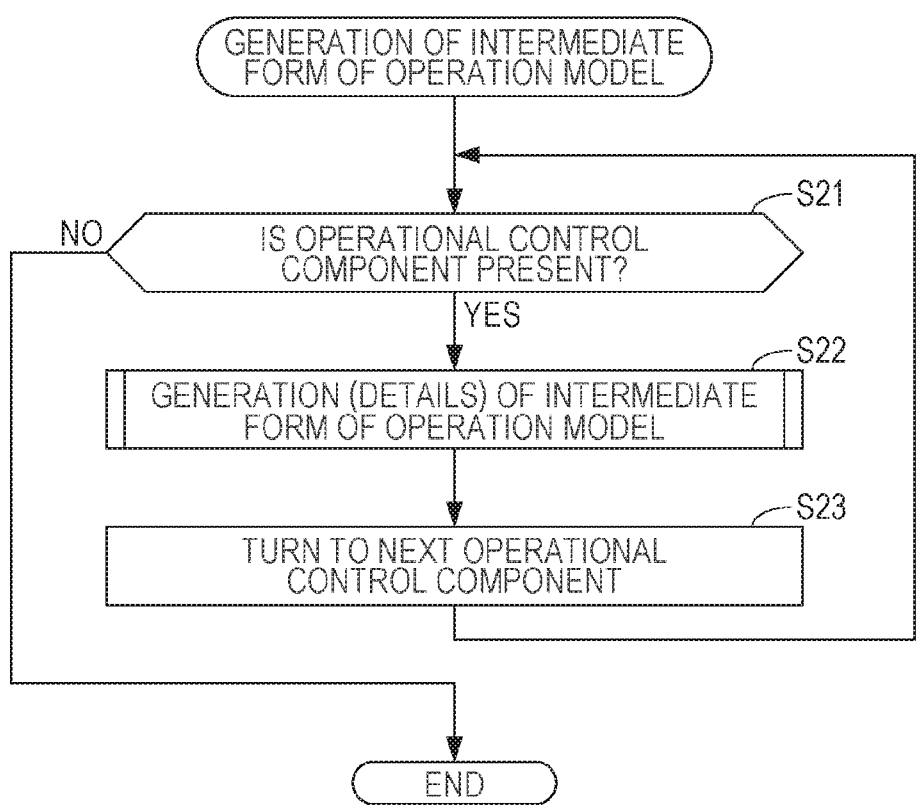
FIG. 27 is a flowchart illustrating an example of generation of an intermediate form of the operation model.

FIG. 27 is a flowchart illustrating an example of generation of the intermediate form of the operation model. Processing that is illustrated in FIG. 27 will be described below in order of increasing a step number. The following procedure is equivalent to Step S2 in FIG. 24.

(S21) For the workflow 20, the control section 130 determines whether the operational control component is present, referring to the workflow management table 111. In the case where the operational control component is present, the processing proceeds to Step S22. In a case where the operational control component is not present, the processing is ended. The determination is made for the operational control component currently on focus. For example, the operational control component that is the first determination target is an operational control component that is equivalent to "Start", and the operational control component that is the determination target when Step S21 is next performed is the operational control component 21. As illustrated in FIG. 27(and FIG. 28 that will be referred to below), the operational control component that, in Step S21, is determined as being present is referred to as an "operational control component on focus."

(S22) The control section 130 generates the intermediate form of the operation model for the operational control component on focus. That is, the control section 130 generates a record for the operational control component, and registers the generated the record in the operation model state management table 116. The details will be described below.

(S23) The control section 130 turns to the next operational control component in the workflow 20. Then, the processing proceeds to Step S21. Moreover, in the case where the current operational control component currently on focus is the operational control component that is equivalent to "End", the next operational control component is not present. In this case, the control section 130 causes the processing to proceed to Step S21 and executes Step S21. As a result, in Step S21, it is determined that the operational control component is not present, and the generation of the intermediate form for each operational control component in the workflow 20 is completed.

Figure 28:
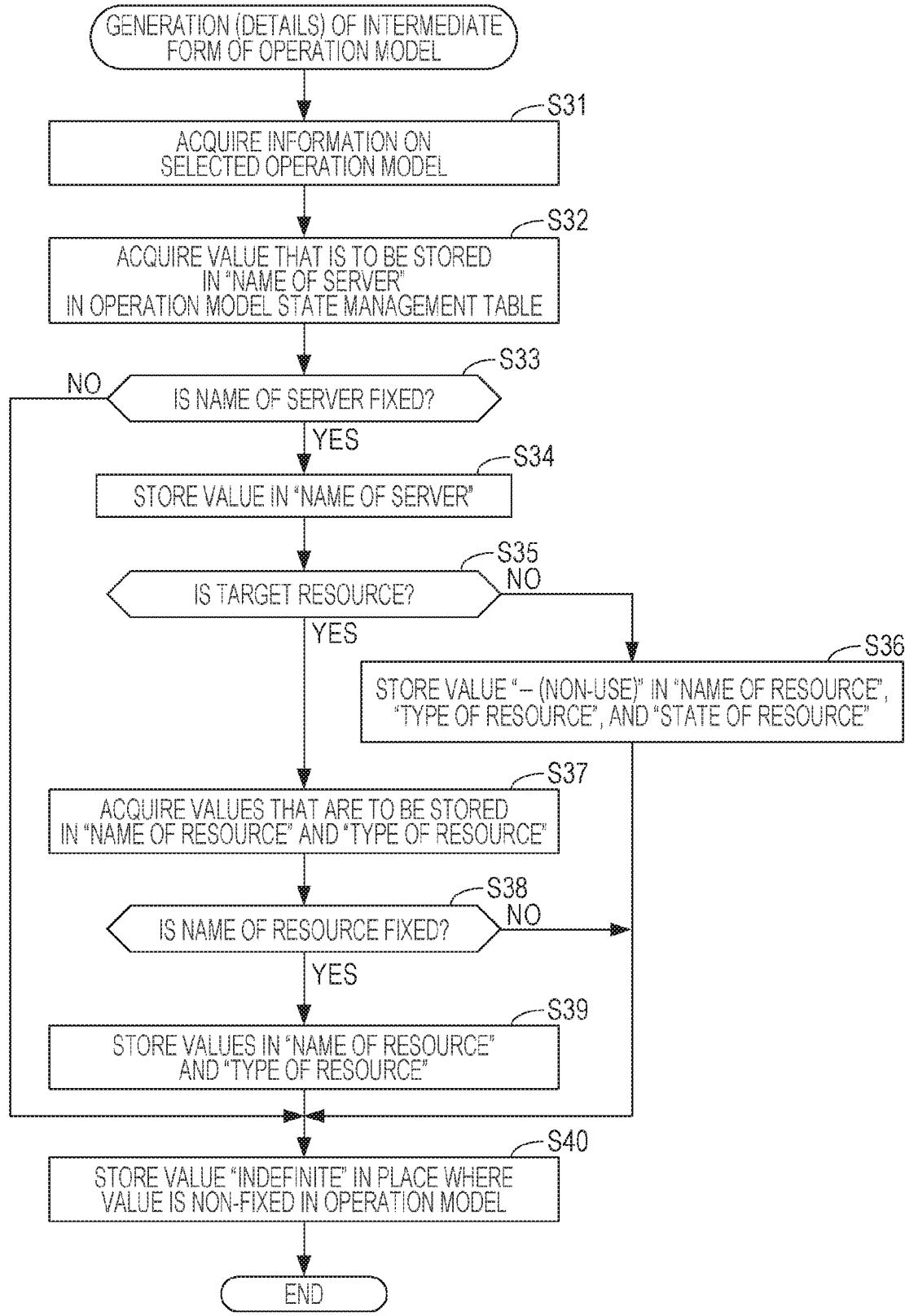
FIG. 28 is a flowchart illustrating an example of the generation (details) of the intermediate form of the operation model.

FIG. 28 is a flowchart illustrating an example of the generation (details) of the intermediate form of the operation model. Processing that is illustrated in FIG. 28 will be described below in order of increasing a step number. The following procedure is equivalent to Step S22 in FIG. 27.

(S31) The control section 130 acquires the information on the operation model that is selected for the operational control component on focus, referring to the workflow management table 111. The control section 130 newly creates a record for storing the acquired information on the operation model, in the operation model state management table 116, and stores the information on the operation model. For example, in a case where the operational control component on focus is the operational control component 21, the control section 130 acquires the operation model A from the workflow management table 111. The control section 130 creates a record (the instance number is "1", the workflow number is "1", and the component number is "1") that corresponds to the operational control component 21, in the operation model state management table 116, and stores the operation model "A" in the record. In the record, the control section 130 sets an initial value of the post-improvement next-component number to a setting value "2" of the next component number of the operational control component 21 in the workflow management table 111.

(S32) The control section 130 acquires a value that is to be stored in "name of server" in the operation model state management table 116 for the operational control component on focus, referring to the workflow management table 111 and the variable management table 113. For example, in the case where the operational control component on focus is the operational control component 21, the control section 130 specifies from the workflow management table 111 that a variable name which is equivalent to the name of the server is "variable 1". Then, referring to the variable management table 113, the control section 130 specifies that a variable value which corresponds to "variable 1" is "X". Moreover, in some cases, depending on the workflow, the name of the server that is the control target of the operational control component on focus is non-fixed in this stage, and a corresponding variable value in the variable management table 113 is no-setting "-". This is because, in some cases, the name of the server that is the control target is fixed in accordance with the execution of the operational control component in a stage where the workflow is in execution.

(S33) The control section 130 determines whether the name of the server is fixed. In a case where the name of the server is fixed, the processing proceeds to Step S34. In a case where the name of the server is non-fixed, the processing proceeds to Step S40. In Step S32, if any variable value (for example, "X" or the like) is set for a variable (for example, "variable 1" or the like) that is equivalent to the name of the server in the variable management table 113, the name of the server is fixed. In the variable management table 113, if the variable that is equivalent to the name of the server is no-setting "-", the name of the server is non-fixed.

(S34) The control section 130 stores the name of the server that is acquired in Step S32, in a record for the operational control component on focus in the operation model state management table 116. For example, if the operational control component on focus is the operational control component 21, the name of the server "X" is stored in a record for the operational control component 21 in the operation model state management table 116.

(S35) Based on the operation model that is acquired in Step S31, the control section 130 determines whether the control target of the operational control component on focus is the resource. In a case where the control target is not the resource, the processing proceeds to Step S36. In a case where the control target is the resource, the processing proceeds to Step S37. For example, if the operational control component on focus is the operational control component 21, because the operation model is "A" and the control target is the server, No is established in Step S35 (the processing proceeds to Step S36). On the other hand, for example, if the operational control component on focus is the operational control component 23, because the operation model is "D" and the control target is the resource, Yes is established in Step S35 (the processing proceeds to Step S37).

(S36) The control section 130 stores a value "-" indicating non-use in the name of the resource, the type of the resource, and the state of the resource for the operational control component on focus in the operation model state management table 116. This is because, if the control target is the resource (if the control target is the server), information on the resource is not used for the determination of the possibility of the parallel execution. Then, the processing proceeds to Step S40.

(S37) The control section 130 acquires values that are to be stored in "name of resource" and "type of resource" in the operation model state management table 116 for the operational control component on focus, referring to the workflow management table 111, the operational control component definition table 112, and the variable management table 113. For example, in the case where the operational control component on focus is the operational control component 23, the control section 130 specifies from the workflow management table 111 that a variable name which is equivalent to the name of the resource is "variable 2". Then, referring to the variable management table 113, the control section 130 specifies that a variable value which corresponds to "variable 2" is S. Furthermore, in this case, the control section 130 specifies from the operational control component definition table 112 that the type of the resource in the operational control component 23 ("checking of activation of service) is "Service.Account". Moreover, as in Step S32, in some cases, depending on the workflow, the name of the resource that is the control target of the operational control component on focus is non-fixed in this stage, and a corresponding variable value in the variable management table 113 is no-setting "-". This is because, in some cases, the name of the resource for each of the operational control components in the operation model state management table 116 is fixed in accordance with the execution of the operational control component in the workflow in the stage where the workflow is in execution. Then, the processing proceeds to Step S38.

(S38) The control section 130 determines whether the name of the resource is fixed. In a case where the name of the resource is fixed, the processing proceeds to Step S39. In a case where the name of the resource is non-fixed, the processing proceeds to Step S40. In Step S37, if any variable value (for example, "Y" or the like) is set for a variable (for example, "variable 2" or the like) that is equivalent to the name of the resource in the variable management table 113, the name of the resource is fixed. If, in the variable management table 113, the variable that is equivalent to the name of the resource is no-setting "-", the name of the server is not decided.

(S39) The control section 130 stores the name of the resource and the type of the resource that are acquired in Step S37, in the record for the operational control component on focus in the operation model state management table 116. For example, if the operational control component on focus is the operational control component 23, the name of the resource "S" and the type of the resource "Service.Account" are stored in the record for the operational control component 23 in the operation model state management table 116.

(S40) The control section 130 stores a value "indefinite" in a place where a value is non-fixed in the operation model in the operation model state management table 116. For example, in the case where the operational control component on focus is the operational control component 21, the state of the server is non-fixed in this stage. Therefore, the state of the server in a record for the operational control component 21 in the operation model state management table 116 is set to be "indefinite". As described above, in some cases, the name of the server is non-fixed, and in such a case, the name of the server is set to be "indefinite". Furthermore, for example, in the case where the operational control component on focus is the operational control component 23, the state of the resource is non-fixed in this stage. Therefore, the state of the resource in the record for the operational control component 23 in the operation model state management table 116 is set to be "indefinite". As described above, in some cases, the name of the resource is non-fixed, the name of the resource is also set to be "indefinite". The control section 130 sets items relating to the server or the resource in the operation model state management table 116, to no-setting "-" without any change, for the operational control component that is equivalent to "Start" or "End".

Moreover, the name of the server and the name of the resource are described as being indefinite in some cases, referring to Steps S32, S33, S37, and S38. In this case, as also described referring to the steps, a variable value is set to be in the variable management table 113 in accordance with the execution each of the operational control component that are included in the workflow.

Figure 29:
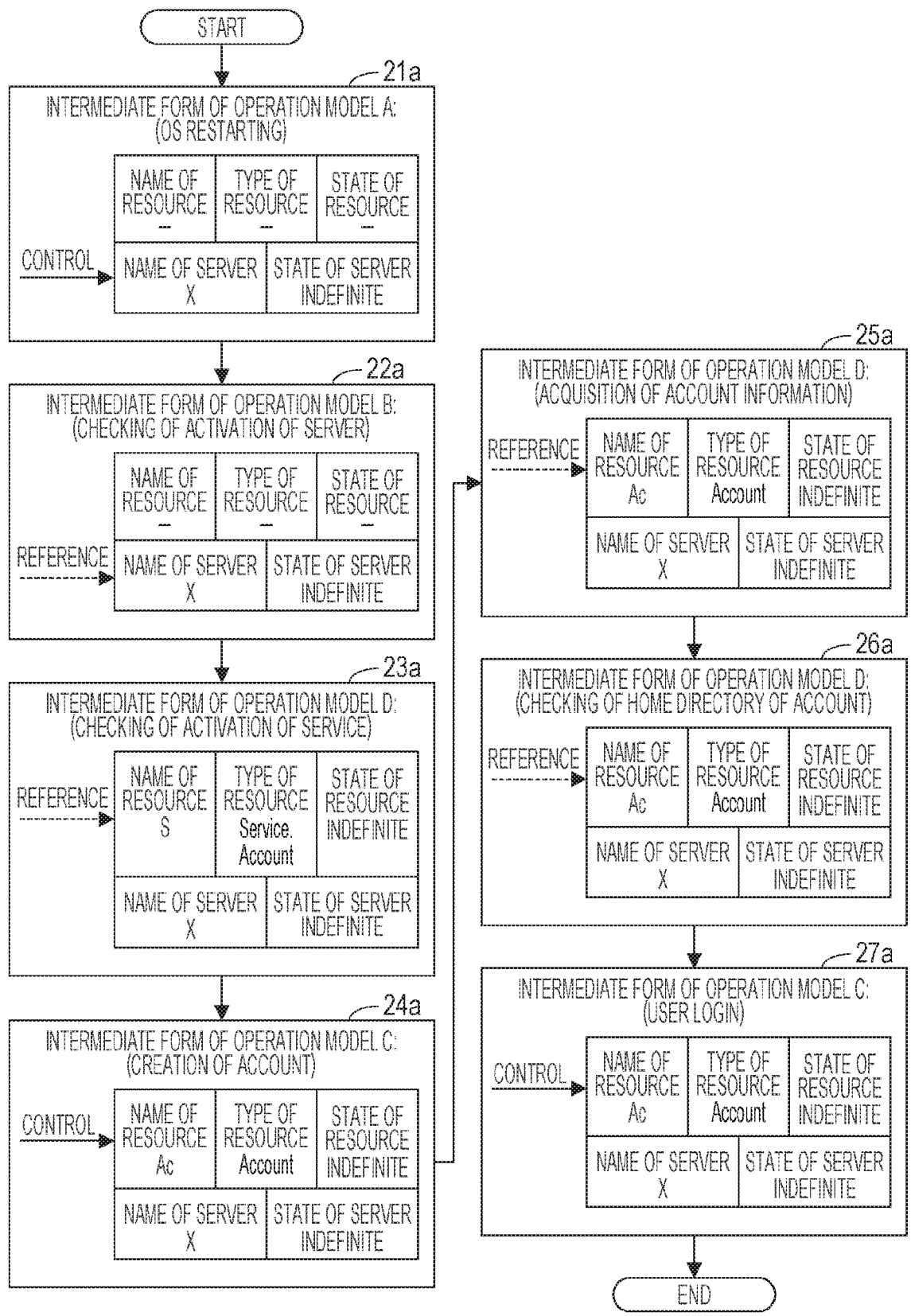
FIG. 29 is a diagram illustrating a specific example of the generation of the intermediate form of the operation model.

FIG. 29 is a diagram illustrating a specific example of the generation of the intermediate form of the operation model. The control section 130 generates intermediate forms 21a, 22a, 23a, 24a, 25a, 26a, and 27a for the workflow 20, according to the procedure in FIG. 28.

The intermediate form 21a is an intermediate form for the operational control component 21 (the operation model A: server control). According to the workflow management table 111 and the variable management table 113, the name of the server "X" is fixed in the operational control component 21 (of which the operational control component name is "OS restarting"). Furthermore, in a stage of the generation of the intermediate form 21a, the state of the server is non-fixed. For this reason, in the intermediate form 21a, the name of the server is "X", and the state of the server is "indefinite". Because the control target is the server, in the operation model A, "-" indicating the non-use is registered in the items (the name of the resource, the type of the resource, and the state of the resource) relating to the resource.

The intermediate form 22a is an intermediate form for the operational control component 22 (the operation model B: server reference). According to the workflow management table 111 and the variable management table 113, in the operational control component 22 (of which the operational control component name is "checking of activation of "server"), the name of the server "X" is fixed. Furthermore, in a stage of the generation of the intermediate form 22a, the state of the server is non-fixed. For this reason, in the intermediate form 22a, the name of the server is "X" and the state of the server is "indefinite". Because, in the operation model B, the control target is the server, "-" indicating the non-use is registered in the items relating the resource.

The intermediate form 23a is an intermediate form for the operational control component 23 (the operation model D: resource reference). According to the workflow management table 111 and the variable management table 113, in the operational control component 23 (of which the operational control component name is "checking of activation of "service"), the name of the server "X" and the name of the resource "S" are fixed. Furthermore, according to the operational control component definition table 112, in the operational control component 23, the type of the target (the type of the resource) is "Service.Account". Additionally, in a stage of the generation of the intermediate form 23a, the state of the server and the state of the resource are non-fixed. For this reason, in the intermediate form 23a, the name of the server is "X", the state of the server is "indefinite", the name of the resource is "S", the type of the resource is "Service.Account", and the state of the resource is "indefinite".

The intermediate form 24a is an intermediate form for the operational control component 24 (the operation model C: resource control). According to the workflow management table 111 and the variable management table 113, in the operational control component 24 (of which the operational control component name is "creation of account"), the name of the server "X" and the name of the resource "Ac" are fixed. Furthermore, according to the operational control component definition table 112, in the operational control component 24, the type of the target (the type of the resource) is "Account". Additionally, in a stage of the generation of the intermediate form 24a, the state of the server and the state of the resource are non-fixed. For this reason, in the intermediate form 24a, the name of the server is "X", the state of the server is "indefinite", the name of the resource is "Ac", the type of the resource is "Account", and the state of the resource is "indefinite".

The intermediate form 25a is an intermediate form for the operational control component 25 (the operation model D: resource reference). According to the workflow management table 111 and the variable management table 113, in the operational control component 25 (of which the operational control component name is "acquisition of account information"), the name of the server "X" and the name of the resource "Ac" are fixed. Furthermore, according to the operational control component definition table 112, in the operational control component 25, the type of the target (the type of the resource) is "Account". Additionally, in a stage of the generation of the intermediate form 25a, the state of the server and the state of the resource are non-fixed. For this reason, in the intermediate form 25a, the name of the server is "X", the state of the server is "indefinite", the name of the resource is "Ac", the type of the resource is "Account", and the state of the resource is "indefinite".

The intermediate form 26a is an intermediate form for the operational control component 26 (the operation model D: resource reference). According to the workflow management table 111 and the variable management table 113, in the operational control component 26 (of which the operational control component name is "checking of home directory of account"), the name of the server "X" and the name of the resource "Ac" are fixed. Furthermore, according to the operational control component definition table 112, in the operational control component 26, the type of the target (the type of the resource) is "Account". Additionally, in a stage of the generation of the intermediate form 26a, the state of the server and the state of the resource are non-fixed. For this reason, in the intermediate form 26a, the name of the server is "X", the state of the server is "indefinite", the name of the resource is "Ac", the type of the resource is "Account", and the state of the resource is "indefinite".

The intermediate form 27a is an intermediate form for the operational control component 27 (the operation model C: resource control). According to the workflow management table 111 and the variable management table 113, in the operational control component 27 (of which the operational control component name is "user login"), the name of the server "X" and the name of the resource "Ac" are fixed. Furthermore, according to the operational control component definition table 112, in the operational control component 27, the type of the target (the type of the resource) is "Account". Additionally, in a stage of the generation of the intermediate form 27a, the state of the server and the state of the resource are non-fixed. For this reason, in the intermediate form 27a, the name of the server is "X", the state of the server is "indefinite", the name of the resource is "Ac", the type of the resource is "Account", and the state of the resource is "indefinite".

FIG. 30 is a diagram illustrating an example of an operation model state management table after the generation of the intermediate form. An operation model state management table 116b is an example of the intermediate form that is illustrated in FIG. 29. In this manner, the control section 130 generates information on the intermediate form of each of the operational control component, and registers the generated information in the operation model state management table 116b. The control section 130 manages the state of the control target that is dynamically changed in accordance with the execution of the workflow 20, based on the information on the intermediate form. Moreover, for the operational control component that equivalent to "Start" or "End", no-setting "-" is registered in the items for the name of the resource, the type of the resource, the state of the resource, the name of the server, the state of the server, and the operation model.

Figure 31:
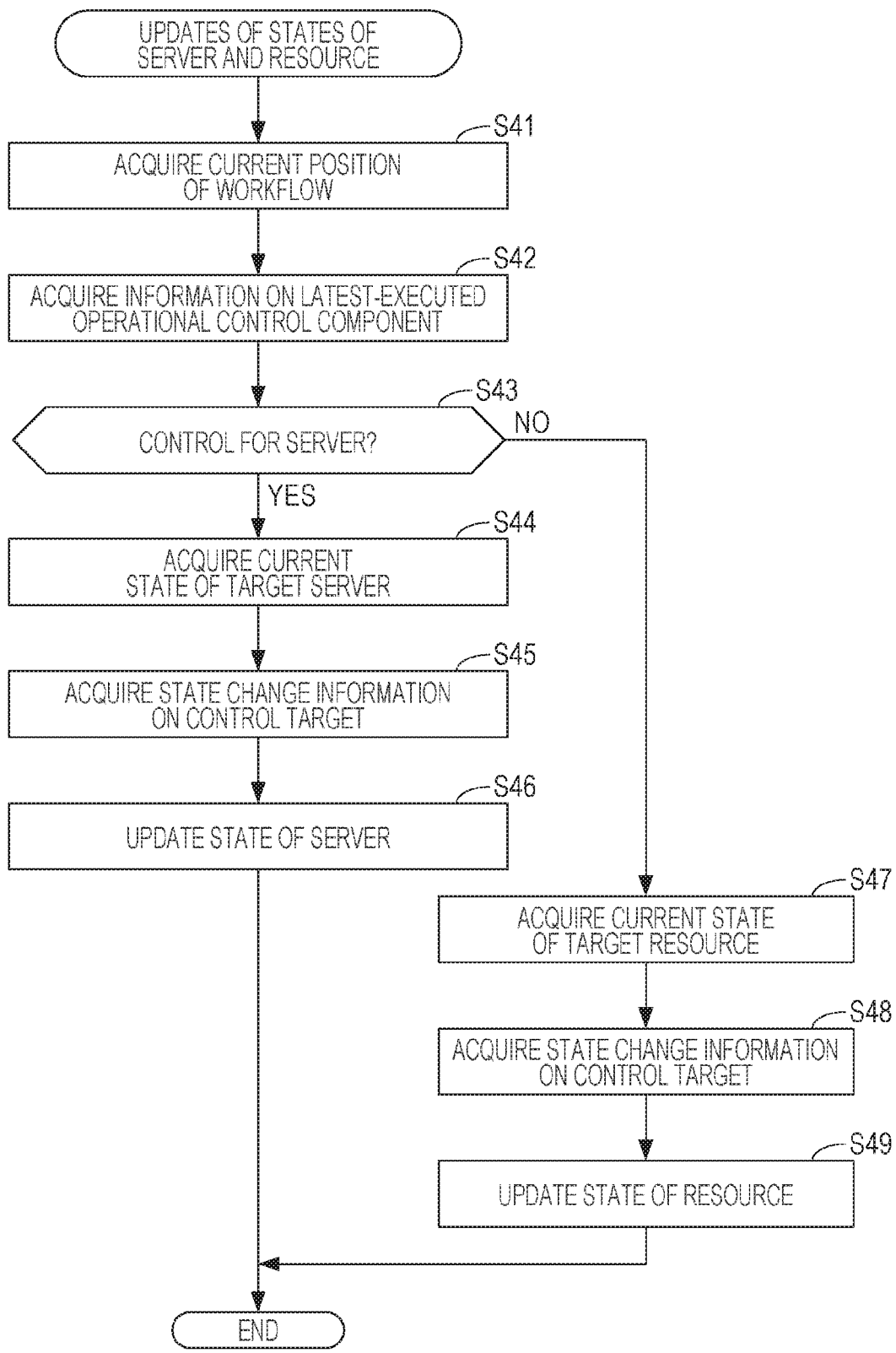
FIG. 31 is a flowchart illustrating an example of updates of states of a server and a resource.

FIG. 31 is a flowchart illustrating an example of updates states of the server and the resource. Processing that is illustrated in FIG. 31 will be described below in order of increasing a step number. The following procedure is equivalent to Step S4 in FIG. 24.

(S41) The control section 130 acquires a current position of the workflow 20 (the instance number "1"). Specifically, the control section 130 acquires the current position of the workflow 20 that is a current component number in a record containing the instance number "1" in the instance management table 114. As described above, the component number of the operational control component that is to be executed next is registered in an item for the current component number in the instance management table 114.

(S42) The control section 130 acquires information on the operational control component that was last executed. For example, in a case where the current operational control component (the current position) is the operational control component 21, the operational control component that was last executed is an operational control component that is equivalent to "Start". Furthermore, in the case where the current operational control component (the current position) is the operational control component 22, the operational control component that was last executed is the operational control component 21. Moreover, in a case where the operational control component that was last executed is an operational control component that is equivalent to "Start", the control section 130 exceptionally ends processing of the present state update.

(S43) The control section 130 determines whether a latest-executed operational control component is a control for the server. If the latest-executed operational control component is the control for the server, the processing proceeds to Step S44. If the latest-executed operational control component is not the control for the server, the processing proceeds to Step S47. Specifically, in a case where the latest-executed operational control component is categorized as the operation model A, the operational control component is the control for the server. Furthermore, in a case where the latest-executed operational control component is categorized as an operation model other than the operation model A, the operational control component is not the control for the server.

(S44) The control section 130 acquires a current state of the server that is the target for the control by latest-executed operational control component, referring to the server state management table 119. That is, for the server that is the target for the control by the latest-executed operational control component, the control section 130 acquires a state that is currently set in the server state management table 119. For example, in a case where the latest-executed operational control component is the operational control component 21, according to the workflow management table 111, a variable that is equivalent to the name of the server is "variable 1". According to the variable management table 113, a variable value of "variable 1" is "X". Consequently, the control section 130 acquires a state that is set to be in a record containing the instance number "1" and the name of the server "X" in the server state management table 119, as the current state of the server that is the target for the control by the latest-executed operational control component 21.

(S45) The control section 130 acquires state change information on the server that is the target for the control by the latest-executed operational control component, referring to the state transition definition table 117. For example, in a case where the latest-executed operational control component is the operational control component 21 (of which the operational control component name is "OS restarting"), according to the state transition definition table 117, two types of the state change information are registered. The first type indicates a state transition in which a transition from the state of the pre-control server "ON" to the state of the post-control server "indefinite" takes place. The second type indicates a state transition in which a transition from the state of the pre-control server "indefinite" to the state of the post-control server "indefinite" takes place.

(S46) The control section 130 updates the state of the server that is the control target. Specifically, the control section 130 obtains the state of the post-control server by applying the current state that is acquired in Step S44, to the state of the pre-control server, with respect to the state change information that is acquired in Step S45. Take, for example, the operational control component 21 described above. Because, although the state that is acquired in Step S44 is either "ON" or "indefinite", the state of the post-control server is "indefinite", the state of the posit-control server is "indefinite". However, the state of the post-control server varies according to the state of the pre-control server. In this case, the control section 130 selects the state of post-control server according to the state of the pre-control server. The control section 130 registers the state of the acquired post-control server in the server state management table 119. Take, for example, the operational control component 21. A state of the record containing the instance number "1" and the name of the server "X" in the server state management table 119 is updated (in this case, if the state of the pre-control server is "indefinite", the state of the pre-control server also remains "indefinite"). Accordingly, after the latest-executed operational control component is executed, the state of the server that is the control target is reflected in the server state management table 119. Then, the processing is ended.

(S47) The control section 130 acquires the current state of the resource that is the target for the control by the latest-executed operational control component, referring to the resource state management table 120. That is, for the resource that is the target for the control by the latest-executed operational control component, the control section 130 acquires a state that is currently set in the resource state management table 120. For example, in the case where the latest-executed operational control component is the operational control component 23, according to the workflow management table 111, a variable that is equivalent to the name of the server is "variable 1", and a variable that is equivalent to the name of the resource is "variable 2". According to the variable management table 113, the variable value of "variable 1" is "X" and a variable value of "variable 2" is S. Consequently, the control section 130 acquires a state that is set to be in a record containing the instance number "1", the name of the server "X", and the name of the resource "S" in the resource state management table 120, as the current state of the resource that is the target for the control by the latest-executed operational control component 23.

(S48) The control section 130 acquires state change information on the resource that is the target for the control by the latest-executed operational control component, referring to the state transition definition table 117. For example, in a case where the latest-executed operational control component is the operational control component 23 (of which the operational control component name is "checking of activation of service), according to the state transition definition table 117, two types of the state change information are registered. The first type indicates a state transition in which a transition from the state of the pre-control resource "Start" to the state of the post-control resource "Start" takes place. The first type indicates a state transition in which a transition from the state of the pre-control resource "indefinite" to the state of the post-control resource "Start" takes place.

(S49) The control section 130 updates the state of the resource that is the control target. Specifically, the control section 130 obtains the state of the post-control resource by applying the current state that is acquired in Step S47, to the state of the pre-control resource, with respect to the state change information that is acquired in Step S48. Take, for example, the operational control component 23 described above. Because, although the state that is acquired in Step S47 is either "Start" or "indefinite", the state of the post-control resource is "Start". However, the state of the post-control resource varies according to the state of the pre-control resource. In this case, the control section 130 selects the state of the post-control resource according to the pre-control resource. The control section 130 registers the state of the acquired post-control resource in the resource state management table 120. Take, for example, the operational control component 23. A state of the record containing the instance number "1" and the name of the server "X", and the name of the resource "S" in the resource state management table 120 is updated (in this case, if the state of the pre-control server is "Start", the state of the post-control server also remains "Start"). Accordingly, after the latest-executed operational control component is executed, the state of the resource that is the control target is reflected in the resource state management table 120. Then, the processing is ended.

Figure 32:
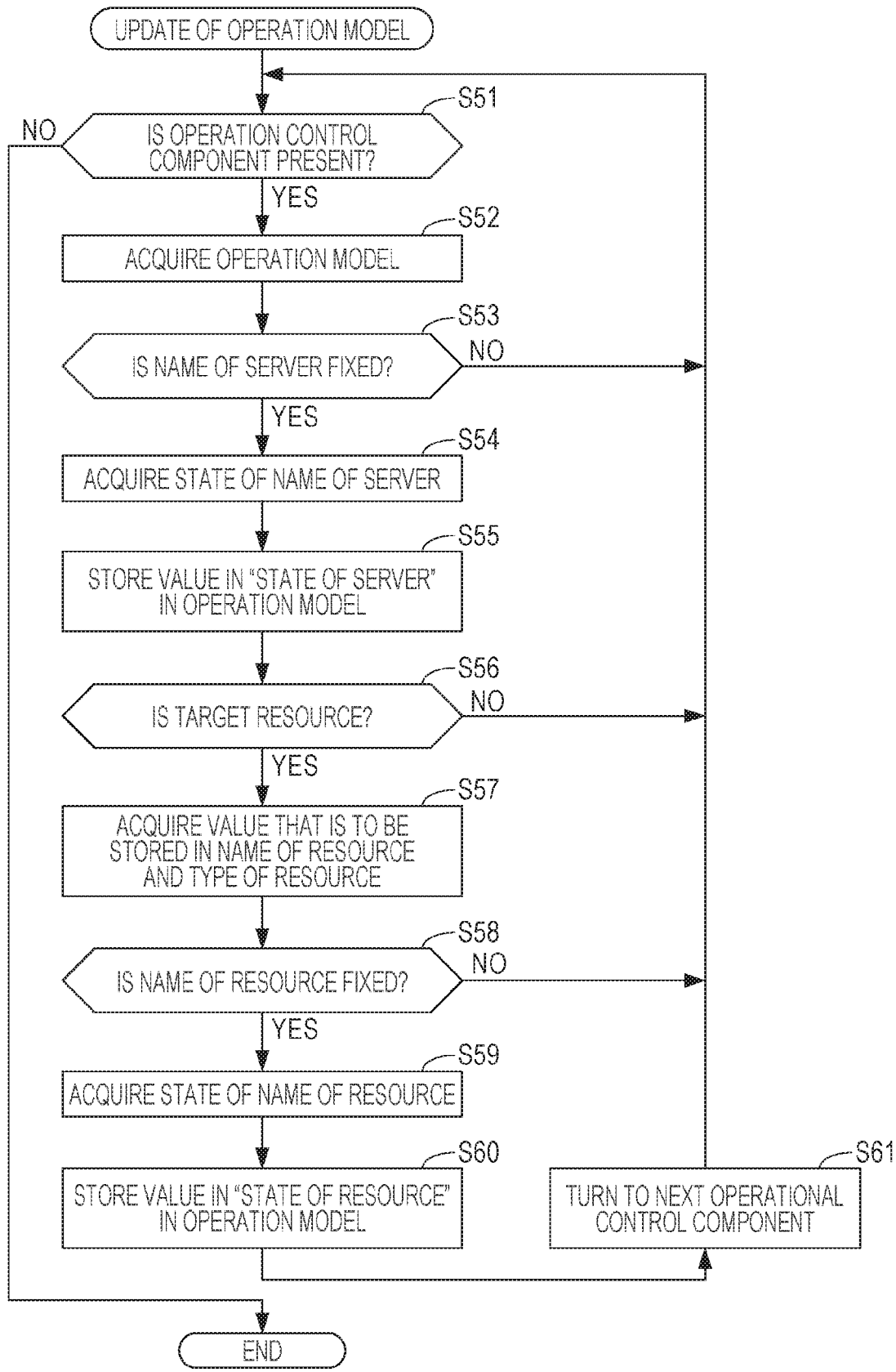
FIG. 32 is a flowchart illustrating an example of an update of the operation model.

FIG. 32 is a flowchart illustrating an example of an update of the operation model. Processing that is illustrated in FIG. 32 will be described below in order of increasing a step number. The following procedure is equivalent to Step S5 in FIG. 24.

(S51) The control section 130 determines whether the operational control components (the not-in-execution operational control components) that are operational control components that are to be next and later executed are present in the workflow 20, referring to the workflow management table 111. In the case where the operational control component is present, the processing proceeds to Step S52. In the case where the operational control component is not present, the processing is ended. For example, the operational control component that is the first determination target after the latest-executed operational control component (for example, the operational control component that is equivalent to "Start") is an operational control component that is to be executed next (for example, the operational control component 21). The operational control component that is the determination target when Step S51 is next performed is an operational control component (for example the operational control component 22) that is to be executed next. As illustrated in FIG. 32, the operational control component that, in Step S51, is determined as being present is referred to as an "operational control component on focus". Moreover, in a case where the operational control component that will be the next processing target is the operational control component that is equivalent to "End", because the subsequent processing may not be performed, the processing is ended.

(S52) The control section 130 acquires the operation model from the operation model state management table 116. For example, if the operational control component on focus is the operational control component 21, a record (a record containing the instance number "1", the workflow number "1", and the component number "1") containing the operation model "A" that corresponds to the operational control component 21 is acquired from the operation model state management table 116.

(S53) The control section 130 determines whether the name of the server is fixed, based on the workflow management table 111 and the variable management table 113. In the case where the name of the server is fixed, the processing proceeds to Step S54. In a case where the name of the server is not decided, the processing proceeds to Step S51. For example, in a case where the operational control component on focus is the operational control component 21 (of which the operational control component name is "re-activation of server), according to the workflow management table 111, a variable indicating the name of the server is "variable 1". In the variable management table 113, the variable value "X" is set for "variable 1". In this case, the name of the server is fixed. At this time, if the name of the server is indefinite in a record in the operation model state management table 116, which is acquired in Step S52, a variable value that is specified in the variable management table 113 is set for the name of the server (the name of the server is fixed by the execution of the workflow). On the other hand, if a variable value for the variable indefinite in the variable management table 113, the name of the server is not fixed.

(S54) The control section 130 acquires a state that corresponds to the name of the server that is specified in Step S53, referring to the server state management table 119.

(S55) The control section 130 sets the state that is acquired in Step S54, to be in the item for the state of the server in the record that is acquired in Step S52, in the operation model state management table 116. Accordingly, the state of the server that is the control target is updated in the operation model state management table 116.

(S56) The control section 130 determines whether the control target of the operational control component on focus is the resource. In a case where the control target is the resource, the processing proceeds to Step S57. In a case where the control target is not the resource, the processing proceeds to Step S51. If the operation model of the operational control component on focus is "A" or "B", the control target is not the resource. If the operation model of the operational control component on focus is "C" or "D", the control target is the resource.

(S57) The control section 130 acquires values that are to be stored in the name of the resource and the type of the resource, referring to the workflow management table 111 and the operational control component definition table 112. For example, in a case where the operational control component on focus is the operational control component 23 (of which the operational control component name is "checking of activation of service"), according to the workflow management table 111, a variable indicating the name of the resource is "variable 2". In the variable management table 113, the variable value "S" is set for "variable 2". Furthermore, according to the operational control component definition table 112, the type of the resource that is the control target of the operational control component 23 is "Service.Account".

(S58) The control section 130 determines whether the name of the resource is fixed, based on the result that is acquired in Step S57. In the case where the name of the resource is fixed, the processing proceeds to Step S59. In the case where the name of the resource is not fixed, the processing proceeds to Step S51. For example, as described in Step S57, in a case where the name of the resource is acquired from the variable management table 113, the name of the resource is fixed. At this time, if the name of the resource is indefinite in the record in the operation model state management table 116, which is acquired in Step S52, the variable value that is specified in the variable management table 113 is set for the name of the resource (the name of the resource is fixed by the execution of the workflow). On the other hand, if the variable value for the variable indefinite in the variable management table 113, the name of the resource is not fixed.

(S59) The control section 130 acquires a state that corresponds to the name of the resource which is specified in Step S58, referring to the resource state management table 120.

(S60) The control section 130 sets the state that is acquired in Step S59, to be in the item for the state of the resource in the record that is acquired in Step S52, in the operation model state management table 116. Accordingly, the state of the resource that is the control target is updated in the operation model state management table 116.

(S61) The control section 130 turns to the next operational control component in the workflow 20. Then, the processing proceeds to Step S51. According to the procedure in FIG. 32, the setting values of the state of the server or the state of the resource in the operation model state management table 116 is updated for the operational control components that are the operational control component which are to be next or later executed.

Figure 33:
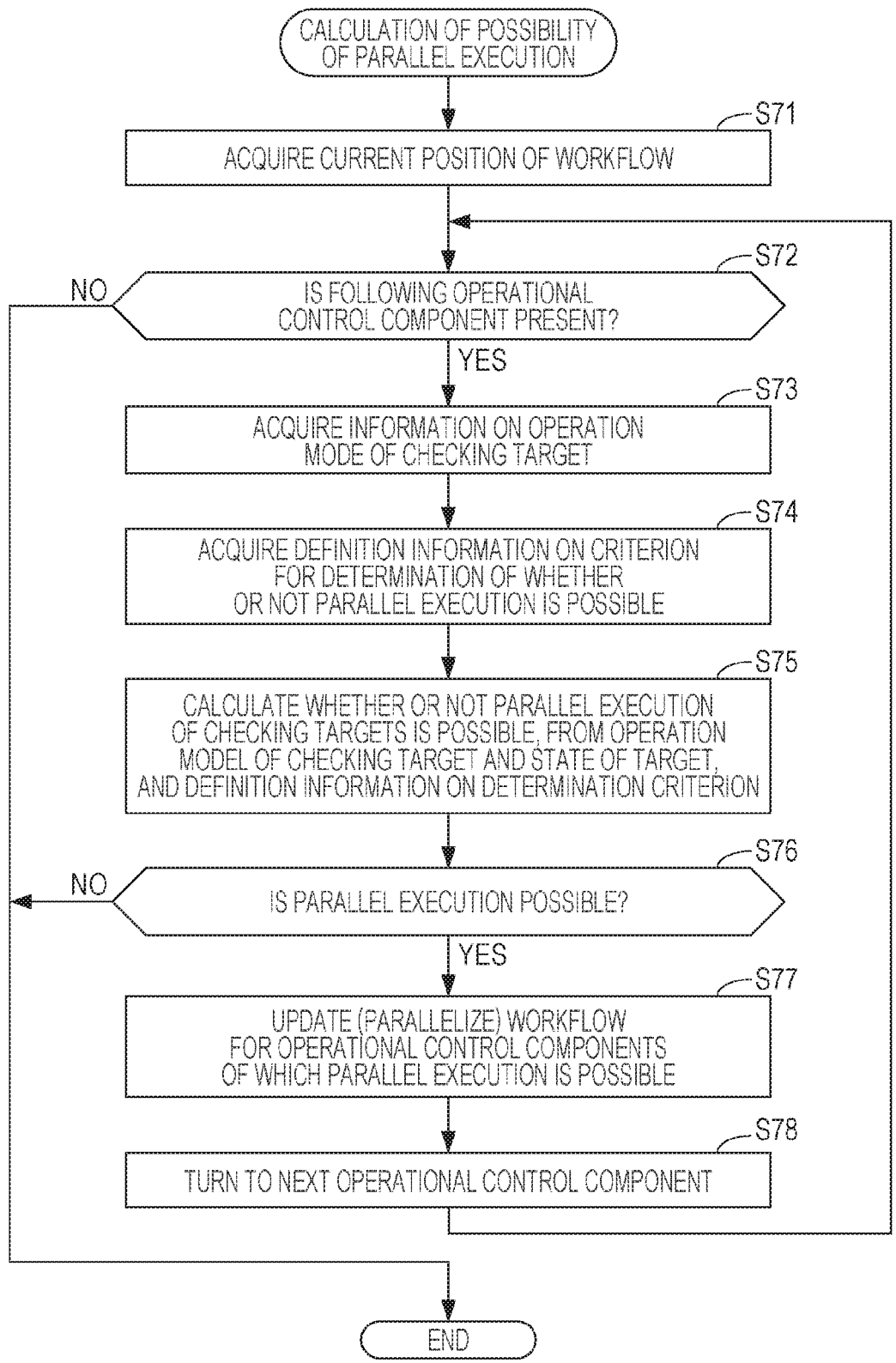
FIG. 33 is a flowchart illustrating an example of calculation of the possibility of the parallel execution.

FIG. 33 is a flowchart illustrating an example of calculation of the possibility of the parallel execution. Processing that is illustrated in FIG. 33 will be described below in order of increasing a step number. The following procedure is equivalent to Step S6 in FIG. 24.

(S71) The control section 130 acquires a current position of the workflow 20 (the instance number "1"). Specifically, the control section 130 acquires the current position of the workflow 20 that is a current component number in a record containing the instance number "1" in the instance management table 114. As described above, the component number of the operational control component that is to be executed next is registered in an item for the current component number in the instance management table 114.

(S72) The control section 130 determines whether the operational control component that follows the operational control component which is to be executed next is present. In a case where the following operational control component is present, the processing proceeds to Step S73. In a case where the following operational control component is not present, the control section 130 instructs the execution section 140 to execute the operational control component, and ends the processing. For example, if the operational control component that is to be executed next is the operational control component 21, the following operational control component is the operational control component 22. Moreover, in a case where the operational control component that is to be executed next is "End", because the operational control component that follows "End" is not present, the processing is ended.

(S73) The control section 130 acquires information on the operation model of a checking target. Specifically, the control section 130 acquires an operation model state of the operational control component (for example, the operational control component 21) that is to be executed next, from the operation model state management table 116. For example, the control section 130 acquires an operation model state of the following operational control component (for example, the operational control component 22 that follows the operational control component 21) from the operation model state management table 116.

(S74) The control section 130 acquires definition information (any record) on the determination criterion for the possibility of the parallel execution of the operational control component that is to be executed next and the following operational control component, from the parallel execution determination criterion definition table 118 and the sub-criterion definition table 118a. The control section 130 compares differences between the control targets of both of the operational control components in terms of the name of the server, the name of the resource, and the types of the resource, against the determination criterion. If whether the names of the servers and the names of the resources are the same or different from each other is determined, this may be satisfactory. The types of the resources may be compared as illustrated in FIG. 9.

(1) In a case where the types of the resources of both of the control targets are designated along with the attribute, the attributes of the types of the resources of both of the control targets are compared. If the attributes are the same, the types of the resources are the same. If the attributes are different from each other, the types of the resources are different from each other.

(2) In a case where an attribute is designated for the type of the resource of one of the control targets and an attribute is not designated for the type of the resource of the other, the attribute of the type of the resource designated for the one of the control targets and the attribute of the type of the resource designated for the other are compared. If the two attributes are the same, the types of the resources are the same. If the two attributes are different from each other, the types of the resources are different from each other.

(3) In a case where the attributes are not designated for the types of the resources of both of the control targets, the types of the resources that are designated for both of the control targets are compared. If the designated types of the resources are the same, the types of the resources are the same. If the designated types of the resources are different, the types of the resources are different from each other.

(S75) The control section 130 calculates whether the parallel execution of each of the operational control components that are the checking targets is possible, based on the definition information that is acquired in Step S74. For example, in a case where the next operational control component is the operational control component 24, the control section 130 determines that the parallel execution of the operational control component 24 and the following operational control component 25 is impossible. For example, in a case where the next operational control component is the operational control component 25, the control section 130 calculates that the parallel execution of the operational control component 25 and the following operational control component 26 is possible. A specific example of the determination of the possibility of the parallel execution will be described below.

(S76) The control section 130 determines whether it is calculated that the parallel execution of each of the operational control components that are the checking targets are possible, from the result of the calculation in Step S75. In a case where it is calculated that the parallel execution is possible, the processing proceeds to Step S77. In a case where it is determined that the parallel execution is impossible, the processing is ended.

(S77) The control section 130 updates the execution order of the workflow 20 for each of the operational control components of which the parallel execution is determined as possible. Specifically, the control section 130 acquires a record for the latest-executed operational control component from the operation model state management table 116. The control section 130 registers a component number of the operational control component that is to be executed next and a component number of the following operational control component that is specified in Step S72, in the post-improvement next-component number of the acquired record. For example, in a case where the next operational control component is the operational control component 25, the latest-executed operational control component is the operational control component 24, and the following operational control component is the operational control component 26. Consequently, the control section 130 sets the component number "5" (the operational control component 25) and the component number "6" (the operational control component 26) for the post-improvement next-component number, in a record for the operational control component 24 in the operation model state management table 116. In the case, the operational control components 25 and 26 are parallelized.

(S78) The control section 130 turns to the next operational control component in the workflow 20. Then, the processing proceeds to Step S 72. Moreover, in Step S78, in a case where the following operational control component is the operational control component that is equivalent to "End", the following operational control component is not present. In this case, the control section 130 causes the processing to proceed to Step S72, and executes Step S72. As a result, in Step S72, it is determined that the following operational control component is not present, and processing that calculates the possibility of the parallel execution of the operational control component that is to be executed next is completed.

According to a procedure in FIG. 33, for the operational control component that is to be executed next, the control section 130 determines that the parallel execution of the operational control component that is to be executed next and the following multiple operational control components is possible. For example, after it is determined that, in Step S77, the parallel execution of the operational control components 25 and 26 is possible, when Step S72 is executed, the control section 130 acquires the operational control component 27 as the following operational control component. In this case, the checking targets in Step S73 are two pairs, that is, a set of the operational control components 26 and 27, and a set of the operational control components 25 and 27. In the calculation of the possibility of the parallel execution in Step S75, in a case where the parallel execution of the operational control components 26 and 27 is possible and the parallel execution of the operational control components 25 and 27 is possible, the control section 130 calculates that the parallel execution of the operational control components 25, 26, and 27 is possible. On the other hand, in a case where the parallel execution of at least one of the operational control components 26 and 27, and the operational control components 25 and 27 is impossible, the control section 130 calculates that the parallel execution of the operational control components 25, 26, and 27 is impossible.

In this manner, when the first operational control component, the second operational control component that follows the first operational control component, and the third operational control component that follows the second operational control component are present, and the parallel execution of the first and second operational control components is possible, in a case where the parallel execution of any one of a set of the first and third operational control components, and a set of the second and third operational control components is possible, the control section 130 determines that the parallel execution of the first, second, and third operational control components is possible.

Figure 34:
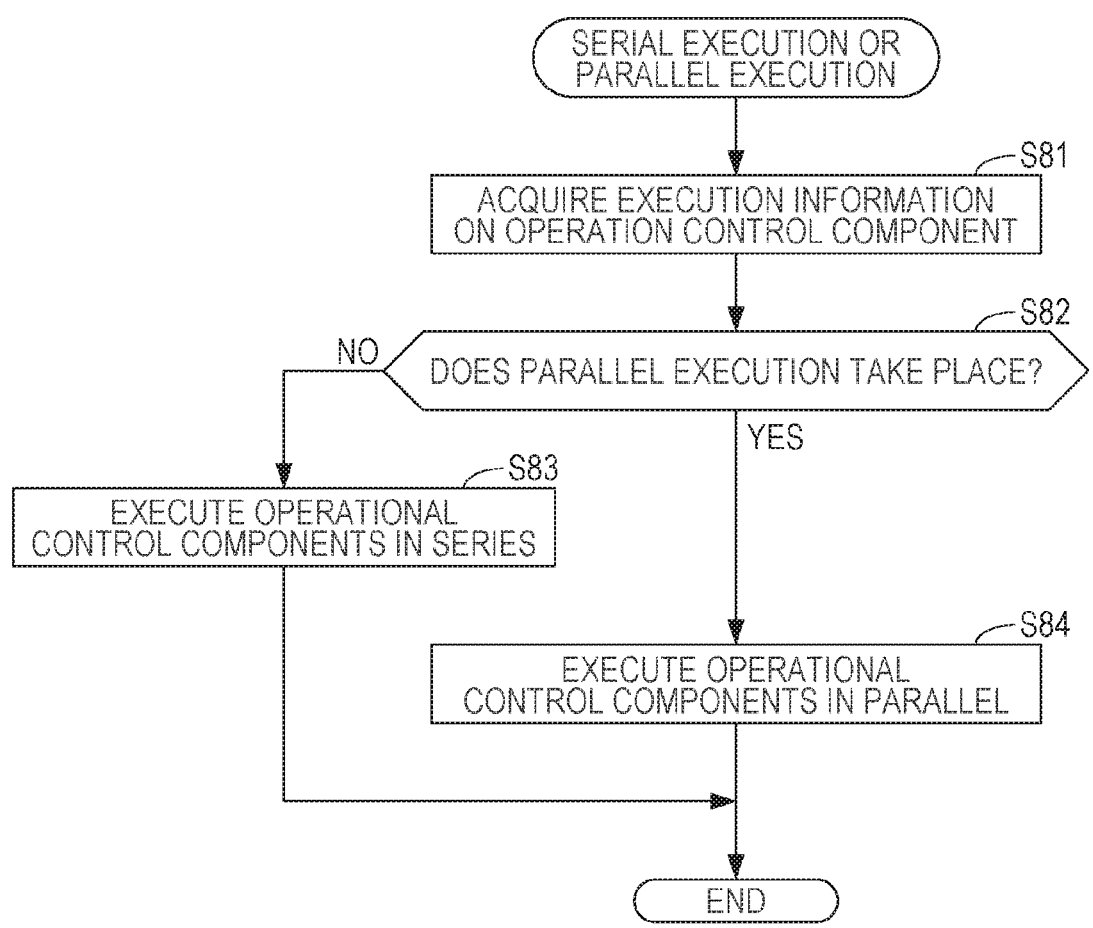
FIG. 34 is a flowchart illustrating an example of a serial execution or of the parallel execution.

FIG. 34 is a flowchart illustrating an example of the serial execution or of the parallel execution. Processing that is illustrated in FIG. 34 will be described below in order of increasing a step number. The following procedure is equivalent to Step S7 in FIG. 24.

(S81) The execution section 140 specifies the operational control component that is to be executed next, by referring to the post-improvement next-component number of the latest-executed operational control component in the operation model state management table 116. Take, for example, the operation model state management table 116, when the latest-executed operational control component is the operational control component 22 (the instance number "1" and the component number "2"), the operational control component that is to be executed next is the operational control component 23. Furthermore, when the latest-executed operational control component is the operational control component 24 (the instance number "1" and the component number "4"), the operational control components that are to be executed next are the operational control components 25 and 26. The execution section 140 acquires execution information on the operational control component that is to be executed next. The execution information is information indicating the content of processing by the operational control component. For example, pieces of execution information include command information for performing the processing (for example, the OS restarting, the creation of the account, or the like) by the operational control component on the control target. The command information is stored in advance in the storage section 110 in a state of being associated with the operational control component name. Furthermore, pieces of execution information include information on the variable value of every variable that is registered in the variable management table 113.

(S82) The execution section 140 determines whether the operational control component is executed in parallel. In a case where the parallel execution does not take place, the processing proceeds to Step S83. In a case where the parallel execution takes place, the processing proceeds to Step S84. For example, in Step S81, in a case where one operational control component is to be executed next, the execution section 140 determines that the operational control components are not executed in parallel. For example, in Step S82, in a case where multiple operational control components are to be executed next, the execution section 140 determines that the operational control components are executed in parallel.

(S83) The execution section 140 executes the operational control component in series. For example, in a case where the operational control component that is to be executed next is the operational control component 23, the execution section 140 executes only the operational control component 23. With the execution of the operational control component 23 by the execution section 140, the server (for example, the business server 200 or the like) that is the control target is instructed to perform processing in accordance with the operational control component 23. When a notification that the processing in accordance with the operational control component is completed is received from the server (the business server 200 or the like) that is the control target, the execution section 140 notifies the control section 130 that the execution of the operational control component is completed. The control section 130 updates the current component number in the instance management table 114. For example, if the execution of the operational control component 23 (the component number "3") is completed, the current component number in the instance management table 114 is updated from "3" to "4". This is because the post-improvement next-component number that corresponds to the operational control component 23 is "4" in the operation model state management table 116. Then, the processing is ended.

(S84) The execution section 140 execute the operational control component in parallel. For example, in a case where the operational control components that are to be executed next are the operational control components 25 and 26, the execution section 140 executes the operational control components 25 and 26 in parallel. With the execution of the operational control components 25 and 26 by the execution section 140, the server (for example, the business server 200 or the like) that is the control target is instructed to execute processing in accordance with the operational control components 25 and 26. When a notification that the processing in accordance with all the operational control components that are the targets for the parallel execution is completed is received from the server (the business server 200 or the like) that is the control target, the execution section 140 notifies the control section 130 that the execution of the operational control component is completed. The control section 130 updates the current component number in the instance management table 114. For example, if the execution of the operational control components 25 and 26 (the component numbers "5" and "6") is completed, the current component number in the instance management table 114 is updated from "5" to "7". This is because the post-improvement next-component number that corresponds to the operational control components 25 and 26 is "7" in the operation model state management table 116.

In this manner, the operational server 100 causes the execution of the operational control component to take place. Moreover, In Steps S83 and S84, the execution section 140 sets a variable value of the variable name that is registered in the variable management table 113, according to a result of executing the operational control component. For example, there is also a case where the operational control component is processing that acquires a variable value that is to be set for a certain variable, from a predetermined file. In this case, the execution section 140 can acquire the variable value from the server (for example, the business server 200 or the like) that is the control target, and can set the acquired variable value to be in the variable management table 113.

Figure 35:
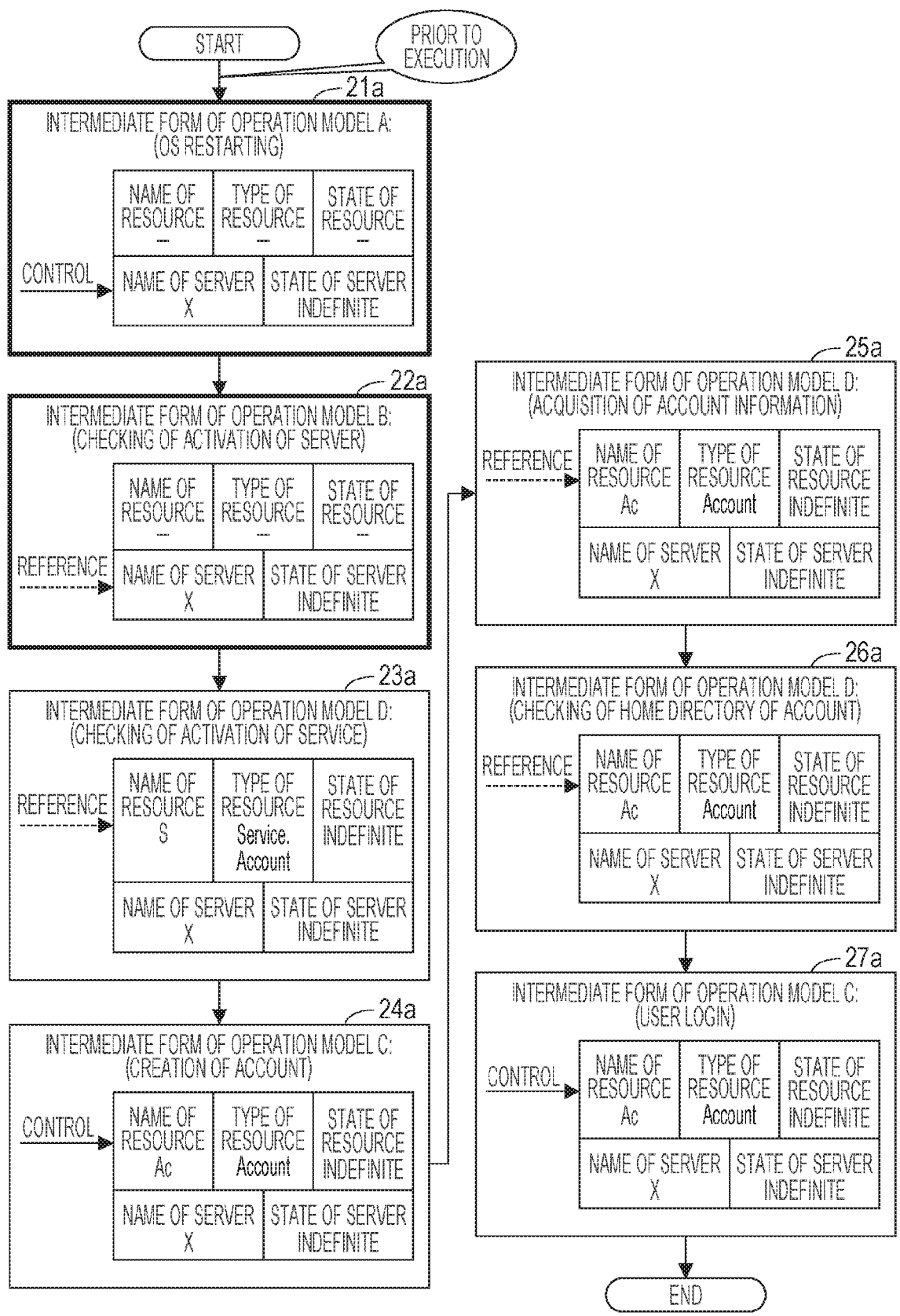
FIG. 35 is a diagram illustrating a first example of determination of the possibility of the parallel execution.

Next, a specific example of the determination (Step S75 in FIG. 33) of the possibility of the parallel execution for the workflow 20, which is based on the determination criterion that is described according to the second embodiment, is described. FIG. 35 is a diagram illustrating a first example of the determination of the possibility of the parallel execution. The control section 130 determines the possibility of the parallel execution of the operational control components 21 and 22 prior to the execution of the operational control component 21. The preceding operation model of the operational control component 21 is "A". The following operation model of the operational control component 22 is "B".

According to the parallel execution determination criterion definition table 118, a determination criterion that corresponds to the preceding operation model "A" and the following operation model "B" is a record with the number "1". In the operational control components 21 and 22, the names of the servers that are the control target are both "X" and thus are the same, and the servers are the same. The record with the number "1" in the parallel execution determination criterion definition table 118 indicates that, in a case where the servers are the same, the parallel execution is impossible. Consequently, the control section 130 determines that the parallel execution of the operational control components 21 and 22 is impossible.

Figure 36:
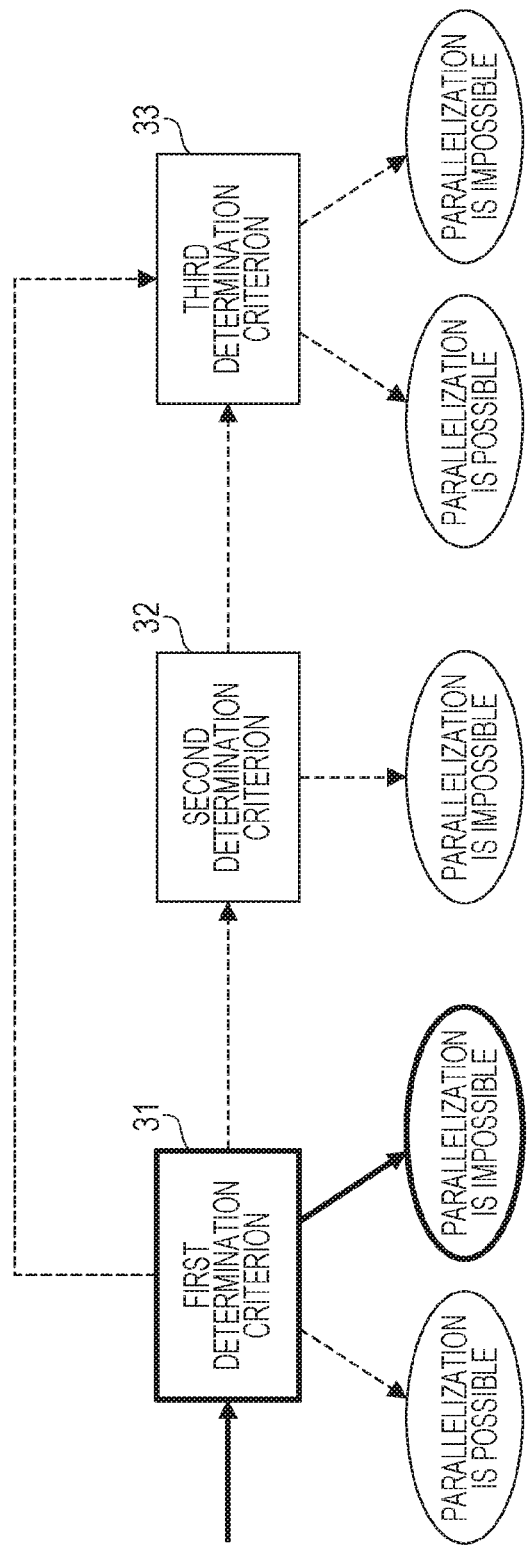
FIG. 36 is a diagram illustrating the first example (a continuance) of the determination of the possibility of the parallel execution.

FIG. 36 is a diagram illustrating a first example (a continuation) of the determination of the possibility of the parallel execution. In an example in FIG. 35, it is said that it is determined that the parallel execution is impossible, based on the first determination criterion 31. That is, prior to the execution of the operational control component 21 that is "OS restarting", the state of the control target of each of the operational control components and the state of the target that has a hierarchical relationship to the control target are acquired and the operation model state is updated. The operation model that is "OS restarting" and the operation model that is "checking of activation of server" have a reference relationship to the control for the same server. Consequently, the control section 130 determines that the parallel execution of the operational control component 21 that is "OS restarting" and the operational control component 22 that is "checking of activation of server" is impossible, based on the first determination criterion 31.

The execution section 140 executes the operational control component 21 serially, based on a result of the determination by the control section 130. The operational control component 21 is "OS restarting". According to the state transition definition table 117, the state of the server after the execution of the operational control component 21 is "indefinite".

Figure 37:
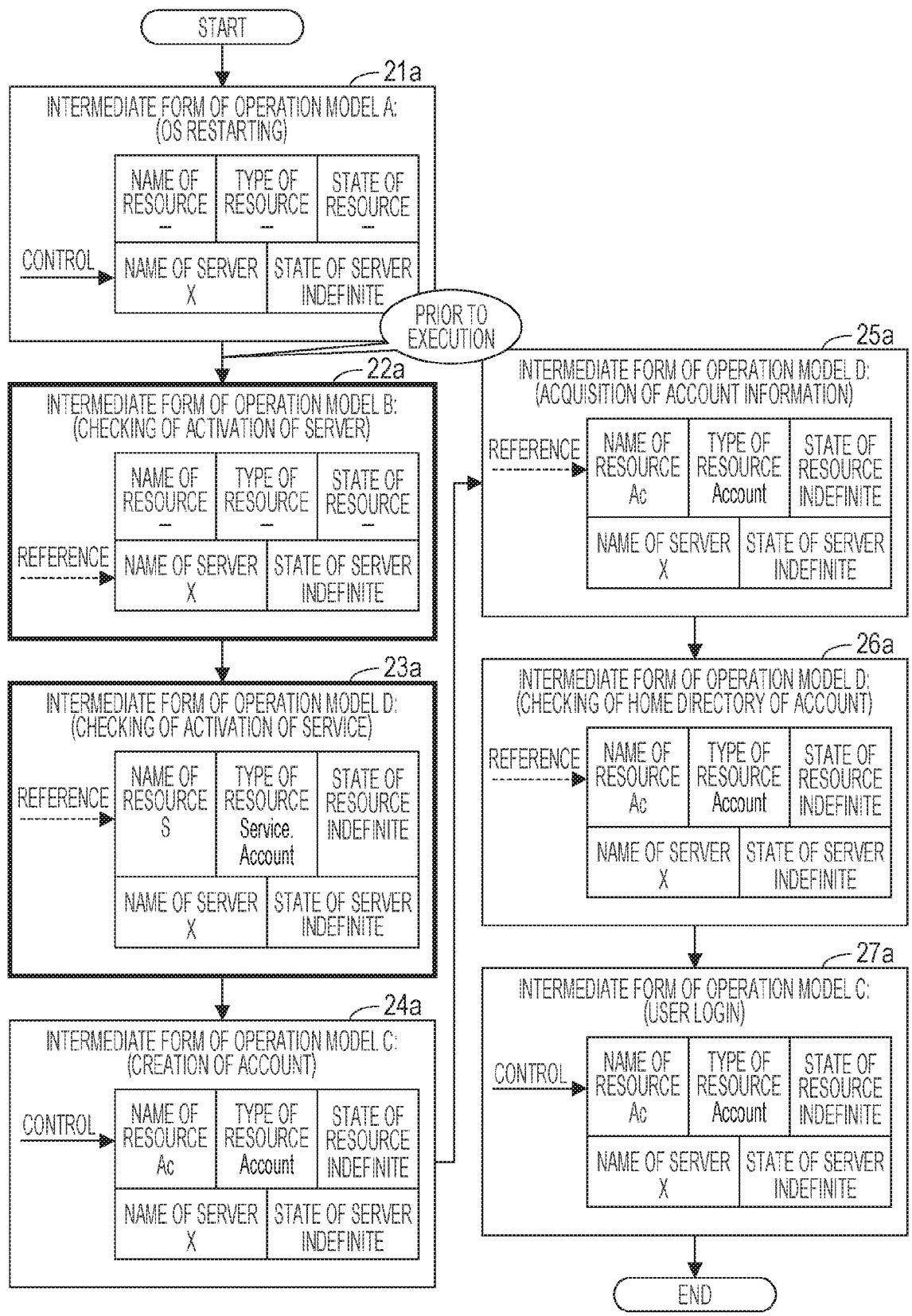
FIG. 37 is a diagram illustrating a second example of the determination of the possibility of the parallel execution.

FIG. 37 is a second example of the determination of the possibility of the parallel execution. Immediately before executing the operational control component 22 after executing the operational control component 21, the control section 130 determines the possibility of the parallel execution of the operational control components 22 and 23. The preceding operation model of the operational control component 22 is "B". The following operation model of the operational control component 23 is "D".

According to the parallel execution determination criterion definition table 118, a determination criterion that corresponds to the preceding operation model "B" and the following operation model "D" is a record with the number "7". In the operational control components 22 and 23, the names of the servers that are the control target are both "X" and thus are the same, and the servers are the same. The record with the number "7" in the parallel execution determination criterion definition table 118 indicates that, in the case where the servers are the same, the possibility of the parallel execution is determined according to the sub-criterion J2. According to the sub-criterion definition table 118a, in a case where the state of the server that is the control target is "indefinite", the sub-criterion J2 indicates that the parallel execution is impossible. In this stage, the state of the server that is the control target is "indefinite". Consequently, the control section 130 determines that the parallel execution of the operational control components 22 and 23 is impossible.

Figure 38:
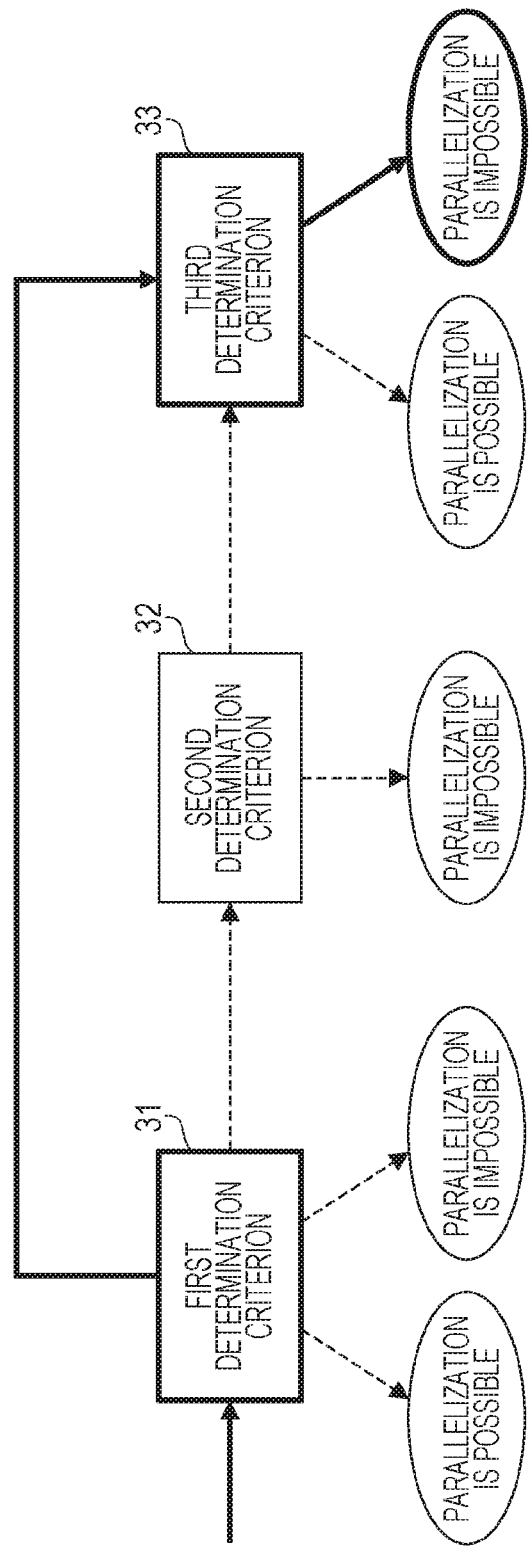
FIG. 38 is a diagram illustrating the second example (a continuation) of the determination of the possibility of the parallel execution.

FIG. 38 is a diagram illustrating the second example (a continuation) of the determination of the possibility of the parallel execution. In an example in FIG. 37, it is said that it is determined that the parallel execution is impossible, based on the first determination criterion 31 and the third determination criterion 33.

That is, with the execution of the operational control component 21, "OS restarting" is completed, the state of each of the operational controls and the state of the target that has the hierarchical relationship to the control target are acquired again prior to the execution of "checking of activation of server" takes place, and the state of the operation model is updated. At this point in time, with "OS restarting" that took place the latest, the state of the server that is the control target is "indefinite". For the operation model that is "checking of activation of server" and the operation model that is "checking of activation of service", based on the first determination criterion 31, because the server that are the targets are the same the control section 130 determines that there is a relationship (hierarchical relationship) between the operation models, and checks the state of the control target. When the state of the server that is the control target is checked, because the state of the server that is the control target is "indefinite", based on the third determination criterion, the control section 130 determines that the parallel execution of the operational control components 22 and 23 is impossible.

The execution section 140 executes the operational control component 22 serially, based on the result of the determination by the control section 130. The operational control component 22 is "checking of activation of server". According to the state transition definition table 117, the state of the server after the execution of the operational control component 22 is "ON".

Figure 39:
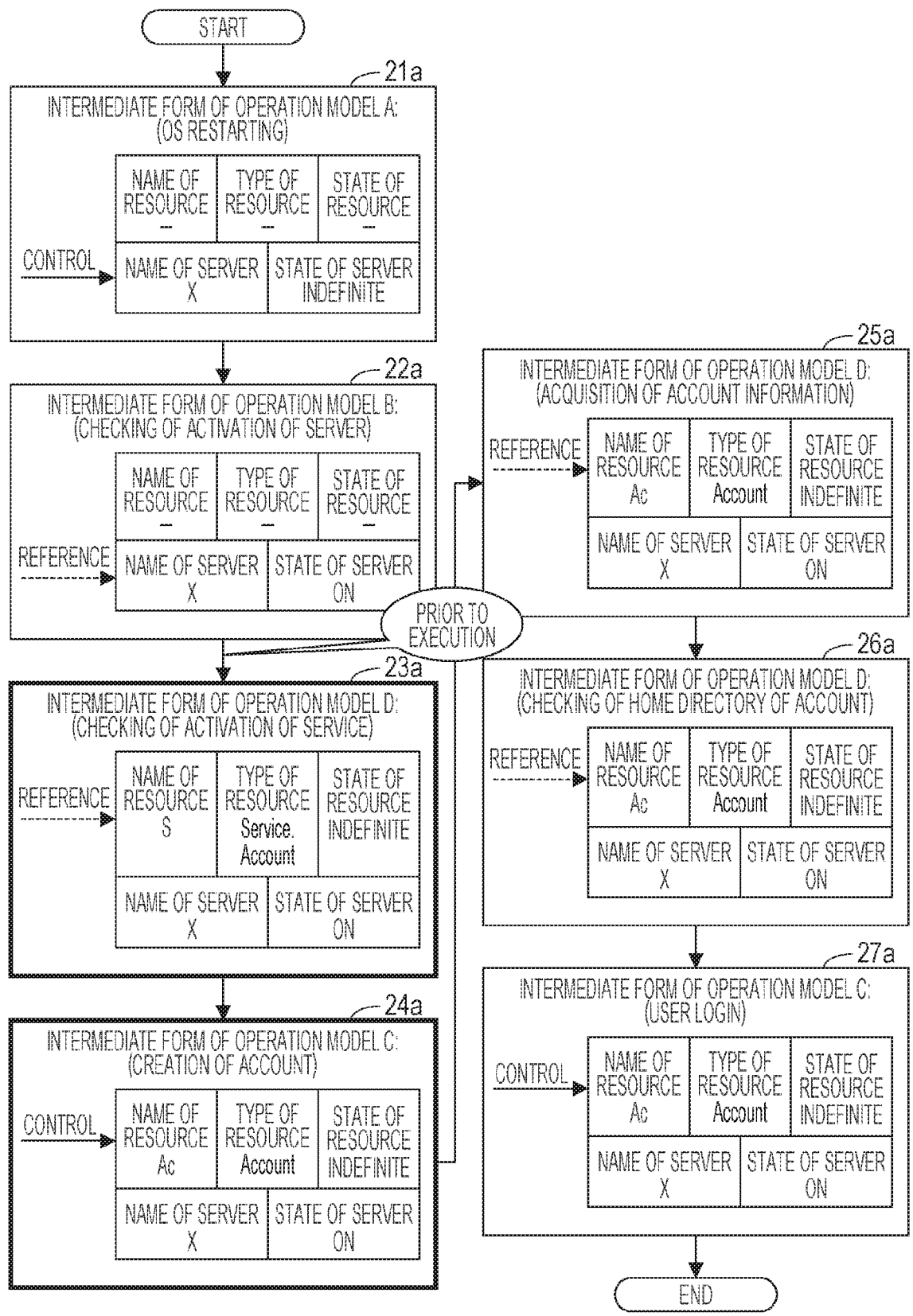
FIG. 39 is a diagram illustrating a third example of the determination of the possibility of the parallel execution.

FIG. 39 is a diagram illustrating a third example of the determination of the possibility of the parallel execution. Before executing the operational control component 23 after executing the operational control component 22, the control section 130 determines the possibility of the parallel execution of the operational control components 23 and 24. The preceding operation model of the operational control component 23 is "D". The following operation model of the operational control component 24 is "C".

According to the parallel execution determination criterion definition table 118, a determination criterion that corresponds to the preceding operation model "D" and the following operation model "C" is a record with a number "14". In the operational control components 23 and 24, the names of the servers that are the control target are both "X" and thus are the same, and the servers are the same. Furthermore, the names of the resources that are the control targets are "S" for the operational control component 23 and "Ac" for the operational control component 24, and thus are different from each other. Additionally, the attribute of the type of the resource that is the control target is the same as "Service.Account" for the operational control component 23, and the type of the resource that is the resource of the control target is the same as "Account" for the operational control component 24. In a case where the servers are the same, the names of the resources are different from each other, and the types of the resources are the same, the record with the number "14" in the parallel execution determination criterion definition table 118 indicates that the possibility of the parallel execution is determined according to the sub-criterion J4. According to the sub-criterion definition table 118a, the sub-criterion J4 is a determination criterion in accordance with the server that is the control target, and the state of the resource. In this stage, the state of the server is "ON". Any one of the states of the resources is "indefinite". In a case where the state of the server is other than "indefinite", and the state of the resource is "indefinite", the sub-criterion J4 indicates that the parallel execution is impossible. Consequently, the control section 130 determines that the parallel execution of the operational control components 23 and 24 is impossible.

Figure 40:
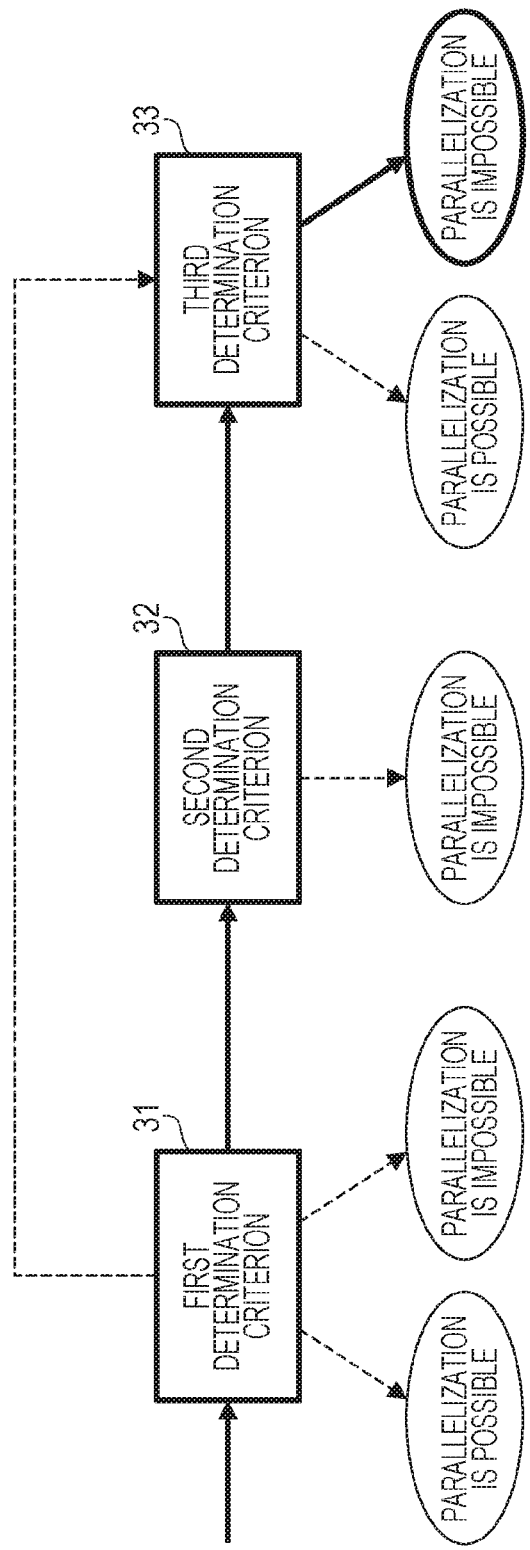
FIG. 40 is a diagram illustrating the third example (a continuation) of the determination of the possibility of the parallel execution.

FIG. 40 is a diagram of the third example (a continuation) of the determination of the possibility of the parallel execution. In an example in FIG. 39, it is said that it is determined that the parallel execution is impossible, based on the first determination criterion 31, the second determination criterion 32, and the third determination criterion 33.

That is, with the execution of the operational control component 22, "checking of activation of server" is completed, the state of the control target of each of the operational control components and the state of the target that has the hierarchical relationship to the control target are acquired again prior to the execution of "checking of activation of service" takes place, and the state of the operation model is updated. At this point in time, with "checking activation of server" that took place the latest, the state of the target (the state of the server) that has the hierarchical relationship to the control target is "ON". In the operation model that is "checking of activation of service" and the operation model that is "creation of account", because the control target becomes names of different resources on the same server, the presence or absence of the relationship between the resources is checked as indicated by the first determination criterion 31. The type of the resource in the operation model that is "checking of activation of service" is "Service.Account" and has the attribute "Account". Based on the second determination criterion 32, the control section 130 compares the attribute and the type of the resource "Account" in the operation model that is "creation of account", and determines that the attribute and the type of the resource "Account" are the same. That is, in the operational control components 23 and 24, it is determined that there is a relationship between the resources between the control targets. Accordingly, based on the third determination criterion 33, the control section 130 checks the states of the target server and the target resource. As described above, because the state of the target server is "ON" and any one of the states of the target resource is "indefinite", the control section 130 determines that the parallel execution of the operational control components 23 and 24 is impossible.

The execution section 140 executes the operational control component 23 serially, based on the result of the determination by the control section 130. According to the state transition definition table 117, the state of the resource for the name of the resource "S" and the type of the resource "Service.Account" after the execution of the operational control component 23 is "START".

Before executing the operational control component 24 after executing the operational control component 23, the control section 130 determines the possibility of the parallel execution of the operational control components 24 and 25 in the same manner. In this case, according to the same procedure as described above, the control section 130 determines that the parallel execution of the operational control components 24 and 25, based on the record with a number "11" in the parallel execution determination criterion definition table 118. This is because, in the operational control components 24 and 25, the name of the server that is the control target, the name of the resource, and the type of the resource are all the same.

The execution section 140 executes the operational control component 24 serially, based on the result of the determination by the control section 130. According to the state transition definition table 117, the state of the resource for the name of the resource "Ac", and the type of the resource "Account" after the execution of the operational control component 24 is "EXIST" (however, an illustration of a record for the state transition is omitted in FIG. 19).

Figure 41:
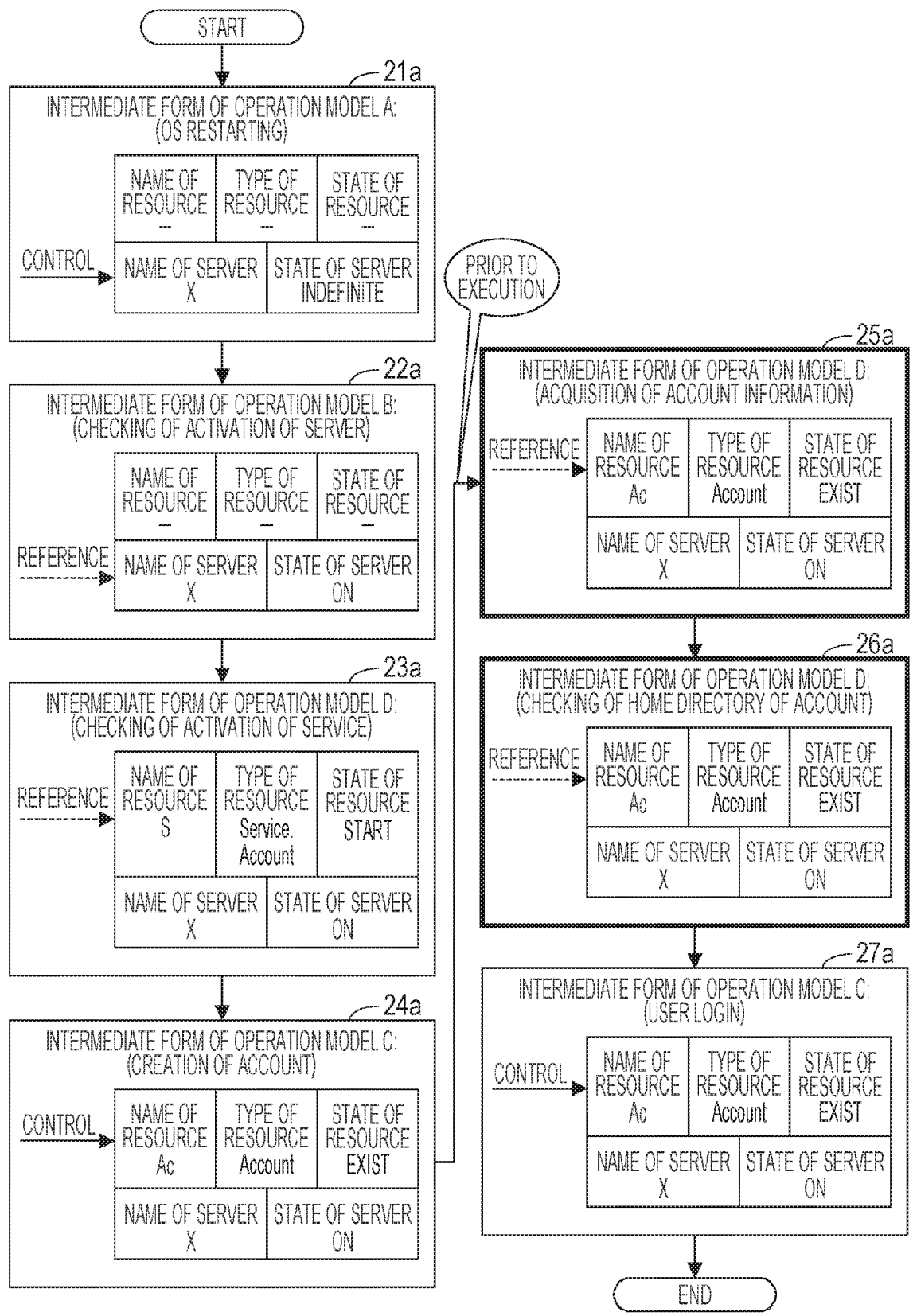
FIG. 41 is a diagram illustrating a fourth example of the determination of the possibility of the parallel execution.

FIG. 41 is a diagram illustrating an example of a fourth example of the determination of the possibility of the parallel execution. Before executing the operational control component 25 after executing the operational control component 24, the control section 130 determines the possibility of the parallel execution of the operational control components 25 and 26. The preceding operation model of the operational control component 25 is "D". The following operation model of the operational control component 26 is "D".

According to the parallel execution determination criterion definition table 118, a determination criterion that corresponds to the preceding operation model "D" and the following operation model "D" is a record with a number "15". In the operational control components 25 and 26, the names of the servers that are the control target are both "X" and thus are the same, and the servers are the same. Furthermore, the names of the resources that are the control target are both "Ac" and thus are the same, and the resources are the same. Additionally, the types of the resources that are resources of the control target are both "Account", and thus are the same, and the types of the resources are the same. In a case where the servers are the same, the names of the resources are the same, and the types of the resources are the same, the record with the number "15" in the parallel execution determination criterion definition table 118 indicates that the possibility of the parallel execution is determined according to the sub-criterion J4. According to the sub-criterion definition table 118a, the sub-criterion J4 is a determination criterion in accordance with the server that is the control target, and the state of the resource. In this stage, the state of the server is "ON". The state of the resource is "EXIST". In a case where the state of the server is other than "indefinite", and the state of the resource is other than "indefinite", the sub-criterion J4 indicates that the parallel execution is possible. Consequently, the control section 130 determines that the parallel execution of the operational control components 25 and 26 is possible.

Figure 42:
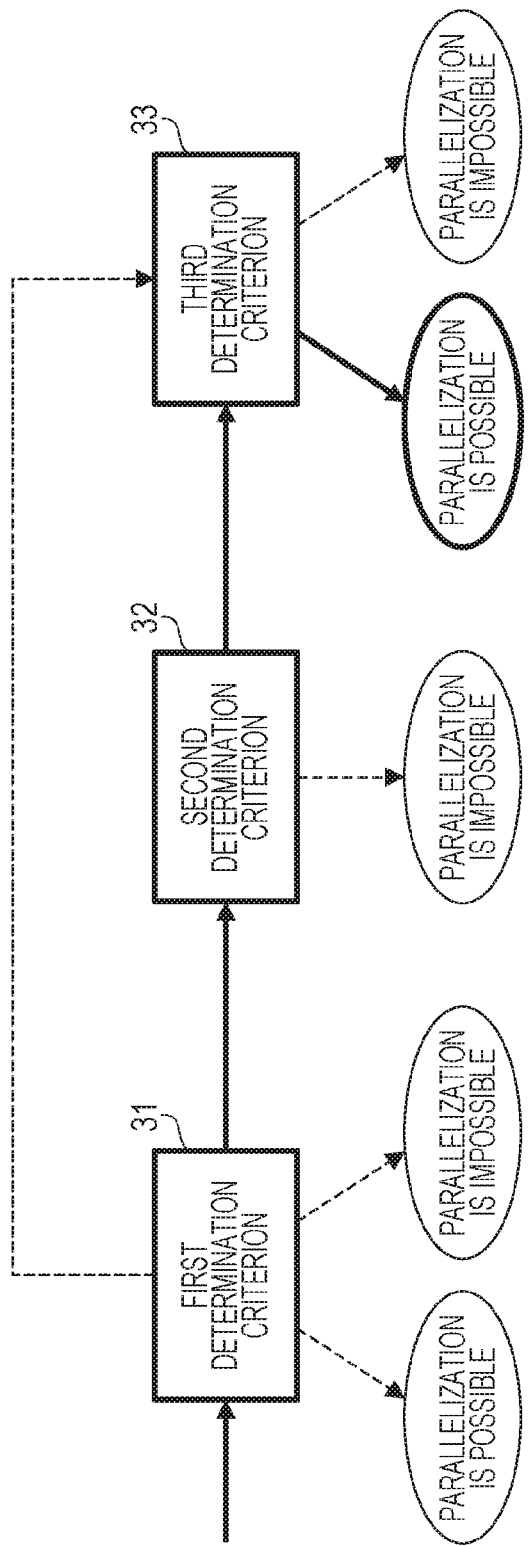
FIG. 42 is a diagram illustrating the fourth example (a continuation) of the determination of the possibility of the parallel execution.

FIG. 42 is a diagram illustrating the fourth example (a continuation) of the determination of the possibility of the parallel execution. In an example in FIG. 41, it is said that it is determined that the parallel execution is possible, based on the first determination criterion 31, the second determination criterion 32, and the third determination criterion 33.

That is, with the execution of the operational control component 24, "creation of account" is completed, the state of the control target of each of the operational control and the state of the target that has the hierarchical relationship to the control target are acquired again before the execution of "acquisition of account information" takes place, and the state of the operation model is updated. At this point in time, it is apparent from structures of the operation model which is "acquisition of account information and of the operation model which is "checking of home directory of account" that both are reference controls, but are the same names of the servers. For this reason, as indicated in the first determination criterion 31, the control section 130 checks the presence or absence of the relationship between the resources, from the name of the resource and the type (the attribute) of the resource of the target resource, and the control content. In the operational control components 25 and 26, the type of the target resource and the name of the resource are same, and are the reference controls. For this reason, as indicated in the second determination criterion 32, the control section 130 checks the target server and the state of the target resource again. As a result of checking the states of the target server and the target resource, the state of the server that the control target is "ON" and the state of the resource is "EXIST". As indicated in the third determination criterion 33, because the state of the server and the state of the resource are not "indefinite", the control section 130 determines that the parallel execution of the operational control components 25 and 26 is possible.

The control section 130 next check whether the parallel execution of each of the set of the operational control component 26 ("checking of home directory of account") and the operational control component 27 ("user login") and the set of the operational control component 25 ("acquisition of account information") and the operational control component 27 ("user login") is possible.

Figure 43:
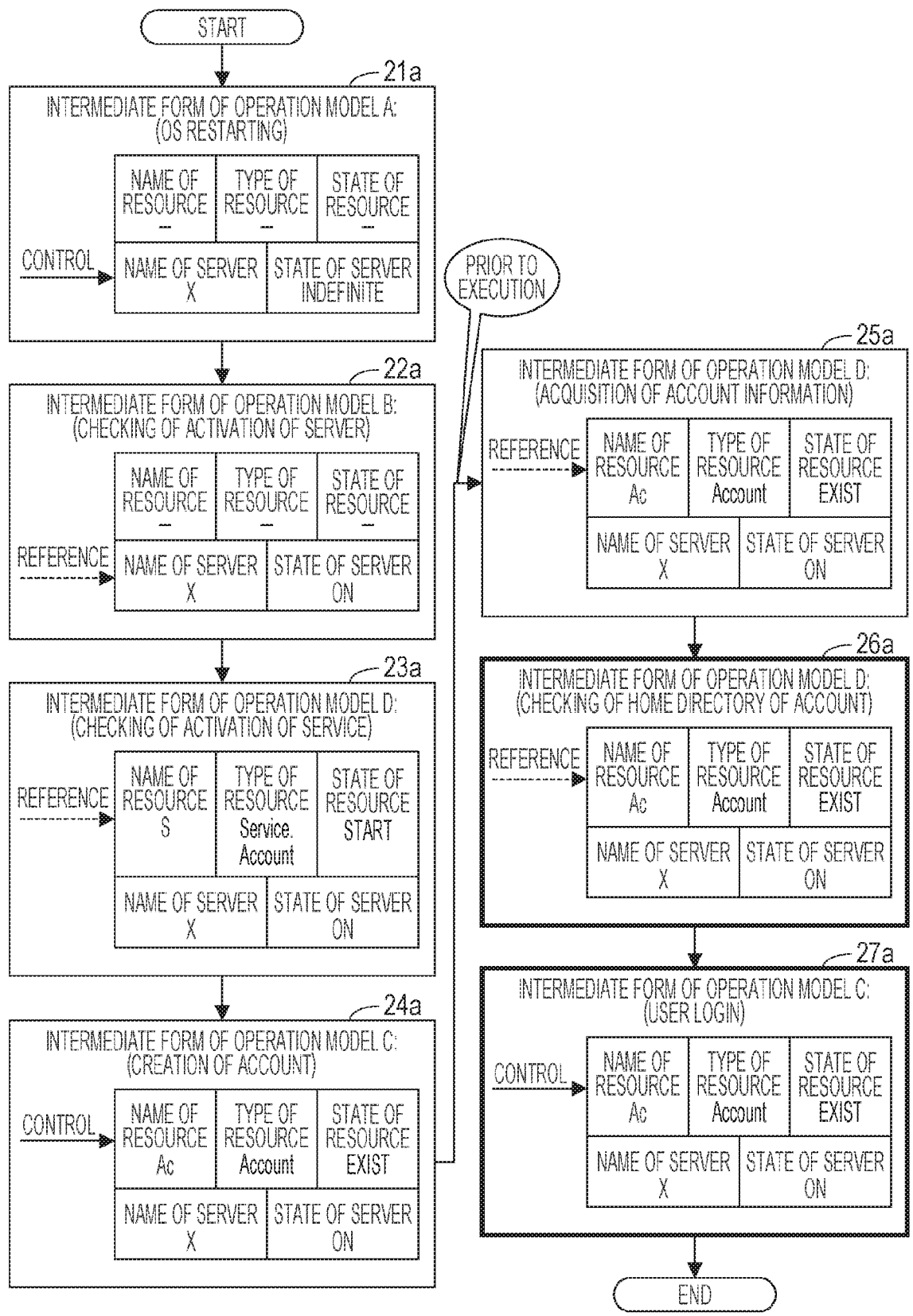
FIG. 43 is a diagram illustrating a fifth example of the determination of the possibility of the parallel execution.

FIG. 43 is a diagram illustrating a fifth example of the determination of the possibility of the parallel execution. After the determination of the possibility of the parallel execution that is illustrated in FIGS. 41 and 42 is made, the control section 130 determines the possibility of the parallel execution of the operational control components 26 and 27 prior to the execution of the operational control component 25. The preceding operation model of the operational control component 26 is "D". The following operation model of the operational control component 27 is C.

According to the parallel execution determination criterion definition table 118, a determination criterion that corresponds to the preceding operation model "D" and the following operation model "C" is a record with a number "14". In the operational control components 26 and 27, the names of the servers that are the control target are both "X" and thus are the same, and the servers are the same. Furthermore, the names of the resources that are the control target are both "Ac" and thus are the same, and the resources are the same. Additionally, the types of the resources that are resources of the control target are both "Account", and thus are the same, and the types of the resources are the same. In the case where the servers are the same, the names of the resources are the same, and the types of the resources are the same, the record with the number "14" in the parallel execution determination criterion definition table 118 indicates that the possibility of the parallel execution is impossible. Consequently, the control section 130 determines that the parallel execution of the operational control components 26 and 27 is impossible.

In this case, the control section 130 determines that the parallel execution of the operational control components 25 and 27 is impossible. Then, the control section 130 determines that the parallel execution of two operational control components, that is, the operational control components 25 and 26 is possible, but that the parallel execution of three operational control components, that is, the operational control components 25, 26, and 27 is impossible.

Figure 44:
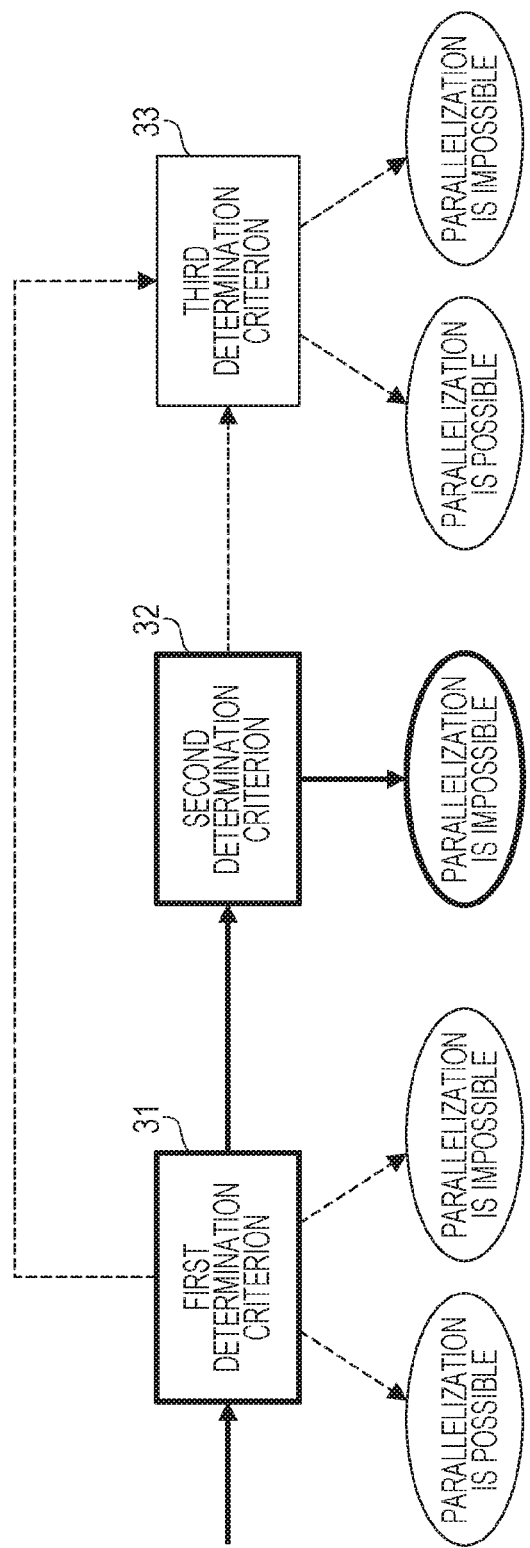
FIG. 44 is a diagram illustrating the fifth example (a continuation) of the determination of the possibility of the parallel execution.

FIG. 44 is a diagram illustrating the fifth example (a continuation) of the determination of the possibility of the parallel execution. In an example in FIG. 44, it is said that it is determined that the parallel execution is impossible, based on the first determination criterion 31 and the second determination criterion 32.

That is, first, the control section 130 compares the operation model that is "checking of home directory of account and the operation model that is "user login". Because it is apparent from the structure of the operation model that the names of the servers are the same, based on the first determination criterion 31, the control section 130 checks the presence or absence of the relationship between the resources, from the name of the resource and the type (the attribute) of the resource of the target resource, and the control content. "Checking of home directory of account" and "user login" have the reference relationship to the control for the same name of the resource and the same types of the resources. For this reason, as indicated in the second determination criterion 32, the control section 130 determines that the parallel execution of both of the operational control components (the operational control components 26 and 27) is impossible. The control section 130 determines that the parallel execution of "acquisition of account information" (the operational control component 25) and "user login" (the operational control component 27) is impossible.

Figure 45:
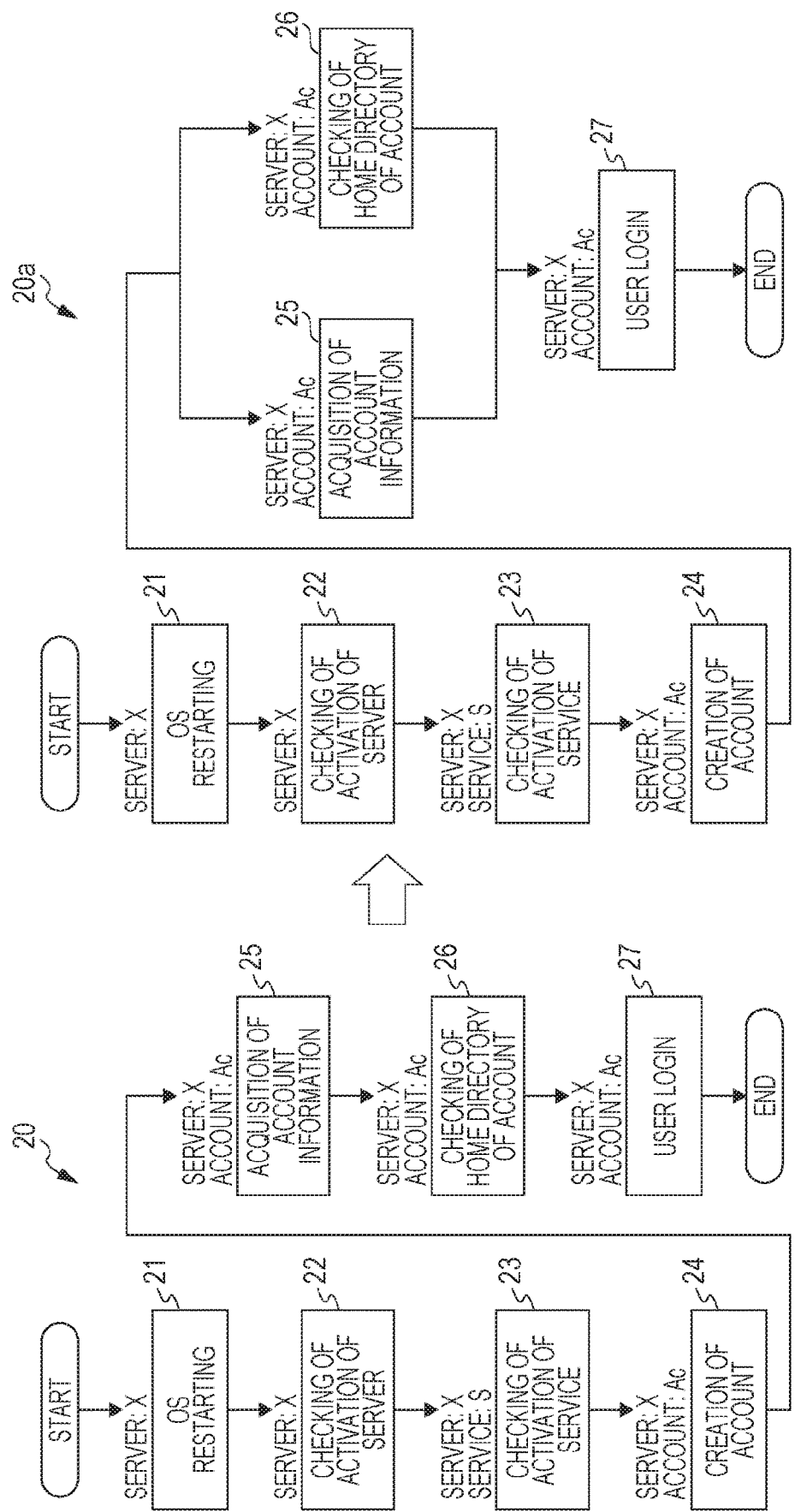
FIG. 45 is a diagram illustrating an example of parallelization.

The control section 130 changes the order in which the operational control components 25 and 26 of which the parallel execution is determined as being possible are executed. FIG. 45 is a diagram illustrating an example of the parallelization. The control section 130 sets the component numbers "5", "6" for the post-improvement next-component numbers in the record, which is equivalent to the operational control component 24, in the operation model state management table 116, and thus parallelizes the operational control components 25 and 26. The workflow 20*a* indicates the post-parallelization workflow 20. For example, the execution section 140 executes the operational control components 25 and 26 in parallel, referring to the post-improvement next-component number that is stored in the operation model state management table 116.

Figure 46:
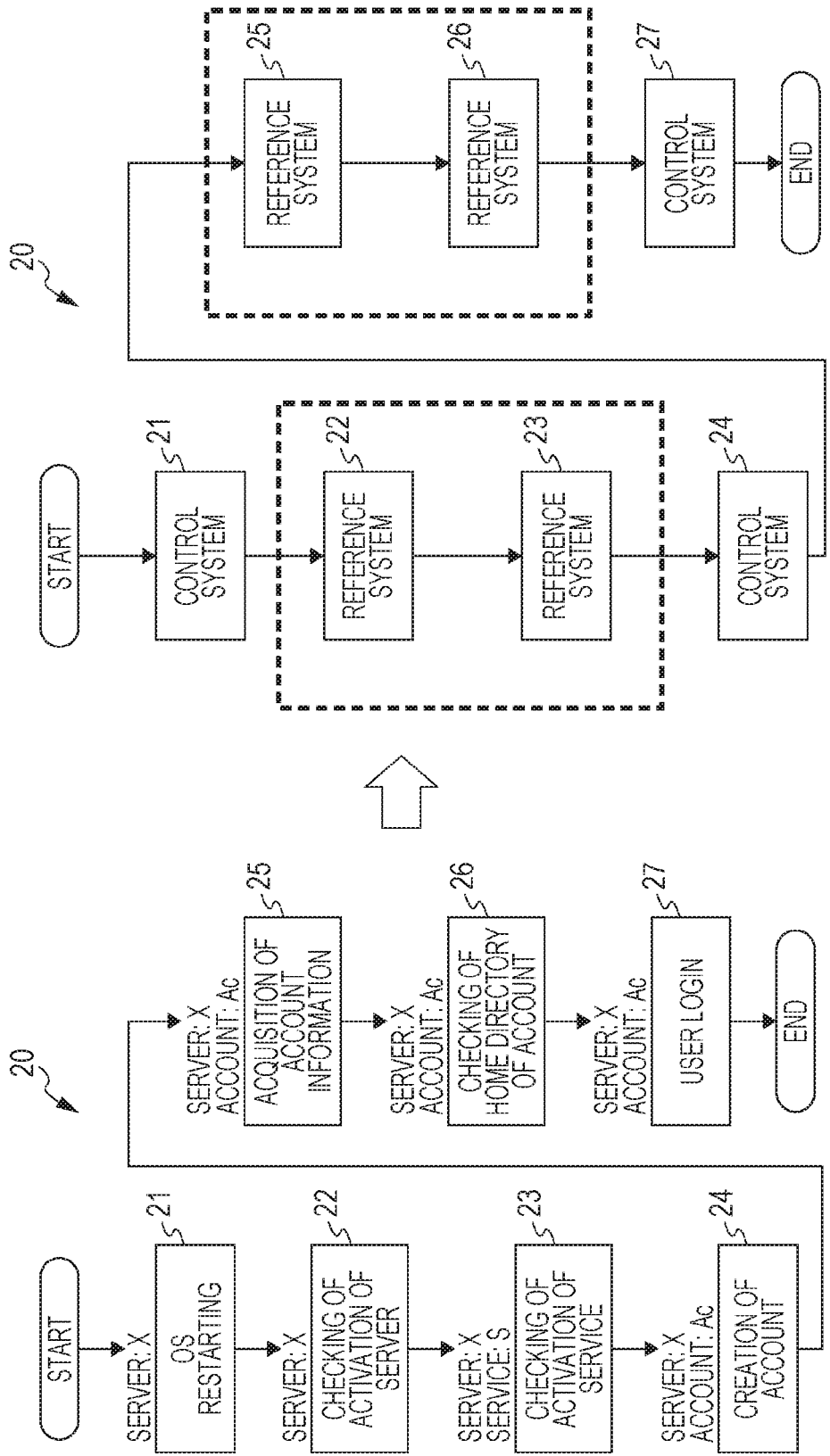
FIG. 46 is a diagram illustrating a comparative example of the parallelization.

FIG. 46 is a diagram illustrating a comparative example of the parallelization. At this point, when each of the operational control components that are included in the workflow are modeled, it is also thought that, based on only a combination of the simply-successive models, it is determined whether the parallel execution is possible.

According to an example of the workflow 20, the operational control component 21 can be modeled as a control system, the operational control component 22 as a reference system, the operational control component 23 as the reference system, the operational control component 24 as the control system, the operational control component 25 as the reference system, the operational control component 26 as the reference system, and the operational control component 27 as the control system. Then, for example, information indicating "for processing of successive reference systems, parallel execution is possible" is defined in advance. Thus, it can be determined that the parallel execution of a place where a pattern in which the parallel execution is possible appears, and two places, that is, the operational control components 22 and 23 and the operational control components 25 and 26 is possible. However, for example, although both are the reference controls, when the operational control components are executed in parallel, there is a possibility that a suitable operation will not take place. The details are as follows.

Figure 47:
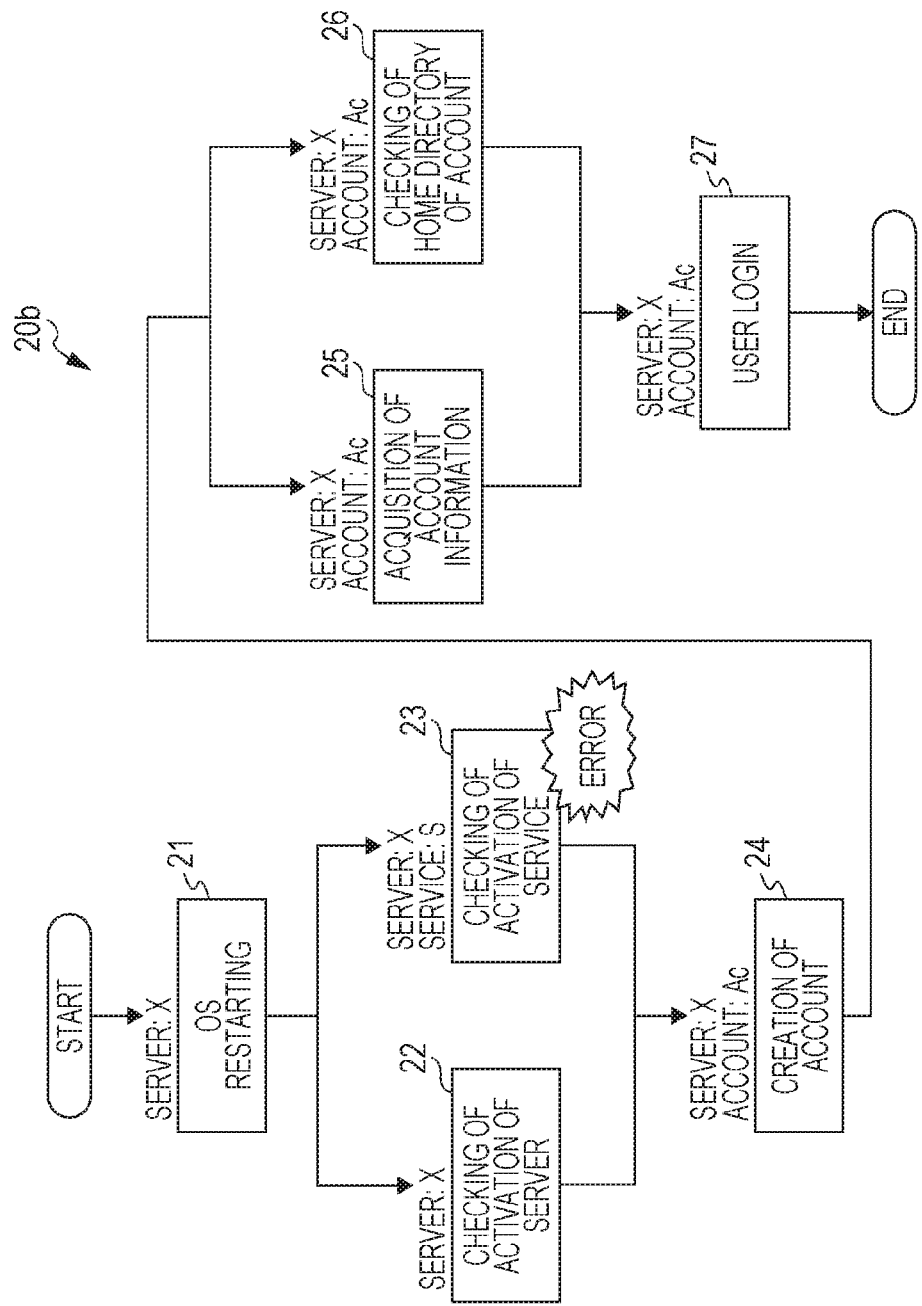
FIG. 47 is a diagram illustrating the comparative example (a continuance) of the parallelization.

FIG. 47 is a diagram illustrating the comparative example (a continuation) of the parallelization. The workflow 20*b* is a result of parallelization of the workflow 20 using a determination technique in the comparative example that is illustrated in FIG. 46. For example, as the target of the operational control component 23 that is "checking of activation of service", there is a hierarchical relationship between the server (for example, the business server 200 or the like) that is indicated by the name of the server "X" and the service with the name of the service "S" on the server. Therefore, it is important that the state of the server with the name of the server "X" is definite (is not in an indefinite state) in the checking of the activation of the service with the name of the service "S." This is because, in a case where "checking of activating of server" and "checking of activation of service" are caused to take place at the same time without considering the hierarchical relationship and the state of the control target, when "checking of activation of service is caused to take place prior to the state of the server with the name of the server "X", which is the control target, is checked, there is a possibility that the workflow 20 will not correctly operate. That is, even if the reference to different control targets is made, in a case where the control targets has a vertical relationship in terms of the hierarchy, with respect to each other, the reference has to be made in the order in compliance with the vertical relationship in terms of the hierarchy, and the parallel (concurrent) reference does not have to be made.

In addition to this, the state of the control target dynamically changes while an operational work is in progress (while the workflow is in execution). However, in a method in the comparative example that is illustrated in FIG. 46, the operational control component is modeled prior to the execution of the workflow. For this reason, when it is determined whether the parallel execution is possible, the state of the control target that includes the hierarchical relationship can be considered. In a case where the state of the control target changes with time, there is also present a case where the state of the control target is indefinite. For this reason, when the state of the control target that includes the hierarchical relationship is not considered, the possibility of the parallel execution is difficult to suitably determine.

As another method, in order to determine whether the parallel execution is possible, it is also thought that the modeling method in FIG. 46 is not used. For example, it is thought that combinations of priorities (the order) of all the operational control components in terms of pre-processing and post-processing and the states (the state of the control target and the state of the target that has the hierarchical relationship to the control target) of all the targets are considered and definitions are made. However, the number of all the combinations of the states, which have to be considered, is enormous, and it takes a great work cost in considering all the combinations and making the definitions manually in advance. This is not realistic.

Even if the definitions are made, when whether the parallel execution is possible is set to be determined when each of the operational control components is executed, based on enormous pattern definitions, all the combinations are checked for all the operational control components. For this reason, an arithmetic operation cost for determining whether or the parallel execution is possible is enormous, and the time taken for the execution of the workflow increases.

Originally, the parallel execution is thought of as a section that executes the workflow earlier. However, when a lot of time is consumed for determining whether the parallel execution is possible, this run counter to the original purpose of executing the workflow earlier.

In contrast, with the operational server 100, it is possible to dynamically determine the possibility of the parallel execution of each of the operational control component, based on the operation model that is updated when the operational control component is executed, and on the determination criterion for the possibility of the parallel execution, which is defined based on the operation model. The operational server 100 narrows the operational control components that are the targets for the determination of the possibility of the parallel execution using the information that changes dynamically, based on the information on the operation model of the operational control component. Accordingly, a detailed study for the determination of the possibility of the parallel execution of the operational control components can be limited to a case of a combination of specific servers or resources. For this reason, when the possibility of the parallel execution of the operational control component while the workflow is in execution is determined dynamically, the arithmetic operation cost is more reduced for all the operational control component than when the possibility of the parallel execution is determined using the enormous pattern definitions for all the combinations of the states of the control targets. Furthermore, the places of which the parallel execution is possible is executed in parallel dynamically when the workflow is executed, and thus the workflow can be executed earlier for the workflow that is executed in series (sequentially).

Furthermore, for example, in a case where the workflow that is executed in parallel is defined by the user, the user defines the workflow that is executed in parallel, considering the order of the operational control components, the integrity of information that is controlled by the operational control component, and the like. When the user is pressed for this work, an artificial mistake can occur in the workflow definition. In contrast, the operational server 100 dynamical determines the parallel execution place, which accompanies the execution of the workflow, for the workflow that is defined as being executed in series. For this reason, the processing ends without the user being pressed for considering the order of the operational control components or the integrity of the information and thus making the definition of the workflow including the parallel execution place. Consequently, the artificial mistake can be suppressed in the workflow definition.

Moreover, the information processing according to the first embodiment can be realized by causing the arithmetic operation section 1*b* to execute a program. Furthermore, the information processing according to the second embodiment can be realized by causing the processor 101 to execute the program. The program can be recorded on a computer-readable recording medium 13.

For example, the program can be circulated by distributing the recording medium 13, on each of which the program is recorded, is recorded. Furthermore, the program may be stored in a different computer and the program may be distributed over the network. The computer, for example, may store (install) the program recorded on the recording medium 13 or the program received from the different computer in the storage device such as a RAM 102 or the HDD 103 and may read and execute the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operational control management method executed by a management computer coupled to a memory, comprising:
    judging, in a workflow stored in the memory, whether a first operational control included in the workflow to be executed next under control of the management computer and a second operational control in the workflow that follows the first operational control include first and second computers, respectively, based on operation categorization information that results from categorizing each of the operational controls of the management computer based on an operation target computer and operation content;
    determining, by the management computer, a possibility of parallel execution of the first and second operational controls, based on relationships of the first operational control and the second operational control to the first and second computers, respectively, and on operation situations of the first and second computers, with which the first and second operational controls are respectively associated; and
    performing the parallel execution of the first and second operational controls by at least the first and second computers based on the possibility of the parallel execution.

2. The operational control management method according to claim 1,
    wherein the operation categorization information includes operation categorization information that results from categorizing each of the operational controls according to a combination of the operation target computer and the operation content, and
    wherein, in the judging, it is judged whether the first and second computers are available for the workflow, based on a determination criterion that corresponds to a set of operation categories of the first and second operational controls, among pieces of determination criterion information indicating the determination criterion for the possibility of the parallel execution in accordance with a set of an operation category of a preceding operational control and an operation category of a following operational control.

3. The operational control management method according to claim 2,
    wherein the determination criterion includes information indicating whether the set of the operation categories is the determination target computer in accordance with consistence or a difference between operation target computers of the preceding operational control and the following operational control, and
    wherein, in the judging, it is judged whether the first and second computers are available for the workflow, depending on the consistency or the difference between the operation target computers of the first and second operational controls, based on the determination criterion.

4. The operational control management method according to claim 1, wherein the operation content includes control processing that changes a state of the operation target computer and reference processing that does not change the state of the operation target computer.

5. The operational control management method according to claim 1, wherein the relationship of the second operational control to the second computer includes a hierarchical relationship between the second computer and a resource on the second computer.

6. The operational control management method according to claim 5,
    wherein the resource is specified by a name of the resource and a type of the resource, and
    wherein the hierarchical relationship further includes a hierarchical relationship between the type of the resource and an attribute of the type of the resource, by which the second computer is subcategorized based on the resource.

7. The operational control management method according to claim 5, wherein, in the determining, an operation situation of each of the first and second computers and corresponding resources, with which the first and second operational controls are associated is checked, and the possibility of the parallel execution is determined based on a combination of operation situations.

8. The operational control management method according to claim 7,
    wherein, in the determining, according to operation target computers and operation contents of the first and second operational controls, when the operation situation is indefinite, the parallel execution of the first and second operational controls is determined to be impossible, and
    wherein, in the determining, according to the operation target computers and the operation contents of the first and second operational controls, when the operation situation is other than indefinite, the parallel execution of the first and second operational controls is determined to be possible.

9. The operational control management method according to claim 8,
    wherein, in the determining, according to the operation target computers and the operation contents of the first and second operational controls, when the operation situation is other than indefinite and an operation situation of the resource is indefinite, the parallel execution of the first and second operational controls is determined to be impossible, and
    wherein, in the determining, according to the operation target computers and the operation contents of the first and second operational controls, when the operation situation is other than indefinite and the operation situation of the resource is other than indefinite, the parallel execution of the first and second operational controls is determined to be possible.

10. The operational control management method according to claim 1, wherein, in the determining, in a case where it is determined that the parallel execution of the first and second operational controls is possible, a possibility of parallel execution of a third operational control that follows the second operational control, and the first and second operational controls is further determined.

11. An operational control management apparatus that determines a possibility of parallel execution of operational controls that are included in a workflow of computer processing, the apparatus comprising:
    a memory configured to store the workflow, and operation categorization information that results from categorizing each of the operational controls based on an operation target computer and operation content; and
    at least one processor coupled to the memory and configured to judge whether a first operational control in the workflow that is to be executed next under control of a management computer and a second operational control in the workflow controlled by the management computer following the first operational control include first and second computers, respectively, based on the operation categorization information, wherein, in a case where the first operational control and the second operational control include the first and second computers, the at least one processor determines a possibility of the parallel execution of the first and second operational controls, based on relationships of the first operational control and the second operational control to operation target computers and on operation situations of the operation target computers with which the first and second operational controls are associated, and controls the parallel execution of the first and second operational controls by at least the first and second computers, based on the possibility of the parallel execution.

12. A non-transitory, computer-readable storage medium having stored therein an operational control management program causing a management computer to execute a process of an operational control which determines a possibility of parallel execution of operational controls that are included in a workflow of computer processing, the process comprising:

judging whether a first operational control in the workflow in a memory to be executed next under control of the management computer and a second operational control in the workflow controlled by the management computer following the first operational control include first and second computers, respectively, based on operation categorization information that results from categorizing each of the operational controls of the management computer based on an operation target computer and operation content;

determining a possibility of the parallel execution of the first and second operational controls, based on relationships of the first operational control and the second operational control to the first and second computers, respectively, and on operation situations of the first and second computers, with which the first and second operational controls are respectively associated; and performing the parallel execution of the first and second operational controls by at least the first and second computers, respectively, based on the possibility of the parallel execution.

\* \* \* \* \*